(12) United States Patent
Downs, III et al.

(10) Patent No.: US 9,387,390 B2
(45) Date of Patent: Jul. 12, 2016

(54) CARD SHUFFLING APPARATUS AND CARD HANDLING DEVICE

(71) Applicant: Bally Gaming, Inc., Las Vegas, NV (US)

(72) Inventors: Justin G. Downs, III, Henderson, NV (US); James R. Roberts, North Las Vegas, NV (US); Kapilkumar N. Kulakkunnath, Las Vegas Colmar, NV (US); Vladislav Zvercov, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 49 days.

(21) Appl. No.: 14/028,210

(22) Filed: Sep. 16, 2013

(65) Prior Publication Data

US 2014/0084538 A1    Mar. 27, 2014

Related U.S. Application Data

(60) Continuation of application No. 13/438,193, filed on Apr. 3, 2012, now Pat. No. 8,538,155, which is a continuation of application No. 12/842,862, filed on Jul. 23, 2010, now Pat. No. 8,150,157, which is a (Continued)

(51) Int. Cl.
*G06K 9/00* (2006.01)
*A63F 1/12* (2006.01)
(Continued)

(52) U.S. Cl.
CPC ... *A63F 1/12* (2013.01); *A63F 1/14* (2013.01); *A63F 2009/2419* (2013.01); *A63F 2009/2425* (2013.01)

(58) Field of Classification Search
CPC ..... A63F 1/14; A63F 2009/2425; A63F 1/12; A63F 2009/2419; A63F 1/18; A63F 2001/001; A63F 2009/2423; G06Q 30/06; G06Q 30/02; G06Q 10/083; G06Q 10/10; G06Q 20/12; G06Q 3/017; G06Q 17/30879
USPC ........... 382/181, 100; 273/149 R, 149 P, 309, 273/292, 303, 274; 463/11–42
See application file for complete search history.

(56) References Cited

U.S. PATENT DOCUMENTS

| 130,281 A | 8/1872 | Coughlik |
| 205,030 A | 6/1878 | Ash |

(Continued)

FOREIGN PATENT DOCUMENTS

| AU | 5025479 A | 3/1980 |
| AU | 757636 B2 | 2/2003 |

(Continued)

OTHER PUBLICATIONS

"Error Back propagation," http://willamette.edu~gorr/classes/cs449/backprop.html (4 pages), Nov. 13, 2008.

(Continued)

*Primary Examiner* — Sheela C Chawan
(74) *Attorney, Agent, or Firm* — TraskBritt

(57) ABSTRACT

A device for forming a random set of playing cards comprises a card in-feed area, a shuffling system, a card removal area, and a card reading system located within the device, the card reading system employing a complementary metal-oxide semiconductor (CMOS) sensor and a hardware component, the hardware component capable of converting signals from the CMOS sensor into vector sets and comparing the vector sets to known vectors to determine rank and suit.

19 Claims, 21 Drawing Sheets

Related U.S. Application Data division of application No. 11/488,903, filed on Jul. 18, 2006, now Pat. No. 7,764,836, which is a continuation-in-part of application No. 11/484,011, filed on Jul. 7, 2006, now Pat. No. 7,933,448, which is a continuation-in-part of application No. 11/417,894, filed on May 3, 2006, now Pat. No. 7,593,544, which is a continuation-in-part of application No. 11/152,475, filed on Jun. 13, 2005, now Pat. No. 7,769,232.

(51) Int. Cl.
*A63F 1/14* (2006.01)
*A63F 9/24* (2006.01)

(56) References Cited

U.S. PATENT DOCUMENTS

| | | |
|---|---|---|
| 609,730 A | 8/1898 | Booth |
| 673,154 A | 4/1901 | Bellows |
| 793,489 A | 6/1905 | Williams |
| 892,389 A | 7/1908 | Bellows |
| 1,014,219 A | 1/1912 | Hall |
| 1,043,109 A | 11/1912 | Hurm |
| 1,157,898 A | 10/1915 | Perret |
| 1,556,856 A | 10/1925 | Lipps |
| 1,850,114 A | 3/1932 | McCaddin |
| 1,885,276 A | 11/1932 | McKay |
| 1,955,926 A | 4/1934 | Matthaey |
| 1,992,085 A | 2/1935 | McKay |
| 1,998,690 A | 4/1935 | Shepherd et al. |
| 2,001,220 A | 5/1935 | Smith |
| 2,001,918 A | 5/1935 | Nevius |
| 2,016,030 A | 10/1935 | Woodruff et al. |
| 2,043,343 A | 6/1936 | Warner |
| 2,060,096 A | 11/1936 | McCoy |
| 2,065,824 A | 12/1936 | Plass |
| 2,159,958 A | 5/1939 | Sachs |
| 2,185,474 A | 1/1940 | Nott |
| 2,254,484 A | 9/1941 | Hutchins |
| D132,360 S | 5/1942 | Gardner |
| 2,328,153 A | 8/1943 | Laing |
| 2,328,879 A | 9/1943 | Isaacson |
| 2,364,413 A | 12/1944 | Wittel |
| 2,525,305 A | 10/1950 | Lombard |
| 2,543,522 A | 2/1951 | Cohen |
| 2,588,582 A | 3/1952 | Sivertson |
| 2,661,215 A | 12/1953 | Stevens |
| 2,676,020 A | 4/1954 | Ogden |
| 2,692,777 A | 10/1954 | Miller |
| 2,701,720 A | 2/1955 | Ogden |
| 2,705,638 A | 4/1955 | Newcomb |
| 2,711,319 A | 6/1955 | Morgan et al. |
| 2,714,510 A | 8/1955 | Oppenlander |
| 2,717,782 A | 9/1955 | Droll |
| 2,727,747 A | 12/1955 | Semisch, Jr. |
| 2,731,271 A | 1/1956 | Brown |
| 2,747,877 A | 5/1956 | Howard |
| 2,755,090 A | 7/1956 | Aldrich |
| 2,757,005 A | 7/1956 | Nothaft |
| 2,760,779 A | 8/1956 | Ogden et al. |
| 2,770,459 A | 11/1956 | Wilson et al. |
| 2,778,643 A | 1/1957 | Williams |
| 2,778,644 A | 1/1957 | Stephenson |
| 2,782,040 A | 2/1957 | Matter |
| 2,790,641 A | 4/1957 | Adams |
| 2,793,863 A | 5/1957 | Liebelt |
| 2,815,214 A | 12/1957 | Hall |
| 2,821,399 A | 1/1958 | Heinoo |
| 2,914,215 A | 11/1959 | Neidig |
| 2,937,739 A | 5/1960 | Levy |
| 2,950,005 A | 8/1960 | MacDonald |
| RE24,986 E | 5/1961 | Stephenson |
| 3,067,885 A | 12/1962 | Kohler |
| 3,107,096 A | 10/1963 | Osborn |
| 3,124,674 A | 3/1964 | Edwards et al. |
| 3,131,935 A | 5/1964 | Grönneberg |
| 3,147,978 A | 9/1964 | Sjostrand |
| 3,222,071 A | 12/1965 | Lang |
| 3,235,741 A | 2/1966 | Plaisance |
| 3,288,308 A | 11/1966 | Gingher |
| 3,305,237 A | 2/1967 | Granius |
| 3,312,473 A | 4/1967 | Friedman et al. |
| 3,452,509 A | 7/1969 | Hauer |
| 3,530,968 A | 9/1970 | Palmer |
| 3,588,116 A | 6/1971 | Miura |
| 3,589,730 A | 6/1971 | Slay |
| 3,595,388 A | 7/1971 | Castaldi |
| 3,597,076 A | 8/1971 | Hubbard |
| 3,618,933 A | 11/1971 | Roggenstein |
| 3,627,331 A | 12/1971 | Erickson |
| 3,666,270 A | 5/1972 | Mazur |
| 3,680,853 A | 8/1972 | Houghton |
| 3,690,670 A | 9/1972 | Cassady et al. |
| 3,704,938 A | 12/1972 | Fanselow |
| 3,716,238 A | 2/1973 | Porter |
| 3,751,041 A | 8/1973 | Seifert |
| 3,761,079 A | 9/1973 | Azure |
| 3,810,627 A | 5/1974 | Levy |
| 3,861,261 A | 1/1975 | Maxey |
| 3,897,954 A | 8/1975 | Erickson |
| 3,909,002 A | 9/1975 | Levy |
| 3,929,339 A | 12/1975 | Mattioli |
| 3,944,077 A | 3/1976 | Green |
| 3,944,230 A | 3/1976 | Fineman |
| 3,949,219 A | 4/1976 | Crouse |
| 3,968,364 A | 7/1976 | Miller |
| 4,023,705 A | 5/1977 | Reiner et al. |
| 4,033,590 A | 7/1977 | Pic |
| 4,072,930 A | 2/1978 | Lucero et al. |
| 4,088,265 A | 5/1978 | Garczynski et al. |
| 4,151,410 A | 4/1979 | McMillan et al. |
| 4,159,581 A | 7/1979 | Lichtenberg |
| 4,162,649 A | 7/1979 | Thornton |
| 4,166,615 A | 9/1979 | Noguchi et al. |
| 4,232,861 A | 11/1980 | Maul |
| 4,280,690 A | 7/1981 | Hill |
| 4,283,709 A | 8/1981 | Lucero et al. |
| 4,310,160 A | 1/1982 | Willette |
| 4,339,134 A | 7/1982 | Macheel |
| 4,339,798 A | 7/1982 | Hedges et al. |
| 4,361,393 A | 11/1982 | Noto |
| 4,368,972 A | 1/1983 | Naramore |
| 4,369,972 A | 1/1983 | Parker |
| 4,374,309 A | 2/1983 | Walton |
| 4,377,285 A | 3/1983 | Kadlic |
| 4,385,827 A | 5/1983 | Naramore |
| 4,388,994 A | 6/1983 | Suda |
| 4,397,469 A | 8/1983 | Carter |
| 4,421,312 A | 12/1983 | Delgado et al. |
| 4,421,501 A | 12/1983 | Scheffer |
| D274,069 S | 5/1984 | Fromm |
| 4,467,424 A | 8/1984 | Hedges et al. |
| 4,494,197 A | 1/1985 | Troy et al. |
| 4,497,488 A | 2/1985 | Plevyak et al. |
| 4,512,580 A | 4/1985 | Matviak |
| 4,513,969 A | 4/1985 | Samsel |
| 4,515,367 A | 5/1985 | Howard |
| 4,531,187 A | 7/1985 | Uhland et al. |
| 4,534,562 A | 8/1985 | Cuff et al. |
| 4,549,738 A | 10/1985 | Greitzer |
| 4,566,782 A | 1/1986 | Britt et al. |
| 4,575,367 A | 3/1986 | Karmel |
| 4,586,712 A | 5/1986 | Lorber et al. |
| 4,659,082 A | 4/1987 | Greenberg |
| 4,662,637 A | 5/1987 | Pfeiffer et al. |
| 4,662,816 A | 5/1987 | Fabrig |
| 4,667,959 A | 5/1987 | Pfeiffer et al. |
| 4,741,524 A | 5/1988 | Bromage |
| 4,750,743 A | 6/1988 | Nicoletti |
| 4,755,941 A | 7/1988 | Bacchi |
| 4,759,448 A | 7/1988 | Kawabata |
| 4,770,412 A | 9/1988 | Wolfe |
| 4,770,421 A | 9/1988 | Hoffman |
| 4,807,884 A | 2/1989 | Breeding |

(56) References Cited

U.S. PATENT DOCUMENTS

| | | |
|---|---|---|
| 4,822,050 A | 4/1989 | Normand et al. |
| 4,832,342 A | 5/1989 | Plevyak |
| 4,858,000 A | 8/1989 | Lu |
| 4,861,041 A | 8/1989 | Jones et al. |
| 4,876,000 A | 10/1989 | Mikhail |
| 4,900,009 A | 2/1990 | Kitahara et al. |
| 4,904,830 A | 2/1990 | Rizzuto |
| 4,921,109 A | 5/1990 | Hasuo et al. |
| 4,926,327 A | 5/1990 | Sidley |
| 4,948,134 A | 8/1990 | Suttle et al. |
| 4,951,950 A | 8/1990 | Normand et al. |
| 4,969,648 A | 11/1990 | Hollinger et al. |
| 4,993,587 A | 2/1991 | Abe |
| 4,995,615 A | 2/1991 | Cheng et al. |
| 5,000,453 A | 3/1991 | Stevens et al. |
| 5,039,102 A | 8/1991 | Miller et al. |
| 5,067,713 A | 11/1991 | Soules et al. |
| 5,078,405 A | 1/1992 | Jones et al. |
| 5,081,487 A | 1/1992 | Hoyer et al. |
| 5,096,197 A | 3/1992 | Embury |
| 5,102,293 A | 4/1992 | Schneider |
| 5,118,114 A | 6/1992 | Tucci et al. |
| 5,121,192 A | 6/1992 | Kazui |
| 5,121,921 A | 6/1992 | Friedman |
| 5,154,429 A | 10/1992 | LeVasseur et al. |
| 5,179,517 A | 1/1993 | Sarbin et al. |
| 5,197,094 A | 3/1993 | Tillery et al. |
| 5,199,710 A | 4/1993 | Lamle |
| 5,209,476 A | 5/1993 | Eiba et al. |
| 5,224,712 A | 7/1993 | Laughlin et al. |
| 5,240,140 A | 8/1993 | Huen |
| 5,248,142 A | 9/1993 | Breeding et al. |
| 5,257,179 A | 10/1993 | DeMar et al. |
| 5,259,907 A | 11/1993 | Soules et al. |
| 5,261,667 A | 11/1993 | Breeding |
| 5,267,248 A | 11/1993 | Reyner |
| 5,275,411 A | 1/1994 | Breeding |
| 5,276,312 A | 1/1994 | McCarthy et al. |
| 5,283,422 A | 2/1994 | Storch et al. |
| 5,288,081 A | 2/1994 | Breeding et al. |
| 5,299,089 A | 3/1994 | Lwee et al. |
| 5,303,921 A | 4/1994 | Breeding |
| 5,344,146 A | 9/1994 | Lee |
| 5,356,145 A | 10/1994 | Verschoor |
| 5,362,053 A | 11/1994 | Miller et al. |
| 5,374,061 A | 12/1994 | Albrecht et al. |
| 5,377,973 A | 1/1995 | Jones et al. |
| 5,382,024 A | 1/1995 | Blaha |
| 5,382,025 A | 1/1995 | Sklansky et al. |
| 5,390,910 A | 2/1995 | Mandel et al. |
| 5,397,128 A | 3/1995 | Hesse et al. |
| 5,397,133 A | 3/1995 | Penzias et al. |
| 5,416,308 A | 5/1995 | Hood et al. |
| 5,431,399 A | 7/1995 | Kelley et al. |
| 5,431,407 A | 7/1995 | Hofberg et al. |
| 5,437,462 A | 8/1995 | Breeding et al. |
| 5,445,377 A | 8/1995 | Steinbach |
| 5,470,079 A | 11/1995 | LeStrange et al. |
| D365,853 S | 1/1996 | Zadro |
| 5,489,101 A | 2/1996 | Moody et al. |
| 5,515,477 A | 5/1996 | Sutherland |
| 5,524,888 A | 6/1996 | Heidel |
| 5,531,448 A | 7/1996 | Moody et al. |
| 5,544,892 A | 8/1996 | Breeding et al. |
| 5,575,475 A | 11/1996 | Steinbach |
| 5,584,483 A | 12/1996 | Sines et al. |
| 5,586,766 A | 12/1996 | Forte et al. |
| 5,586,936 A | 12/1996 | Bennett et al. |
| 5,605,334 A | 2/1997 | McCrea et al. |
| 5,613,912 A | 3/1997 | Slater et al. |
| 5,632,483 A | 5/1997 | Garczynski et al. |
| 5,636,843 A | 6/1997 | Roberts et al. |
| 5,651,548 A | 7/1997 | French et al. |
| 5,655,961 A | 8/1997 | Acres et al. |
| 5,669,816 A | 9/1997 | Garczynski et al. |
| 5,676,231 A | 10/1997 | Legras et al. |
| 5,676,372 A | 10/1997 | Sines et al. |
| 5,681,039 A | 10/1997 | Miller et al. |
| 5,683,085 A | 11/1997 | Johnson et al. |
| 5,685,543 A | 11/1997 | Garner et al. |
| 5,690,324 A | 11/1997 | Otomo et al. |
| 5,692,748 A | 12/1997 | Frisco et al. |
| 5,695,189 A | 12/1997 | Breeding et al. |
| 5,701,565 A | 12/1997 | Morgan |
| 5,707,286 A | 1/1998 | Carlson |
| 5,707,287 A | 1/1998 | McCrea et al. |
| 5,711,525 A | 1/1998 | Breeding et al. |
| 5,718,427 A | 2/1998 | Cranford et al. |
| 5,719,288 A | 2/1998 | Sens et al. |
| 5,720,484 A | 2/1998 | Hsu et al. |
| 5,722,893 A * | 3/1998 | Hill et al. .................. 463/47 |
| 5,735,525 A | 4/1998 | McCrea et al. |
| 5,735,724 A | 4/1998 | Udagawa |
| 5,735,742 A | 4/1998 | French et al. |
| 5,743,798 A | 4/1998 | Adams et al. |
| 5,768,382 A | 6/1998 | Schneier et al. |
| 5,770,533 A | 6/1998 | Franchi et al. |
| 5,770,553 A | 6/1998 | Kroner et al. |
| 5,772,505 A | 6/1998 | Garczynski et al. |
| 5,779,546 A | 7/1998 | Meissner et al. |
| 5,781,647 A | 7/1998 | Fishbine et al. |
| 5,785,321 A | 7/1998 | Van Putten et al. |
| 5,788,574 A | 8/1998 | Ornstein et al. |
| 5,791,988 A | 8/1998 | Nomi et al. |
| 5,802,560 A | 9/1998 | Joseph et al. |
| 5,803,808 A | 9/1998 | Strisower |
| 5,810,355 A | 9/1998 | Trilli |
| 5,813,326 A | 9/1998 | Salomon et al. |
| 5,813,912 A | 9/1998 | Shultz et al. |
| 5,814,796 A | 9/1998 | Benson et al. |
| 5,836,775 A | 11/1998 | Hiyama et al. |
| 5,839,730 A | 11/1998 | Pike |
| 5,845,906 A | 12/1998 | Wirth et al. |
| 5,851,011 A | 12/1998 | Lott et al. |
| 5,867,586 A | 2/1999 | Liang |
| 5,879,233 A | 3/1999 | Stupero |
| 5,883,804 A | 3/1999 | Christensen |
| 5,890,717 A | 4/1999 | Rosewarne et al. |
| 5,892,210 A | 4/1999 | Levasseur |
| 5,911,626 A | 6/1999 | McCrea et al. |
| 5,919,090 A | 7/1999 | Mothwurf |
| 5,936,222 A | 8/1999 | Korsunsky et al. |
| 5,941,769 A | 8/1999 | Order |
| 5,944,310 A | 8/1999 | Johnson et al. |
| D414,527 S | 9/1999 | Tedham |
| 5,957,776 A | 9/1999 | Hoehne et al. |
| 5,974,150 A | 10/1999 | Kaish et al. |
| 5,985,305 A | 11/1999 | Peery et al. |
| 5,989,122 A | 11/1999 | Roblejo et al. |
| 5,991,308 A | 11/1999 | Fuhrmann et al. |
| 6,015,311 A | 1/2000 | Benjamin et al. |
| 6,019,368 A | 2/2000 | Sines et al. |
| 6,019,374 A | 2/2000 | Breeding et al. |
| 6,039,650 A | 3/2000 | Hill et al. |
| 6,050,569 A | 4/2000 | Taylor |
| 6,053,695 A | 4/2000 | Longoria et al. |
| 6,061,449 A | 5/2000 | Candelore et al. |
| 6,068,258 A | 5/2000 | Breeding et al. |
| 6,069,564 A | 5/2000 | Hatano et al. |
| 6,071,190 A | 6/2000 | Weiss et al. |
| 6,093,103 A | 7/2000 | McCrea et al. |
| 6,113,101 A | 9/2000 | Wirth et al. |
| 6,117,012 A | 9/2000 | McCrea et al. |
| D432,588 S | 10/2000 | Tedham |
| 6,126,166 A | 10/2000 | Lorson et al. |
| 6,127,447 A | 10/2000 | Mitry et al. |
| 6,131,817 A | 10/2000 | Miller |
| 6,139,014 A | 10/2000 | Breeding et al. |
| 6,149,154 A | 11/2000 | Grauzer et al. |
| 6,154,131 A | 11/2000 | Jones et al. |
| 6,165,069 A | 12/2000 | Sines et al. |
| 6,165,072 A | 12/2000 | Davis et al. |
| 6,183,362 B1 | 2/2001 | Boushy |
| 6,186,895 B1 | 2/2001 | Oliver |

(56) References Cited

U.S. PATENT DOCUMENTS

| | | |
|---|---|---|
| 6,200,218 B1 | 3/2001 | Lindsay |
| 6,210,274 B1 | 4/2001 | Carlson |
| 6,213,310 B1 | 4/2001 | Wennersten et al. |
| 6,217,447 B1 | 4/2001 | Lofink et al. |
| 6,234,900 B1 | 5/2001 | Cumbers |
| 6,236,223 B1 | 5/2001 | Brady et al. |
| 6,250,632 B1 | 6/2001 | Albrecht |
| 6,254,002 B1 | 7/2001 | Litman |
| 6,254,096 B1 | 7/2001 | Grauzer et al. |
| 6,254,484 B1 | 7/2001 | McCrea, Jr. |
| 6,257,981 B1 | 7/2001 | Acres et al. |
| 6,267,248 B1 | 7/2001 | Johnson et al. |
| 6,267,648 B1 | 7/2001 | Katayama et al. |
| 6,267,671 B1 | 7/2001 | Hogan |
| 6,270,404 B2 | 8/2001 | Sines et al. |
| 6,272,223 B1 | 8/2001 | Carlson |
| 6,293,546 B1 | 9/2001 | Hessing et al. |
| 6,293,864 B1 | 9/2001 | Romero |
| 6,299,167 B1 | 10/2001 | Sines et al. |
| 6,299,534 B1 | 10/2001 | Breeding et al. |
| 6,299,536 B1 | 10/2001 | Hill |
| 6,308,886 B1 | 10/2001 | Benson et al. |
| 6,313,871 B1 | 11/2001 | Schubert |
| 6,325,373 B1 | 12/2001 | Breeding et al. |
| 6,334,614 B1 | 1/2002 | Breeding |
| 6,341,778 B1 | 1/2002 | Lee |
| 6,342,830 B1 | 1/2002 | Want et al. |
| 6,346,044 B1 | 2/2002 | McCrea, Jr. |
| 6,361,044 B1 | 3/2002 | Block et al. |
| 6,386,973 B1 | 5/2002 | Yoseloff |
| 6,402,142 B1 | 6/2002 | Warren et al. |
| 6,403,908 B2 | 6/2002 | Stardust et al. |
| 6,443,839 B2 | 9/2002 | Stockdale |
| 6,446,864 B1 | 9/2002 | Kim et al. |
| 6,454,266 B1 | 9/2002 | Breeding et al. |
| 6,460,848 B1 | 10/2002 | Soltys et al. |
| 6,464,584 B2 | 10/2002 | Oliver |
| 6,490,277 B1 | 12/2002 | Tzotzkov |
| 6,508,709 B1 | 1/2003 | Karmarkar |
| 6,514,140 B1 | 2/2003 | Storch |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,532,297 B1 | 3/2003 | Lindquist |
| 6,533,276 B2 | 3/2003 | Soltys et al. |
| 6,533,662 B2 | 3/2003 | Soltys et al. |
| 6,561,897 B1 | 5/2003 | Bourbour et al. |
| 6,568,678 B2 | 5/2003 | Breeding et al. |
| 6,579,180 B2 | 6/2003 | Soltys et al. |
| 6,579,181 B2 | 6/2003 | Soltys et al. |
| 6,581,747 B1 | 6/2003 | Charlier et al. |
| 6,582,301 B2 | 6/2003 | Hill |
| 6,582,302 B2 | 6/2003 | Romero |
| 6,585,586 B1 | 7/2003 | Romero |
| 6,585,588 B2 | 7/2003 | Hartl |
| 6,585,856 B2 | 7/2003 | Zwick et al. |
| 6,588,750 B1 | 7/2003 | Grauzer et al. |
| 6,588,751 B1 | 7/2003 | Grauzer et al. |
| 6,595,857 B2 | 7/2003 | Soltys et al. |
| 6,609,710 B1 | 8/2003 | Order |
| 6,612,928 B1 | 9/2003 | Bradford et al. |
| 6,616,535 B1 | 9/2003 | Nishizaki et al. |
| 6,619,662 B2 | 9/2003 | Miller |
| 6,622,185 B1 | 9/2003 | Johnson |
| 6,626,757 B2 | 9/2003 | Oliveras |
| 6,629,019 B2 | 9/2003 | Legge et al. |
| 6,629,591 B1 | 10/2003 | Griswold et al. |
| 6,629,889 B2 | 10/2003 | Mothwurf |
| 6,629,894 B1 | 10/2003 | Purton |
| 6,637,622 B1 | 10/2003 | Robinson |
| 6,638,161 B2 | 10/2003 | Soltys et al. |
| 6,645,068 B1 | 11/2003 | Kelly et al. |
| 6,645,077 B2 | 11/2003 | Rowe |
| 6,651,981 B2 | 11/2003 | Grauzer et al. |
| 6,651,982 B2 | 11/2003 | Grauzer et al. |
| 6,651,985 B2 | 11/2003 | Sines et al. |
| 6,652,379 B2 | 11/2003 | Soltys et al. |
| 6,655,684 B2 | 12/2003 | Grauzer et al. |
| 6,655,690 B2 | 12/2003 | Oskwarek |
| 6,658,135 B1 | 12/2003 | Morito et al. |
| 6,659,460 B2 | 12/2003 | Blaha et al. |
| 6,659,461 B2 | 12/2003 | Yoseloff et al. |
| 6,659,875 B2 | 12/2003 | Purton |
| 6,663,490 B2 | 12/2003 | Soltys et al. |
| 6,666,768 B1 | 12/2003 | Akers |
| 6,671,358 B1 | 12/2003 | Seidman et al. |
| 6,676,127 B2 | 1/2004 | Johnson et al. |
| 6,676,517 B2 | 1/2004 | Beavers |
| 6,680,843 B2 | 1/2004 | Farrow et al. |
| 6,685,564 B2 | 2/2004 | Oliver |
| 6,685,567 B2 | 2/2004 | Cockerille et al. |
| 6,685,568 B2 | 2/2004 | Soltys et al. |
| 6,688,597 B2 | 2/2004 | Jones |
| 6,688,979 B2 | 2/2004 | Soltys et al. |
| 6,690,673 B1 | 2/2004 | Jarvis |
| 6,698,756 B1 | 3/2004 | Baker et al. |
| 6,698,759 B2 | 3/2004 | Webb et al. |
| 6,702,289 B1 | 3/2004 | Feola |
| 6,702,290 B2 | 3/2004 | Buono-Correa et al. |
| 6,709,333 B1 | 3/2004 | Bradford et al. |
| 6,712,696 B2 | 3/2004 | Soltys et al. |
| 6,719,288 B2 | 4/2004 | Hessing et al. |
| 6,719,634 B2 | 4/2004 | Mishina et al. |
| 6,722,974 B2 | 4/2004 | Sines et al. |
| 6,726,205 B1 | 4/2004 | Purton |
| 6,732,067 B1 | 5/2004 | Powderly |
| 6,733,012 B2 | 5/2004 | Bui et al. |
| 6,733,388 B2 | 5/2004 | Mothwurf |
| 6,746,333 B1 | 6/2004 | Onda et al. |
| 6,747,560 B2 | 6/2004 | Stevens, III |
| 6,749,510 B2 | 6/2004 | Giobbi |
| 6,758,751 B2 | 7/2004 | Soltys et al. |
| 6,758,757 B2 | 7/2004 | Luciano, Jr. et al. |
| 6,769,693 B2 | 8/2004 | Huard et al. |
| 6,774,782 B2 | 8/2004 | Runyon et al. |
| 6,789,801 B2 | 9/2004 | Snow |
| 6,802,510 B1 | 10/2004 | Haber |
| 6,804,763 B1 | 10/2004 | Stockdale et al. |
| 6,808,173 B2 | 10/2004 | Snow |
| 6,827,282 B2 | 12/2004 | Silverbrook |
| 6,834,251 B1 | 12/2004 | Fletcher |
| 6,840,517 B2 | 1/2005 | Snow |
| 6,842,263 B1 | 1/2005 | Saeki |
| 6,843,725 B2 | 1/2005 | Nelson |
| 6,848,616 B2 | 2/2005 | Tsirline et al. |
| 6,848,844 B2 | 2/2005 | McCue, Jr. et al. |
| 6,848,994 B1 | 2/2005 | Knust et al. |
| 6,857,961 B2 | 2/2005 | Soltys et al. |
| 6,874,784 B1 | 4/2005 | Promutico |
| 6,874,786 B2 | 4/2005 | Bruno |
| 6,877,657 B2 | 4/2005 | Ranard et al. |
| 6,877,748 B1 | 4/2005 | Patroni |
| 6,886,829 B2 | 5/2005 | Hessing et al. |
| 6,889,979 B2 | 5/2005 | Blaha et al. |
| 6,893,347 B1 | 5/2005 | Zilliacus et al. |
| 6,899,628 B2 | 5/2005 | Leen et al. |
| 6,902,167 B2 | 6/2005 | Webb |
| 6,905,121 B1 | 6/2005 | Timpano |
| 6,923,446 B2 | 8/2005 | Snow |
| 6,938,900 B2 | 9/2005 | Snow |
| 6,941,180 B1 | 9/2005 | Fischer et al. |
| 6,950,948 B2 | 9/2005 | Neff |
| 6,955,599 B2 | 10/2005 | Bourbour et al. |
| 6,957,746 B2 | 10/2005 | Martin et al. |
| 6,959,925 B1 | 11/2005 | Baker et al. |
| 6,959,935 B2 | 11/2005 | Buhl et al. |
| 6,960,134 B2 | 11/2005 | Hartl et al. |
| 6,964,612 B2 | 11/2005 | Soltys et al. |
| 6,986,514 B2 | 1/2006 | Snow |
| 6,988,516 B2 | 1/2006 | Debaes et al. |
| 7,011,309 B2 | 3/2006 | Soltys et al. |

(56) References Cited

U.S. PATENT DOCUMENTS

| | | | |
|---|---|---|---|
| 7,020,307 | B2 | 3/2006 | Hinton et al. |
| 7,028,598 | B2 | 4/2006 | Teshima |
| 7,029,009 | B2 | 4/2006 | Grauzer et al. |
| 7,036,818 | B2 | 5/2006 | Grauzer et al. |
| 7,046,458 | B2 | 5/2006 | Nakayama |
| 7,046,764 | B1 | 5/2006 | Kump |
| 7,048,629 | B2 | 5/2006 | Sines et al. |
| 7,059,602 | B2 | 6/2006 | Grauzer et al. |
| 7,066,464 | B2 | 6/2006 | Blad et al. |
| 7,068,822 | B2 | 6/2006 | Scott |
| 7,073,791 | B2 | 7/2006 | Grauzer et al. |
| 7,084,769 | B2 | 8/2006 | Bauer et al. |
| 7,089,420 | B1 | 8/2006 | Durst et al. |
| 7,106,201 | B2 | 9/2006 | Tuttle |
| 7,113,094 | B2 | 9/2006 | Garber et al. |
| 7,114,718 | B2 | 10/2006 | Grauzer et al. |
| 7,124,947 | B2 | 10/2006 | Storch |
| 7,128,652 | B1 | 10/2006 | Lavoie et al. |
| 7,128,652 | B1 | 10/2006 | Lavoie et al. |
| 7,137,627 | B2 | 11/2006 | Grauzer et al. |
| 7,139,108 | B2 | 11/2006 | Andersen et al. |
| 7,140,614 | B2 | 11/2006 | Snow |
| 7,162,035 | B1 | 1/2007 | Durst et al. |
| 7,165,769 | B2 | 1/2007 | Crenshaw et al. |
| 7,165,770 | B2 | 1/2007 | Snow |
| 7,175,522 | B2 | 2/2007 | Hartl |
| 7,186,181 | B2 | 3/2007 | Rowe |
| 7,201,656 | B2 | 4/2007 | Darder |
| 7,202,888 | B2 | 4/2007 | Tecu et al. |
| 7,203,841 | B2 | 4/2007 | Jackson et al. |
| 7,213,812 | B2 | 5/2007 | Schubert et al. |
| 7,222,852 | B2 | 5/2007 | Soltys et al. |
| 7,222,855 | B2 | 5/2007 | Sorge |
| 7,231,812 | B1 | 6/2007 | Lagare |
| 7,234,698 | B2 | 6/2007 | Grauzer et al. |
| 7,237,969 | B2 | 7/2007 | Bartman |
| 7,243,148 | B2 | 7/2007 | Keir et al. |
| 7,243,698 | B2 | 7/2007 | Siegel |
| 7,246,799 | B2 | 7/2007 | Snow |
| 7,255,344 | B2 | 8/2007 | Grauzer et al. |
| 7,255,351 | B2 | 8/2007 | Yoseloff et al. |
| 7,255,642 | B2 | 8/2007 | Sines et al. |
| 7,257,630 | B2 | 8/2007 | Cole et al. |
| 7,261,294 | B2 | 8/2007 | Grauzer et al. |
| 7,264,241 | B2 | 9/2007 | Schubert et al. |
| 7,264,243 | B2 | 9/2007 | Yoseloff et al. |
| 7,277,570 | B2 | 10/2007 | Armstrong |
| 7,278,923 | B2 | 10/2007 | Grauzer et al. |
| 7,294,056 | B2 | 11/2007 | Lowell et al. |
| 7,297,062 | B2 | 11/2007 | Gatto et al. |
| 7,300,056 | B2 | 11/2007 | Gioia et al. |
| 7,303,473 | B2 | 12/2007 | Rowe |
| 7,309,065 | B2 | 12/2007 | Yoseloff et al. |
| 7,316,609 | B2 | 1/2008 | Dunn et al. |
| 7,316,615 | B2 | 1/2008 | Soltys et al. |
| 7,322,576 | B2 | 1/2008 | Grauzer et al. |
| 7,331,579 | B2 | 2/2008 | Snow |
| 7,334,794 | B2 | 2/2008 | Snow |
| 7,338,044 | B2 | 3/2008 | Grauzer et al. |
| 7,338,362 | B1 | 3/2008 | Gallagher |
| 7,341,510 | B2 | 3/2008 | Bourbour et al. |
| 7,357,321 | B2 | 4/2008 | Yoshida et al. |
| 7,360,094 | B2 | 4/2008 | Neff |
| 7,367,561 | B2 | 5/2008 | Blaha et al. |
| 7,367,563 | B2 | 5/2008 | Yoseloff et al. |
| 7,367,884 | B2 | 5/2008 | Breeding et al. |
| 7,374,170 | B2 | 5/2008 | Grauzer et al. |
| 7,384,044 | B2 | 6/2008 | Grauzer et al. |
| 7,387,300 | B2 | 6/2008 | Snow |
| 7,389,990 | B2 | 6/2008 | Mourad |
| 7,390,256 | B2 | 6/2008 | Soltys et al. |
| 7,399,226 | B2 | 7/2008 | Mishra |
| 7,407,438 | B2 | 8/2008 | Schubert et al. |
| 7,413,191 | B2 | 8/2008 | Grauzer et al. |
| 7,434,805 | B2 | 10/2008 | Grauzer et al. |
| 7,436,957 | B1 | 10/2008 | Fischer et al. |
| 7,448,626 | B2 | 11/2008 | Fleckenstein |
| 7,458,582 | B2 | 12/2008 | Snow et al. |
| 7,461,843 | B1 | 12/2008 | Baker et al. |
| 7,464,932 | B2 | 12/2008 | Darling |
| 7,464,934 | B2 | 12/2008 | Schwartz |
| 7,472,906 | B2 | 1/2009 | Shai |
| 7,500,672 | B2 | 3/2009 | Ho |
| 7,506,874 | B2 | 3/2009 | Hall |
| 7,510,186 | B2 | 3/2009 | Fleckenstein |
| 7,510,190 | B2 | 3/2009 | Snow et al. |
| 7,510,194 | B2 | 3/2009 | Soltys et al. |
| 7,510,478 | B2 | 3/2009 | Benbrahim et al. |
| 7,513,437 | B2 | 4/2009 | Douglas |
| 7,515,718 | B2 | 4/2009 | Nguyen et al. |
| 7,523,935 | B2 | 4/2009 | Grauzer et al. |
| 7,523,936 | B2 | 4/2009 | Grauzer et al. |
| 7,523,937 | B2 | 4/2009 | Fleckenstein |
| 7,525,510 | B2 | 4/2009 | Beland et al. |
| 7,537,216 | B2 | 5/2009 | Soltys et al. |
| 7,540,497 | B2 | 6/2009 | Tseng |
| 7,540,498 | B2 | 6/2009 | Crenshaw et al. |
| 7,549,643 | B2 | 6/2009 | Quach |
| 7,554,753 | B2 | 6/2009 | Wakamiya |
| 7,556,197 | B2 | 7/2009 | Yoshida et al. |
| 7,556,266 | B2 | 7/2009 | Blaha et al. |
| 7,575,237 | B2 | 8/2009 | Snow |
| 7,578,506 | B2 | 8/2009 | Lambert |
| 7,584,962 | B2 | 9/2009 | Breeding et al. |
| 7,584,963 | B2 | 9/2009 | Krenn et al. |
| 7,584,966 | B2 | 9/2009 | Snow |
| 7,591,728 | B2 | 9/2009 | Gioia et al. |
| 7,593,544 | B2 | 9/2009 | Downs, III et al. |
| 7,594,660 | B2 | 9/2009 | Baker et al. |
| 7,597,623 | B2 | 10/2009 | Grauzer et al. |
| 7,644,923 | B1 | 1/2010 | Dickinson et al. |
| 7,661,676 | B2 | 2/2010 | Smith et al. |
| 7,666,090 | B2 | 2/2010 | Hettinger |
| 7,669,852 | B2 | 3/2010 | Baker et al. |
| 7,669,853 | B2 | 3/2010 | Jones |
| 7,677,565 | B2 | 3/2010 | Grauzer et al. |
| 7,677,566 | B2 | 3/2010 | Krenn et al. |
| 7,686,681 | B2 | 3/2010 | Soltys et al. |
| 7,699,694 | B2 | 4/2010 | Hill |
| 7,735,657 | B2 | 6/2010 | Johnson |
| 7,740,244 | B2 | 6/2010 | Ho |
| 7,744,452 | B2 | 6/2010 | Cimring et al. |
| 7,753,373 | B2 | 7/2010 | Grauzer et al. |
| 7,753,374 | B2 | 7/2010 | Ho |
| 7,753,798 | B2 | 7/2010 | Soltys et al. |
| 7,762,554 | B2 | 7/2010 | Ho |
| 7,764,836 | B2 | 7/2010 | Downs, III et al. |
| 7,766,332 | B2 | 8/2010 | Grauzer et al. |
| 7,766,333 | B1 | 8/2010 | Stardust et al. |
| 7,769,232 | B2 | 8/2010 | Downs, III |
| 7,769,853 | B2 | 8/2010 | Nezamzadeh |
| 7,773,749 | B1 | 8/2010 | Durst et al. |
| 7,780,529 | B2 | 8/2010 | Rowe et al. |
| 7,784,790 | B2 | 8/2010 | Grauzer et al. |
| 7,804,982 | B2 | 9/2010 | Howard et al. |
| 7,846,020 | B2 | 12/2010 | Walker et al. |
| 7,867,080 | B2 | 1/2011 | Nicely et al. |
| 7,890,365 | B2 | 2/2011 | Hettinger |
| 7,900,923 | B2 | 3/2011 | Toyama et al. |
| 7,901,285 | B2 | 3/2011 | Tran et al. |
| 7,908,169 | B2 | 3/2011 | Hettinger |
| 7,909,689 | B2 | 3/2011 | Lardie |
| 7,931,533 | B2 | 4/2011 | LeMay et al. |
| 7,933,448 | B2 | 4/2011 | Downs, III |
| 7,946,586 | B2 | 5/2011 | Krenn et al. |
| 7,967,294 | B2 | 6/2011 | Blaha et al. |
| 7,976,023 | B1 | 7/2011 | Hessing et al. |
| 7,988,152 | B2 | 8/2011 | Sines |
| 7,988,554 | B2 | 8/2011 | LeMay et al. |
| 7,995,196 | B1 | 8/2011 | Fraser |
| 8,002,638 | B2 | 8/2011 | Grauzer et al. |
| 8,011,661 | B2 | 9/2011 | Stasson |
| 8,016,663 | B2 | 9/2011 | Soltys et al. |
| 8,021,231 | B2 | 9/2011 | Walker et al. |
| 8,025,294 | B2 | 9/2011 | Grauzer et al. |

(56) References Cited

U.S. PATENT DOCUMENTS

| | | |
|---|---|---|
| 8,038,521 B2 | 10/2011 | Grauzer et al. |
| RE42,944 E | 11/2011 | Blaha et al. |
| 8,057,302 B2 | 11/2011 | Wells et al. |
| 8,062,134 B2 | 11/2011 | Kelly et al. |
| 8,070,574 B2 | 12/2011 | Grauzer et al. |
| 8,092,307 B2 | 1/2012 | Kelly |
| 8,092,309 B2 | 1/2012 | Bickley |
| 8,141,875 B2 | 3/2012 | Grauzer et al. |
| 8,150,158 B2 | 4/2012 | Downs, III |
| 8,171,567 B1 | 5/2012 | Fraser et al. |
| 8,210,536 B2 | 7/2012 | Blaha et al. |
| 8,221,244 B2 | 7/2012 | French |
| 8,251,293 B2 | 8/2012 | Nagata et al. |
| 8,267,404 B2 | 9/2012 | Grauzer et al. |
| 8,270,603 B1 | 9/2012 | Durst et al. |
| 8,287,347 B2 | 10/2012 | Snow et al. |
| 8,287,386 B2 | 10/2012 | Miller et al. |
| 8,319,666 B2 | 11/2012 | Weinmann et al. |
| 8,337,296 B2 | 12/2012 | Grauzer et al. |
| 8,342,525 B2 | 1/2013 | Scheper et al. |
| 8,342,526 B1 | 1/2013 | Sampson et al. |
| 8,342,529 B2 | 1/2013 | Snow |
| 8,353,513 B2 | 1/2013 | Swanson |
| 8,381,918 B2 | 2/2013 | Johnson |
| 8,419,521 B2 | 4/2013 | Grauzer et al. |
| 8,444,147 B2 | 5/2013 | Grauzer et al. |
| 8,469,360 B2 | 6/2013 | Sines |
| 8,480,088 B2 | 7/2013 | Toyama et al. |
| 8,485,527 B2 | 7/2013 | Sampson et al. |
| 8,490,973 B2 | 7/2013 | Yoseloff et al. |
| 8,498,444 B2 | 7/2013 | Sharma |
| 8,505,916 B2 | 8/2013 | Grauzer et al. |
| 8,511,684 B2 | 8/2013 | Grauzer et al. |
| 8,556,263 B2 | 10/2013 | Grauzer et al. |
| 8,579,289 B2 | 11/2013 | Rynda et al. |
| 8,616,552 B2 | 12/2013 | Czyzewski et al. |
| 8,628,086 B2 | 1/2014 | Krenn et al. |
| 8,662,500 B2 | 3/2014 | Swanson |
| 8,695,978 B1 | 4/2014 | Ho |
| 8,702,100 B2 | 4/2014 | Snow et al. |
| 8,702,101 B2 | 4/2014 | Scheper et al. |
| 8,720,891 B2 | 5/2014 | Hessing et al. |
| 8,758,111 B2 | 6/2014 | Lutnick |
| 8,777,710 B2 | 7/2014 | Grauzer et al. |
| 8,820,745 B2 | 9/2014 | Grauzer et al. |
| 8,899,587 B2 | 12/2014 | Grauzer et al. |
| 8,919,775 B2 | 12/2014 | Wadds et al. |
| 2001/0036231 A1 | 11/2001 | Easwar et al. |
| 2001/0036866 A1 | 11/2001 | Stockdale et al. |
| 2002/0017481 A1 | 2/2002 | Johnson et al. |
| 2002/0030425 A1 | 3/2002 | Tiramani et al. |
| 2002/0045478 A1 | 4/2002 | Soltys et al. |
| 2002/0045481 A1 | 4/2002 | Soltys et al. |
| 2002/0063389 A1 | 5/2002 | Breeding et al. |
| 2002/0068635 A1 | 6/2002 | Hill |
| 2002/0070499 A1 | 6/2002 | Breeding et al. |
| 2002/0094869 A1 | 7/2002 | Harkham |
| 2002/0107067 A1 | 8/2002 | McGlone et al. |
| 2002/0107072 A1 | 8/2002 | Giobbi |
| 2002/0113368 A1 | 8/2002 | Hessing et al. |
| 2002/0135692 A1 | 9/2002 | Fujinawa |
| 2002/0142820 A1 | 10/2002 | Bartlett |
| 2002/0155869 A1 | 10/2002 | Soltys et al. |
| 2002/0163125 A1 | 11/2002 | Grauzer et al. |
| 2002/0187821 A1 | 12/2002 | Soltys et al. |
| 2002/0187830 A1 | 12/2002 | Stockdale et al. |
| 2003/0003997 A1 | 1/2003 | Vuong et al. |
| 2003/0007143 A1 | 1/2003 | McArthur et al. |
| 2003/0047870 A1 | 3/2003 | Blaha et al. |
| 2003/0048476 A1 | 3/2003 | Yamakawa |
| 2003/0052449 A1 | 3/2003 | Grauzer et al. |
| 2003/0052450 A1 | 3/2003 | Grauzer et al. |
| 2003/0064798 A1 | 4/2003 | Grauzer et al. |
| 2003/0067112 A1 | 4/2003 | Grauzer et al. |
| 2003/0071413 A1 | 4/2003 | Blaha et al. |
| 2003/0073498 A1 | 4/2003 | Grauzer et al. |
| 2003/0075865 A1 | 4/2003 | Grauzer et al. |
| 2003/0075866 A1 | 4/2003 | Blaha et al. |
| 2003/0087694 A1 | 5/2003 | Storch |
| 2003/0090059 A1 | 5/2003 | Grauzer et al. |
| 2003/0094756 A1 | 5/2003 | Grauzer et al. |
| 2003/0151194 A1 | 8/2003 | Hessing et al. |
| 2003/0195025 A1 | 10/2003 | Hill |
| 2004/0015423 A1 | 1/2004 | Walker et al. |
| 2004/0036214 A1 | 2/2004 | Baker et al. |
| 2004/0067789 A1 | 4/2004 | Grauzer et al. |
| 2004/0100026 A1 | 5/2004 | Haggard |
| 2004/0108654 A1 | 6/2004 | Grauzer et al. |
| 2004/0116179 A1 | 6/2004 | Nicely et al. |
| 2004/0169332 A1 | 9/2004 | Grauzer et al. |
| 2004/0180722 A1 | 9/2004 | Giobbi |
| 2004/0224777 A1 | 11/2004 | Smith et al. |
| 2004/0245720 A1 | 12/2004 | Grauzer et al. |
| 2004/0259618 A1 | 12/2004 | Soltys et al. |
| 2005/0012671 A1 | 1/2005 | Bisig |
| 2005/0023752 A1 | 2/2005 | Grauzer et al. |
| 2005/0026680 A1 | 2/2005 | Gururajan |
| 2005/0035548 A1 | 2/2005 | Yoseloff et al. |
| 2005/0037843 A1 | 2/2005 | Wells et al. |
| 2005/0040594 A1 | 2/2005 | Krenn et al. |
| 2005/0051955 A1 | 3/2005 | Schubert et al. |
| 2005/0051956 A1 | 3/2005 | Grauzer et al. |
| 2005/0062227 A1 | 3/2005 | Grauzer et al. |
| 2005/0062228 A1 | 3/2005 | Grauzer et al. |
| 2005/0062229 A1 | 3/2005 | Grauzer et al. |
| 2005/0082750 A1 | 4/2005 | Grauzer et al. |
| 2005/0093231 A1 | 5/2005 | Grauzer et al. |
| 2005/0104289 A1 | 5/2005 | Grauzer et al. |
| 2005/0104290 A1 | 5/2005 | Grauzer et al. |
| 2005/0110210 A1 | 5/2005 | Soltys et al. |
| 2005/0113166 A1 | 5/2005 | Grauzer et al. |
| 2005/0113171 A1 | 5/2005 | Hodgson |
| 2005/0119048 A1 | 6/2005 | Soltys et al. |
| 2005/0137005 A1 | 6/2005 | Soltys et al. |
| 2005/0140090 A1 | 6/2005 | Breeding et al. |
| 2005/0146093 A1 | 7/2005 | Grauzer et al. |
| 2005/0148391 A1 | 7/2005 | Tain |
| 2005/0192092 A1 | 9/2005 | Breckner et al. |
| 2005/0206077 A1 | 9/2005 | Grauzer et al. |
| 2005/0242500 A1 | 11/2005 | Downs |
| 2005/0272501 A1 | 12/2005 | Tran et al. |
| 2005/0288083 A1 | 12/2005 | Downs |
| 2005/0288086 A1 | 12/2005 | Schubert et al. |
| 2006/0027970 A1 | 2/2006 | Kyrychenko |
| 2006/0033269 A1 | 2/2006 | Grauzer et al. |
| 2006/0033270 A1 | 2/2006 | Grauzer et al. |
| 2006/0046853 A1 | 3/2006 | Black |
| 2006/0063577 A1 | 3/2006 | Downs et al. |
| 2006/0066048 A1 | 3/2006 | Krenn et al. |
| 2006/0181022 A1 | 8/2006 | Grauzer et al. |
| 2006/0183540 A1 | 8/2006 | Grauzer et al. |
| 2006/0189381 A1 | 8/2006 | Daniel et al. |
| 2006/0199649 A1 | 9/2006 | Soltys et al. |
| 2006/0205508 A1 | 9/2006 | Green |
| 2006/0220312 A1 | 10/2006 | Baker et al. |
| 2006/0220313 A1 | 10/2006 | Baker et al. |
| 2006/0252521 A1 | 11/2006 | Gururajan et al. |
| 2006/0252554 A1 | 11/2006 | Gururajan et al. |
| 2006/0279040 A1 | 12/2006 | Downs et al. |
| 2006/0281534 A1 | 12/2006 | Grauzer et al. |
| 2007/0001395 A1 | 1/2007 | Gioia et al. |
| 2007/0006708 A1 | 1/2007 | Laakso |
| 2007/0015583 A1 | 1/2007 | Tran |
| 2007/0018389 A1 | 1/2007 | Downs |
| 2007/0045959 A1 | 3/2007 | Soltys |
| 2007/0049368 A1 | 3/2007 | Kuhn et al. |
| 2007/0057469 A1 | 3/2007 | Grauzer et al. |
| 2007/0066387 A1 | 3/2007 | Matsuno et al. |
| 2007/0069462 A1 | 3/2007 | Downs et al. |
| 2007/0072677 A1 | 3/2007 | Lavoie et al. |
| 2007/0102879 A1 | 5/2007 | Stasson |
| 2007/0111773 A1 | 5/2007 | Gururajan et al. |
| 2007/0184905 A1 | 8/2007 | Gatto et al. |
| 2007/0197294 A1 | 8/2007 | Gong |

(56) References Cited

U.S. PATENT DOCUMENTS

| | | |
|---|---|---|
| 2007/0197298 A1 | 8/2007 | Rowe |
| 2007/0202941 A1 | 8/2007 | Miltenberger et al. |
| 2007/0222147 A1 | 9/2007 | Blaha et al. |
| 2007/0225055 A1 | 9/2007 | Weisman |
| 2007/0233567 A1 | 10/2007 | Daly |
| 2007/0238506 A1 | 10/2007 | Ruckle |
| 2007/0259709 A1 | 11/2007 | Kelly et al. |
| 2007/0267812 A1 | 11/2007 | Grauzer et al. |
| 2007/0272600 A1 | 11/2007 | Johnson |
| 2007/0278739 A1 | 12/2007 | Swanson |
| 2007/0290438 A1 | 12/2007 | Grauzer et al. |
| 2008/0006997 A1 | 1/2008 | Scheper et al. |
| 2008/0006998 A1 | 1/2008 | Grauzer et al. |
| 2008/0022415 A1 | 1/2008 | Kuo et al. |
| 2008/0032763 A1 | 2/2008 | Giobbi |
| 2008/0039192 A1 | 2/2008 | Laut |
| 2008/0039208 A1 | 2/2008 | Abrink et al. |
| 2008/0096656 A1 | 4/2008 | LeMay et al. |
| 2008/0111300 A1 | 5/2008 | Czyzewski et al. |
| 2008/0113700 A1 | 5/2008 | Czyzewski et al. |
| 2008/0113783 A1 | 5/2008 | Czyzewski et al. |
| 2008/0136108 A1 | 6/2008 | Polay |
| 2008/0143048 A1 | 6/2008 | Shigeta |
| 2008/0176627 A1 | 7/2008 | Lardie |
| 2008/0217218 A1 | 9/2008 | Johnson |
| 2008/0234046 A1 | 9/2008 | Kinsley |
| 2008/0234047 A1 | 9/2008 | Nguyen |
| 2008/0248875 A1 | 10/2008 | Beatty |
| 2008/0284096 A1 | 11/2008 | Toyama et al. |
| 2008/0303210 A1 | 12/2008 | Grauzer et al. |
| 2008/0315517 A1 | 12/2008 | Toyama |
| 2009/0026700 A2 | 1/2009 | Shigeta |
| 2009/0048026 A1 | 2/2009 | French |
| 2009/0054161 A1 | 2/2009 | Schubert et al. |
| 2009/0072477 A1 | 3/2009 | Tseng |
| 2009/0091078 A1 | 4/2009 | Grauzer et al. |
| 2009/0100409 A1 | 4/2009 | Toneguzzo |
| 2009/0104963 A1 | 4/2009 | Burman |
| 2009/0121429 A1 | 5/2009 | Walsh |
| 2009/0140492 A1 | 6/2009 | Yoseloff et al. |
| 2009/0166970 A1 | 7/2009 | Rosh |
| 2009/0176547 A1 | 7/2009 | Katz |
| 2009/0179378 A1 | 7/2009 | Amaitis et al. |
| 2009/0186676 A1 | 7/2009 | Amaitis et al. |
| 2009/0189346 A1 | 7/2009 | Krenn et al. |
| 2009/0191933 A1 | 7/2009 | French |
| 2009/0194988 A1 | 8/2009 | Wright et al. |
| 2009/0197662 A1 | 8/2009 | Wright et al. |
| 2009/0224476 A1 | 9/2009 | Grauzer et al. |
| 2009/0227318 A1 | 9/2009 | Wright et al. |
| 2009/0227360 A1 | 9/2009 | Gioia et al. |
| 2009/0250873 A1 | 10/2009 | Jones |
| 2009/0253478 A1 | 10/2009 | Walker et al. |
| 2009/0253503 A1 | 10/2009 | Krise et al. |
| 2009/0267296 A1 | 10/2009 | Ho |
| 2009/0267297 A1 | 10/2009 | Blaha et al. |
| 2009/0283969 A1 | 11/2009 | Tseng |
| 2009/0298577 A1 | 12/2009 | Gagner et al. |
| 2009/0302535 A1 | 12/2009 | Ho |
| 2009/0302537 A1 | 12/2009 | Ho |
| 2009/0312093 A1 | 12/2009 | Walker et al. |
| 2009/0314188 A1 | 12/2009 | Toyama et al. |
| 2010/0013152 A1 | 1/2010 | Grauzer et al. |
| 2010/0038849 A1 | 2/2010 | Scheper et al. |
| 2010/0048304 A1 | 2/2010 | Boesen |
| 2010/0069155 A1 | 3/2010 | Schwartz et al. |
| 2010/0178987 A1 | 7/2010 | Pacey |
| 2010/0197410 A1 | 8/2010 | Leen et al. |
| 2010/0234110 A1 | 9/2010 | Clarkson |
| 2010/0240440 A1 | 9/2010 | Szrek et al. |
| 2010/0244376 A1 | 9/2010 | Johnson |
| 2010/0244382 A1 | 9/2010 | Snow |
| 2010/0252992 A1 | 10/2010 | Sines |
| 2010/0255899 A1 | 10/2010 | Paulsen |
| 2010/0276880 A1 | 11/2010 | Grauzer et al. |
| 2010/0311493 A1 | 12/2010 | Miller et al. |
| 2010/0311494 A1 | 12/2010 | Miller et al. |
| 2010/0314830 A1 | 12/2010 | Grauzer et al. |
| 2010/0320685 A1 | 12/2010 | Grauzer et al. |
| 2011/0006480 A1 | 1/2011 | Grauzer et al. |
| 2011/0012303 A1 | 1/2011 | Kourgiantakis et al. |
| 2011/0024981 A1 | 2/2011 | Tseng |
| 2011/0052049 A1 | 3/2011 | Rajaraman et al. |
| 2011/0062662 A1 | 3/2011 | Ohta et al. |
| 2011/0078096 A1 | 3/2011 | Bounds |
| 2011/0105208 A1 | 5/2011 | Bickley |
| 2011/0109042 A1 | 5/2011 | Rynda et al. |
| 2011/0130185 A1 | 6/2011 | Walker |
| 2011/0130190 A1 | 6/2011 | Hamman et al. |
| 2011/0159952 A1 | 6/2011 | Kerr |
| 2011/0159953 A1 | 6/2011 | Kerr |
| 2011/0165936 A1 | 7/2011 | Kerr |
| 2011/0172008 A1 | 7/2011 | Alderucci |
| 2011/0183748 A1 | 7/2011 | Wilson et al. |
| 2011/0230268 A1 | 9/2011 | Williams |
| 2011/0269529 A1 | 11/2011 | Baerlocher |
| 2011/0272881 A1 | 11/2011 | Sines |
| 2011/0285081 A1 | 11/2011 | Stasson |
| 2011/0287829 A1 | 11/2011 | Clarkson et al. |
| 2012/0015724 A1 | 1/2012 | Ocko et al. |
| 2012/0015725 A1 | 1/2012 | Ocko et al. |
| 2012/0015743 A1 | 1/2012 | Lam et al. |
| 2012/0015747 A1 | 1/2012 | Ocko et al. |
| 2012/0021835 A1 | 1/2012 | Keller et al. |
| 2012/0034977 A1 | 2/2012 | Kammler |
| 2012/0062745 A1 | 3/2012 | Han et al. |
| 2012/0074646 A1 | 3/2012 | Grauzer et al. |
| 2012/0091656 A1 | 4/2012 | Blaha et al. |
| 2012/0095982 A1 | 4/2012 | Lennington et al. |
| 2012/0161393 A1 | 6/2012 | Krenn et al. |
| 2012/0175841 A1 | 7/2012 | Grauzer et al. |
| 2012/0181747 A1 | 7/2012 | Grauzer et al. |
| 2012/0187625 A1 | 7/2012 | Downs, III et al. |
| 2012/0242782 A1 | 9/2012 | Huang |
| 2012/0286471 A1 | 11/2012 | Grauzer et al. |
| 2012/0306152 A1 | 12/2012 | Krishnamurty et al. |
| 2013/0020761 A1 | 1/2013 | Sines et al. |
| 2013/0085638 A1 | 4/2013 | Weinmann et al. |
| 2013/0099448 A1 | 4/2013 | Scheper et al. |
| 2013/0109455 A1 | 5/2013 | Grauzer et al. |
| 2013/0132306 A1 | 5/2013 | Kami et al. |
| 2013/0228972 A1 | 9/2013 | Grauzer et al. |
| 2013/0300059 A1 | 11/2013 | Sampson et al. |
| 2013/0337922 A1 | 12/2013 | Kuhn |
| 2014/0027979 A1 | 1/2014 | Stasson et al. |
| 2014/0094239 A1 | 4/2014 | Grauzer et al. |
| 2014/0103606 A1 | 4/2014 | Grauzer et al. |
| 2014/0138907 A1 | 5/2014 | Rynda et al. |
| 2014/0145399 A1 | 5/2014 | Krenn et al. |
| 2014/0171170 A1 | 6/2014 | Krishnamurty et al. |
| 2014/0175724 A1 | 6/2014 | Huhtala et al. |
| 2014/0183818 A1 | 7/2014 | Czyzewski et al. |
| 2015/0021242 A1 | 1/2015 | Johnson |
| 2015/0069699 A1 | 3/2015 | Blazevic |

FOREIGN PATENT DOCUMENTS

| | | |
|---|---|---|
| CA | 2266555 A1 | 4/1998 |
| CA | 2284017 A1 | 9/1998 |
| CA | 2612138 | 12/2006 |
| CN | 101127131 | 2/2008 |
| CN | 201139926 Y | 10/2008 |
| CZ | 24952 U1 | 2/2013 |
| DE | 672616 C | 3/1939 |
| DE | 2757341 A1 | 6/1978 |
| DE | 3807127 A1 | 9/1989 |
| EP | 777514 A1 | 2/2000 |
| EP | 1194888 A1 | 4/2002 |
| EP | 1502631 A1 | 2/2005 |
| EP | 1713026 A1 | 10/2006 |
| EP | 1575261 B1 | 8/2012 |
| FR | 2375918 A1 | 7/1978 |
| GB | 337147 A | 10/1930 |
| GB | 414014 A | 7/1934 |

(56) References Cited

FOREIGN PATENT DOCUMENTS

| | | |
|---|---|---|
| JP | 10063933 A | 3/1998 |
| JP | 11045321 A | 2/1999 |
| JP | 2000251031 A | 9/2000 |
| JP | 2001327647 A | 11/2001 |
| JP | 2002165916 A | 6/2002 |
| JP | 2003250950 A | 9/2003 |
| JP | 2005198668 A | 7/2005 |
| JP | 2008246061 A | 10/2008 |
| WO | 87/00764 | 2/1987 |
| WO | 9221413 A1 | 12/1992 |
| WO | 9528210 A1 | 10/1995 |
| WO | 9607153 A1 | 3/1996 |
| WO | 9710577 A1 | 3/1997 |
| WO | 9814249 A1 | 4/1998 |
| WO | 98/40136 | 9/1998 |
| WO | 9943404 | 9/1999 |
| WO | 9952610 A1 | 10/1999 |
| WO | 9952611 A1 | 10/1999 |
| WO | 00/51076 | 8/2000 |
| WO | 0156670 A1 | 8/2001 |
| WO | 0205914 A1 | 1/2002 |
| WO | 2004067889 A1 | 8/2004 |
| WO | 2004112923 A1 | 12/2004 |
| WO | 2006031472 A2 | 3/2006 |
| WO | 2006039308 A2 | 4/2006 |
| WO | 2008005286 A2 | 1/2008 |
| WO | 2008006023 A2 | 1/2008 |
| WO | 2008091809 A2 | 7/2008 |
| WO | 2009137541 A2 | 11/2009 |
| WO | 2010001032 A1 | 1/2010 |
| WO | 2010055328 A1 | 5/2010 |
| WO | 2010117446 A1 | 10/2010 |
| WO | 2013019677 A1 | 2/2013 |

OTHER PUBLICATIONS

Christos Stergiou and Dimitrios Siganos, "Neural Networks," http://www.doc.ic.ac.uk/~nd/surprise_96/journal/vol4/cs11/report.html (13 pages), Dec. 15, 2011.
European Patent Application Search Report—European Patent Application No. 06772987.1, Dec. 21, 2009.
Genevieve Orr, CS-449: Neural Networks Willamette University, http://www.willamette.edu/~gorr/classes/cs449/intro.html (4 pages), Fall 1999.
Litwiller, Dave, CCD vs. CMOS: Facts and Fiction reprinted from Jan. 2001 Issue of Photonics Spectra, Laurin Publishing Co. Inc. (4 pages).
Malasian Patent Application Substantive Examination Adverse Report—Malaysian Patent Application Serial No. PI 20062710, Sep. 6, 2006.
PCT International Search Report and Written Opinion—International Patent Application No. PCT/US2006/22911, Dec. 28, 2006.
Philippines Patent Application Formality Examination Report—Philippines Patent Application No. 1-2006-000302, Jun. 13, 2006.
Press Release for Alliance Gaming Corp., Jul. 26, 2004—Alliance Gaming Announces Contract With Galaxy Macau for New MindPlay Baccarat Table Technology, htto://biz.yahoo.com/prnews.
Scarne's Encyclopedia of Games by John Scarne, 1973, "Super Contract Bridge", p. 153.
Singapore Patent Application Examination Report—Singapore Patent Application No. SE 2008 01914 A Aug. 6, 2006.
Tracking the Tables, by Jack Bularsky, Casino Journal, May 2004, vol. 17, No. 5, pp. 44-47.
"ACE, Single Deck Shuffler," Shuffle Master, Inc., (2005), 2 pages.
"Automatic casino card shuffle," Alibaba.com, (last visited Jul. 22, 2014), 2 pages.
"i-Deal," Bally Technologies, Inc., (2014), 2 pages.
"shufflers—SHFL entertainment," Gaming Concepts Group, (2012), 6 pages.
"TAG Archives: Shuffle Machine," Gee Wiz Online, (Mar. 25, 2013), 4 pages.

1/3' B/W CCD Camera Module EB100 by EverFocus Electronics Corp., Jul. 31, 2001, 3 pgs.
Canadian Office Action for CA 2,580,309 dated Mar. 20, 2012 (6 pages).
http://www.google.com/search?tbm=pts &q=Card+handling+devicve+with+input+and+outpu . . . Jun. 8, 2012.
http://www.google.com/search?tbm=pts &q=shuffling+zone+onOopposite+site+of+input+ . . . Jul. 18, 2012.
PCT International Preliminary Examination Report for corresponding International Application No. PCT/US02/31105 filed Sep. 27, 2002.
PCT International Preliminary Report on Patentability of the International Searching Authority for PCT/US05/31400, dated Oct. 16, 2007, 7 pages.
PCT International Search Report and Written Opinion for International Application No. PCT/US2007/023168, dated Sep. 12, 2008, 8 pages.
PCT International Search Report and Written Opinion for International Application No. PCT/US2007/022858, mailed Apr. 18, 2008, 7 pages.
PCT International Search Report and Written Opinion for PCT/US07/15036, dated Sep. 23, 2008, 3 pages.
PCT International Search Report and Written Opinion for PCT/US07/15035, dated Sep. 29, 2008, 3 pages.
PCT International Search Report and Written Opinion of the International Searching Authority for PCT/GB2011/051978, dated Jan. 17, 2012, 11 pages.
PCT International Search Report and Written Opinion of the International Searching Authority for PCT/IB2013/001756, dated Jan. 10, 2014, 7 pages.
PCT International Search Report and Written Opinion of the International Searching Authority for PCT/US11/59797, dated Mar. 27, 2012, 14 pages.
PCT International Search Report and Written Opinion of the International Searching Authority for PCT/US13/59665, dated Apr. 25, 2014, 21 pages.
PCT International Search Report and Written Opinion of the International Searching Authority for PCT/US2008/007069, dated Sep. 8, 2008, 10 pages.
PCT International Search Report and Written Opinion of the International Searching Authority for PCT/US2010/001032, dated Jun. 16, 2010, 11 pages.
PCT International Search Report and Written Opinion, PCT Application No. PCT/US2013/062391, Dec. 17, 2013, 13 pages.
PCT International Search Report and Written Opinion, PCT/US12/48706, Oct. 16, 2012, 12 pages.
PCT International Search Report for International Application No. PCT/US2003/015393, mailed Oct. 6, 2003.
PCT International Search Report for PCT/US2005/034737 dated Apr. 7, 2006 (WO06/039308).
PCT International Search Report for PCT/US2007/022894, dated Jun. 11, 2008, 2 pages.
PCT International Search Report and Written Opinion of the International Searching Authority for PCT/US05/31400, dated Sep. 25, 2007, 8 pages.
Service Manual/User Manual for Single Deck Shufflers: BG1, BG2 and BG3 by Shuffle Master © 1996.
Shuffle Master Gaming, Service Manual, ACE™ Single Deck Card Shuffler, (1998), 63 pages.
Shuffle Master Gaming, Service Manual, Let It Ride Bonus® With Universal Keypad, 112 pages, © 2000 Shuffle Master, Inc.
Shuffle Master's Reply Memorandum in Support of Shuffle Master's Motion for Preliminary Injunction for *Shuffle Master, Inc.* vs. *VendingData Corporation*, In the U.S. District Court, District of Nevada, No. CV-S-04-1373-JCM-LRL, Nov. 29, 2004.
Specification of Australian Patent Application No. 31577/95, filed Jan. 17, 1995, Applicants: Rodney G. Johnson et al., Title: Card Handling Apparatus.
Specification of Australian Patent Application No. Not Listed, filed Aug. 15, 1994, Applicants: Rodney G. Johnson et al., Title: Card Handling Apparatus.

(56) References Cited

OTHER PUBLICATIONS

Statement of Relevance of Cited References, Submitted as Part of a Third-Party Submission Under 37 CFR 1.290 on Dec. 7, 2012 (12 pages).
tbm=pts&hl=en Google Search for card handling device with storage area, card removing system pivoting arm and processor . . . ; http://www.google.com/?tbrn=pts&hl=en; Jul. 28, 2012.
United States Court of Appeals for the Federal Circuit Decision Decided Dec. 27, 2005 for Preliminary Injuction for *Shuffle Master, Inc.* vs. *VendingData Corporation*, In the U.S. District Court, District of Nevada, No. CV-S-04-1373-JCM-LRL.
VendingData Corporation's Answer and Counterclaim Jury Trial Demanded for *Shuffle Master, Inc.* vs. *VendingData Corporation*, In the U.S. District Court, District of Nevada, No. CV-S-04-1373-JCM-LRL, Oct. 25, 2004.
VendingData Corporation's Opposition to Shuffle Master Inc.'s Motion for Preliminary Injection for *Shuffle Master, Inc.* vs. *VendingData Corporation*, In the U.S. District Court, District of Nevada, No. CV-S-04-1373-JCM-LRL, Nov. 12, 2004.
VendingData Corporation's Responses to Shuffle Master, Inc.'s First set of interrogatories for *Shuffler Master, Inc.* vs. *VendingData Corporation*, In the U.S. District Court, District of Nevada, No. CV-S-04-1373-JCM-LRL, Mar. 14, 2005.
PCT International Search Report and Written Opinion, PCT Application No. PCT/US2015/022158, Jun. 17, 2015, 13 pages.
DVD Labeled "Luciano Decl. Ex. K". This is the video taped live Declaration of Mr. Luciano taken during preparation of litigation (Oct. 23, 2003).
DVD labeled Morrill Decl. Ex. A:. This is the video taped live Declaration of Mr. Robert Morrill, a lead trial counsel for the defense, taken during preparation for litigation. He is describing the operation of the Roblejo Prototype device. See Roblejo patent in 1449 or of record (Jan. 15, 2004).
DVD Labeled "Solberg Decl. Ex. C". Exhibit C to Declaration of Hal Solberg, a witness in litigation, signed Dec. 1, 2003.
DVD labeled "Exhibit 1". This is a video taken by Shuffle Master personnel of the live operation of a CARD One2Six™ Shuffler (Oct. 7, 2003).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 1 of 23 (Master Index and Binder 1, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 2 of 23 (Master Index and Binder 1, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 3 of 23 (Binder 2, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 4 of 23 (Binder 2, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 5 of 23 (Binder 3, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 6 of 23 (Binder 3, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 7 of 23 (Binder 4, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 8 of 23 (Binder 4, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 9 of 23 (Binder 5 having no contents; Binder 6, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 10 of 23 (Binder 6, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 11 of 23 (Binder 7, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 12 of 23 (Binder 7, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 13 of 23 (Binder 8, 1 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 14 of 23 (Binder 8, 2 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 15 of 23 (Binder 8, 3 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 16 of 23 (Binder 8, 4 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 17 of 23 (Binder 8, 5 of 5).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 18 of 23 (color copies from Binder 1).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 19 of 23.
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 20 of 23 (color copies from Binder 4).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, or clarity, Part 21 of 23 (color copies from Binder 6).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 22 of 23 (color copies from Binder 8, part 1 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 23 of 23 (color copies from Binder 8, part 2 of 2).
PCT International Preliminary Report on Patentability—International Patent Application No. PCT/US2006/22911, Dec. 17, 2007 4 pages.

\* cited by examiner

Scratch RAM

Scratch_ram:rank

Scratch_ram:suit (A) Acquired Shape (B) Templates (C) Cross-Correlation Results

Cross-Correlation between "Diamond" and the Templates

CARD SHUFFLING APPARATUS AND CARD HANDLING DEVICE

CROSS-REFERENCE TO RELATED APPLICATIONS

This application is a continuation of U.S. patent application Ser. No. 13/438,193 filed Apr. 3, 2012, now U.S. Pat. No. 8,538,155, issued Sep. 17, 2013, which is a continuation of U.S. patent application Ser. No. 12/842,862, filed Jul. 23, 2010, now U.S. Pat. No. 8,150,157, issued on Apr. 3, 2012, which is a divisional of U.S. patent application Ser. No. 11/488,903, filed Jul. 18, 2006, now U.S. Pat. No. 7,764,836, issued Jul. 27, 2010, which in turn is a continuation-in-part of U.S. patent application Ser. No. 11/484,011, filed Jul. 7, 2006, now U.S. Pat. No. 7,933,448, issued Apr. 26, 2011, which in turn is a continuation-in-part of U.S. patent application Ser. No. 11/417,894, filed May 3, 2006, now U.S. Pat. No. 7,593,544, issued Sep. 22, 2009, which in turn is a continuation-in-part of U.S. patent application Ser. No. 11/152,475, filed Jun. 13, 2005, now U.S. Pat. No. 7,769,232, issued Aug. 3, 2010. The contents of the above-identified disclosures are hereby incorporated by reference.

FIELD OF THE INVENTION

This invention relates to a shuffling and sorting apparatus for providing randomly arranged articles and especially to the shuffling of playing cards for gaming uses. The invention also relates to a method and apparatus for providing randomly shuffled deck(s) of cards in a rapid and efficient manner and a capability of automatically calibrating the apparatus for various card sizes, card thicknesses, and for initial setup and having card reading capability for providing information on card rank and/or card suit on cards within the shuffler. The invention also relates to a device that can verify a set of cards (one or more decks) in a rapid non-randomizing event.

BACKGROUND

In the gaming industry, certain games require that batches of randomly shuffled cards be provided to players and sometimes to dealers in live card games. It is important that the cards are shuffled thoroughly and randomly to prevent players from having an advantage by knowing the position of specific cards or groups of cards in the final arrangement of cards delivered in the play of the game. At the same time, it is advantageous to have the deck(s) shuffled in a very short period of time so that there is minimal down time in the play of the game, and an indication that the group of cards is complete.

U.S. Pat. Nos. 6,139,014 and 6,068,258 to Breeding et al. (assigned to Shuffle Master, Inc.) describe a machine for shuffling multiple decks of playing cards in a batch-type process. The device includes a first vertically extending magazine for holding a stack of unshuffled playing cards, and second and third vertically extending magazines each for holding a stack of cards, the second and third magazines being horizontally spaced from and adjacent to the first magazine. A first card mover is positioned at the top of the first magazine for moving cards from the top of the stack of cards in the first magazine to the second and third magazines to cut the stack of unshuffled playing cards into two unshuffled stacks. Second and third card movers are at the top of the second and third magazines, respectively, for randomly moving cards from the top of the stack of cards in the second and third magazines, respectively, back to the first magazine, thereby interleaving the cards to form a vertically registered stack of shuffled cards in the first magazine. Elevators are provided in the magazines to bring the cards into contact with the card movers. This shuffler design is currently marketed under the name MD-1™ and MD1.1™ by Shuffle Master, Inc. in the United States and abroad.

U.S. Pat. No. 5,676,372 to Sines (assigned to VendingData, Inc.) describes an automated playing card shuffler, comprising: a frame; an unshuffled stack holder for holding an unshuffled stack of playing cards; a shuffled stack receiver for holding a shuffled stack of playing cards; at least one ejector carriage mounted adjacent to the unshuffled stack holder, the at least one ejector carriage and the unshuffled stack holder mounted to provide relative movement between the unshuffled stack holder and the at least one ejector carriage; a plurality of ejectors mounted upon the at least one ejector carriage adjacent the unshuffled stack holder, for ejecting playing cards from the unshuffled stack, the ejecting occurring at various random positions along the unshuffled stack.

U.S. Pat. No. 6,019,368 to Sines et al. (assigned to VendingData, Inc.) describes a playing card shuffler having an unshuffled stack holder that holds an in-feed array of playing cards. One or more ejectors are mounted adjacent the unshuffled stack holder to eject cards from the in-feed array at various random positions. Multiple ejectors are preferably mounted on a movable carriage. Extractors are advantageously used to assist in removing playing cards from the in-feed array. Removal resistors are used to provide counteracting forces resisting displacement of cards, to thereby provide more selective ejection of cards from the in-feed array. The automated playing card shuffler comprises a frame; an unshuffled stack holder for holding an unshuffled array of playing cards in a stacked configuration with adjacent cards in physical contact with each other and forming an unshuffled stack; a shuffled array receiver for holding a shuffled array of playing cards; at least one ejector for ejecting playing cards located at different positions within the unshuffled stack; and a drive which is controllable to achieve a plurality of different relative positions between the unshuffled stack holder and the at least one ejector. This shuffler design is currently marketed under the name RANDOM EJECTION SHUFFLER™.

U.S. Pat. No. 6,149,154 to Grauzer et al. (assigned to Shuffle Master, Inc.) describes an apparatus for moving playing cards from a first group of cards into plural groups, each of the plural groups containing a random arrangement of cards, the apparatus comprising: a card receiver for receiving the first group of unshuffled cards; a single stack of card-receiving compartments generally adjacent to the card receiver, the stack generally adjacent to and movable with respect to the first group of cards; and a drive mechanism that moves the stack by means of translation relative to the first group of unshuffled cards; a card-moving mechanism between the card receiver and the stack; and a processing unit that controls the card-moving mechanism and the drive mechanism so that a selected quantity of cards is moved into a selected number of compartments. This shuffler is currently marketed under the name ACE® shuffler in the United States and abroad.

U.S. Pat. No. 6,254,096 to Grauzer et al. (assigned to Shuffle Master, Inc.) describes an apparatus for continuously shuffling playing cards, the apparatus comprising: a card receiver for receiving a first group of cards; a single stack of card-receiving compartments generally adjacent to the card receiver, the stack generally vertically movable, wherein the compartments translate substantially vertically, and means for moving the stack; a card-moving mechanism between the card receiver and the stack; a processing unit that controls the card-moving mechanism and the means for moving the stack so that cards placed in the card receiver are moved into selected compartments; a second card receiver for receiving cards from the compartments; and a second card-moving mechanism between the compartments and the second card receiver for moving cards from the compartments to the second card receiver. This shuffler design is marketed under the name KING® shuffler in the United States and abroad.

U.S. Pat. No. 5,944,310 to Johnson et al. describes a card handling apparatus comprising: a loading station for receiving cards to be shuffled; a chamber to receive a main stack of cards; delivery means for delivering individual cards from the loading station to the chamber; a dispensing station to dispense individual cards for a card game; transfer means for transferring a lower most card from the main stack to the dispensing station; and a dispensing sensor for sensing one of the presence and absence of a card in the dispensing station. The dispensing sensor is coupled to the transfer means to cause a transfer of a card to the dispensing station when an absence of a card in the dispensing station is sensed by the dispensing sensor. Individual cards delivered from the loading station are randomly inserted by an insertion means into different randomly selected positions in the main stack to obtain a randomly shuffled main stack from which cards are individually dispensed. The insertion means includes vertically adjustable gripping means to separate the main stack into two spaced apart sub-stacks to enable insertion of a card between the sub-stacks by the insertion means. The gripping means is vertically positionable along the edges of the main stack. After gripping, the top portion of the stack is lifted, forming two sub-stacks. At this time, a gap is created between the stacks. This shuffler is marketed under the name QUICK-DRAW™ shuffler in the United States and abroad.

U.S. Pat. No. 6,267,248 to Johnson et al. describes an apparatus for arranging playing cards in a desired order, the apparatus including: a housing; a sensor to sense playing cards prior to arranging; a feeder for feeding the playing cards sequentially past the sensor; a storage assembly having a plurality of storage locations in which playing cards may be arranged in groups in a desired order, wherein the storage assembly is adapted for movement in at least two directions during shuffling; a selectively programmable computer coupled to the sensor and to the storage assembly to assemble in the storage assembly groups of playing cards in a desired order; a delivery mechanism for selectively delivering playing cards located in selected storage locations of the storage assembly; and a collector for collecting arranged groups of playing cards. The storage assembly in one example of the invention is a carousel containing a plurality of card storage compartments. The device describes card value reading capability and irregular (e.g., missing or extra) card indication.

Similarly, U.S. Pat. No. 5,683,085 to Johnson et al. describes an apparatus for shuffling or handling a batch of cards including a chamber in which a main stack of cards are supported, a loading station for holding a secondary stack of cards, and a card separating mechanism for separating cards at a series of positions along the main stack. The separating mechanism allows the introduction of cards from the secondary stack into the main stack at those positions. The separating mechanism grips cards at the series of positions along the stack and lifts those cards at and above the separation mechanism to define spaces in the main stack for introduction of cards from the secondary stack.

U.S. patent application Ser. No. 09/967,502, now U.S. Pat. No. 6,651,981, describes a device for forming a random set of playing cards including a top surface and a bottom surface, and a card receiving area for receiving an initial set of playing cards. A randomizing system is provided for randomizing the initial set of playing cards. A collection surface is located in a card collection area for receiving randomized playing cards, the collection surface receiving cards so that all cards are received below the top surface of the device. An elevator is provided for raising the collection surface so that at least some randomized cards are elevated at least to the top surface of the device. A system for picking up segments of stacks and inserting cards into a gap created by lifting the stack is described.

U.S. Pat. No. 5,605,334 to McCrea, Jr., describes a secure game table system for monitoring each hand in a progressive live card game. The specification indicates that FIG. 16 is an illustration setting forth the addition of a single card reader to the automatic shuffler of U.S. Pat. No. 5,356,145. In FIGS. 16 and 17 is set forth another embodiment of the secure shuffler of the 5,605,334 patent, based upon the shuffler in FIGS. 12-16 of U.S. Pat. No. 5,356,145. The shuffler may be mounted on a base in which is contained a camera with a lens or lenses and camera may be embedded in a base of the shuffler.

U.S. Pat. No. 6,403,908 to Stardust et al. describes an automated method and apparatus for sequencing and/or inspecting decks of playing cards. The method and apparatus utilizes pattern recognition technology or other image comparison technology to compare one or more images of a card with memory containing known images of a complete deck of playing cards to identify each card as it passes through the apparatus. Once the card is identified, it is temporarily stored in a location corresponding to or identified according to its position in a properly sequenced deck of playing cards. Once a full set of cards has been stored, the cards are released in proper sequence to a completed deck hopper. The method and apparatus also includes an operator interface capable of displaying a magnified version of potential defects or problem areas contained on a card which may be then viewed by the operator on a monitor or screen and either accepted or rejected via operator input. The device is also capable of providing an overall wear rating for each deck of playing cards.

Many other patents provide for card reading capability in different physical manners, at different locations, and in different types of apparatus from card reading shoes, to card reading racks, to table security control systems such as disclosed in U.S. Pat. No. 4,667,959 (Pfeiffer et al.), U.S. Pat. No. 6,460,848 (Soltys et al.), U.S. Pat. No. 6,270,404 (Sines et al.); U.S. Pat. No. 6,217,447 (Lofink et al.); U.S. Pat. No. 6,165,069 (Sines et al.); U.S. Pat. No. 5,779,546 (Meissner et al.); U.S. Pat. No. 6,117,012 (McCrea, Jr.); U.S. Pat. No. 6,361,044 (Block et al.); U.S. Pat. No. 6,250,632 (Albrecht); U.S. Pat. No. 6,403,908 (Stardust et al.); U.S. Pat. No. 5,681,039 (Miller); U.S. Pat. No. 5,669,816 (Peripheral Dynamics); U.S. Pat. No. 5,722,893 (Smart Shoes, Inc.); U.S. Pat. No. 5,772,505 (Peripheral Dynamics); U.S. Pat. No. 6,039,650 (Smart Shoes, Inc.); U.S. Pat. No. 6,126,166 (Advanced Casino Technologies); U.S. Pat. No. 5,941,769 (Unassigned); and WO 00/51076 (Dolphin Advanced Technologies Pty. Ltd.).

Although these and other structures are available for the manufacture of playing card shuffling apparatus, new improvements and new designs are desirable. In particular, it would be desirable to provide a batch-style shuffler that is faster, provides random shuffling, which is more compact than currently available shuffler designs and is capable of reading the rank and/or suit of each card.

SUMMARY OF THE INVENTION

A device for forming a random set of playing cards is disclosed. The device includes a card in-feed area, a card shuffling system, a card removal area and a card reading system. According to the invention, the card reading system is located within the device. The card reading system employs a complementary metal-oxide semiconductor (CMOS) sensor and a hardware component, the hardware component capable of converting signals from the CMOS sensor into vector sets and comparing the vector sets to known vectors to determine rank and suit.

One preferred sensing system utilizes a field-programmable gate array (FPGA) as the hardware component. The hardware component performs a number of important functions, such as vector shifting and an error correction function.

Another preferred component of the card reading system is at least one light to illuminate an area of the card being sensed by the CMOS sensor. Although other wavelengths of light can be used, a preferred light source is a green light source. Green light is found at a wavelength range between about 490 and about 520 nanometers. One preferred green light source is a green diode.

The vector sets compared in the hardware component may comprise at least one of gray scale values, binary values, 8-bit data, 16-bit data, and a series of voltages. A preferred vector set is comprised of multiple binary values.

When incorporated into a shuffler or other card handling device, the card reading system may further comprise a card present sensor, the sensor triggering the capturing of data by the CMOS sensor.

A card shuffling and verification apparatus is disclosed. The apparatus comprises a top surface, a single card receiving area for receiving an initial set of playing cards and a randomizing system for randomizing the order of an initial set of playing cards. The apparatus also includes a collection surface within a card collection area for receiving randomized playing cards one at a time into the card collection area, the collection surface receiving cards so that all cards are received below the top surface of the device. An image capture device is provided that reads the rank and suit of each card, the image capture device illuminating a face of the card displaying the rank and suit with electromagnetic radiation selected from the group consisting of ultraviolet radiation, near infrared radiation, infrared radiation, far infrared radiation, and wavelengths comprising a fluence consisting of at least 40% wavelengths between 490 nm and 520 nm. The apparatus also includes an elevator for raising the collection surface so that at least some randomized cards are elevated at least to the top surface of the device.

In one form of the invention, the elevator raises all randomized cards above the top surface of the device after shuffling and or card inspection. The device further includes at least one pick-off roller for removing cards one at a time from the card receiving area and for moving cards one at a time towards the randomizing system. In one example of the invention, the image capture device can read a card only after it has been moved by the at least one pick-off roller.

In a preferred embodiment, at least one pair of rollers receives each card from the at least one pick-off roller before the image capture device can read each card, the image capture device illuminating a face of the card displaying the rank and suit with electromagnetic radiation selected from the group consisting of wavelengths comprising a fluence consisting of at least 40% wavelengths between 490 nm and 520 nm Preferably, the randomization system moves one card at a time into an area overlying the collection surface after the one card has been read for suit and rank.

In an example of the invention, only one card at a time is positioned on the collection surface, forming a randomized set. A preferred randomizing system comprises two opposed card gripping elements. Located below the two card gripping elements is an insertion point to the card collection area.

A housing may be provided that is capable of being mounted into the gaming table surface. One example of mounting is to flush mount the housing such that the entire apparatus is surrounded by table surface. Another example of mounting is to mount a portion of the housing into the surface.

An automatic deck verification system is disclosed. The system comprises a microprocessor with memory for controlling the operation of the device, an in-feed compartment for receiving cards to be randomized and a card moving mechanism for moving cards individually from the in-feed compartment into a card reading compartment. According to the invention, an image capture system is provided that can identify at least the rank of each card as it is moved into or through the card reading compartment, but before removal from the device, the image capture device illuminating a face of the card displaying the rank and suit with electromagnetic radiation selected from the group consisting of ultraviolet radiation, near infrared radiation, infrared radiation, far infrared radiation, and wavelengths comprising a fluence consisting of at least 40% wavelengths between 490 nm and 520 nm. The microprocessor identifies a position for each card in each set of cards formed in the card mixing compartment, and a memory that records at least the rank of each card in each set of cards read in the card reading compartment.

An automatic card shuffler is disclosed. The shuffler comprises a housing capable of being mounted into a gaming table surface, a card receiver for accepting a group of cards to be shuffled and a randomizing system for randomizing an order of an initial set of playing cards wherein an image capture device identifies at least the rank of each card in the initial set of playing cards before each card is positioned on a collection surface for receiving randomized cards, the image capture device illuminating a face of the card displaying the rank and suit with electromagnetic radiation selected from the group consisting of ultraviolet radiation, near infrared radiation, infrared radiation, far infrared radiation, and wavelengths comprising a fluence consisting of at least 40% wavelengths between 490 nm and 520 nm. Also included in the shuffler is a card collection surface for receiving randomized cards, an elevator for raising the collection surface to an elevation proximate the gaming table surface, and a microprocessor for controlling the operation of the card shuffler.

A method of identifying cards is disclosed. The method comprises the steps of scanning at least a portion of a face of a playing card with a CMOS sensor, converting the signals into at least one acquired vector, comparing the at least one acquired vector with a reference vector, and identifying rank and suit from a correlation of the acquired and reference vectors. A correlation algorithm may be used to determine rank and suit. Vector shifting may be used to identify suit and rank, as well as an error correction function. Determined rank and suit data may then be transmitted to a data storage device.

A playing card integrity checking machine is disclosed that includes a card in-feed tray for receiving one or more decks of cards, a card inspection station located adjacent the in-feed tray, a card transport mechanism for removing individual cards from the in-feed tray and transporting the cards individually past the inspection station to an exit or to an accumulator bin, the card inspection station including an electromagnetic radiation source with electromagnetic radiation selected from the group consisting of ultraviolet radiation, near infrared radiation, infrared radiation, far infrared radiation, and wavelengths comprising a fluence consisting of at least 40% wavelengths selected from the group consisting of 1) UV, violet, indigo, blue-green, green, and infrared; 2) UV, blue-green, green and IR (as described above); 3) UV, blue green and green; 4) UV and green; and 5) green.

DETAILED DESCRIPTION OF THE INVENTION

Figure 1:
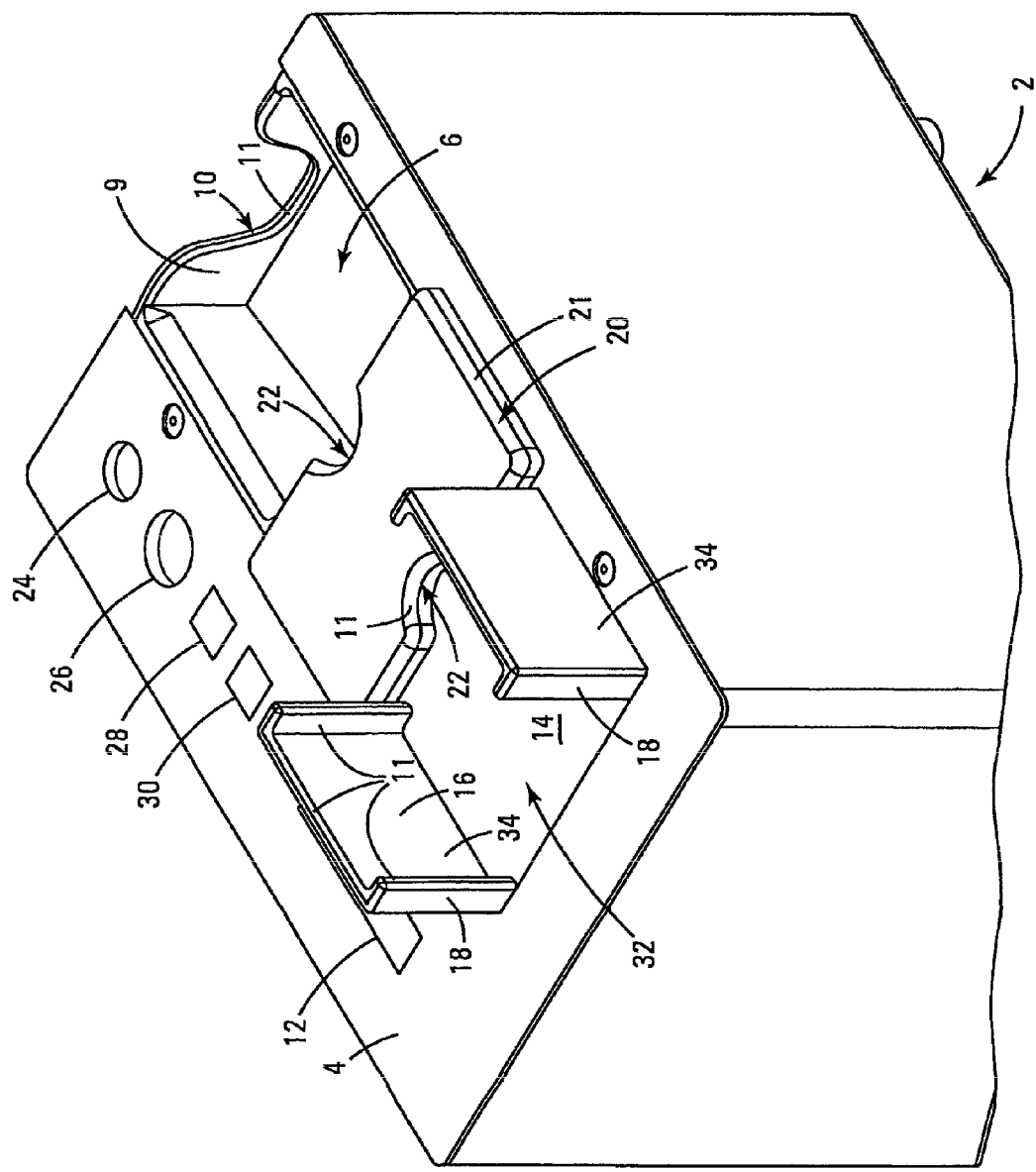
FIG. 1 shows a perspective view of an example of an exterior of a shuffling apparatus of the present invention.

An automatic shuffling device is described for forming a randomly arranged set of playing cards. One embodiment of the device of the present invention is a batch shuffler that shuffles between one and eight or more decks of cards (standard deck or decks of 52 cards each or 52 cards plus one or two jokers) and is particularly well suited for providing randomized batches of cards for games such as single deck blackjack, poker, double deck blackjack, and multi deck blackjack, for example. Another embodiment of the invention is suitable for shuffling either a single deck or two decks of cards.

The device includes a top surface and a bottom surface, a card receiving area for receiving an initial set of playing cards to be randomized and a randomizing system for randomizing an order of the initial set of playing cards. The device further includes a card collection area and a card collection surface within the card collection area for receiving randomized playing cards, the collection surface receiving cards in a manner such that all cards are inserted into the collection area below the top surface of the device. An elevator is provided for raising and lowering the collection surface during shuffling, and elevating the shuffled (alternatively referred to as "randomized") group of cards at least as high as the top surface of the device after shuffling (that is, the lowest card in the shuffled group of cards is raised to a level where it may be easily and manually removed from that level, preferably with the lowest card being level with or above a plane defining the top surface of the device). A card suspension mechanism such as a pair of oppositely spaced grippers grasp some or all of the cards on the card collection surface. After gripping, the elevator is lowered, creating a gap or point of insertion for the next card to be fed. Once shuffling is complete, the cards are elevated to a top surface so that they can be removed by the attendant or dealer and used for dealing. While cards are being dealt, a second group of cards is being randomized. The use of two groups of cards eliminates any waiting on the part of the dealer or the casino patrons between rounds of play.

For example, because the device is able to transport cards rapidly and read card values (e.g., suit and rank, or special values such as wild cards, jokers, etc.), the device may be used as a deck verification system as well as a card shuffler/randomizer There are a number of modes by which this can be practiced. The least complicated, method of operation is to have the device shuffle or randomize a complete set of cards and have each and all of the cards of the set simultaneously read and compared to the expected content (e.g., in a look-up table for a regular or special deck, a number of regular or special decks, and the like). By comparing the read values to the stored values, the set of cards can be verified. The stored values can be provided from a previous reading of the set of cards (e.g., during an earlier shuffle/randomization) or from a separate reading of the cards from a separate device such as a card reading tray (e.g., U.S. Pat. No. 6,460,848), or dealing shoe (e.g., U.S. Pat. Nos. 6,403,908; 5,605,334; 6,039,650; and 5,722,893). Comparison to the earlier stored values can be performed in the microprocessor in the shuffling device, or the information can be out loaded from a port to a distal microprocessor (e.g., central computer) that also has the stored values, or at both locations.

Another mode of operation is to verify the deck or group of decks without shuffling according to the method; cards are removed one at a time from the card in-feed tray of the device (possibly in an order that had already been read from another device or by the shuffling device in an earlier reading of the cards), and a support plate is provided that can receive the entire set of cards without having to create openings for card insertion. For example, the grippers could be deactivated and all cards could be transferred in order onto the support plate. This can speed up the card set validation as compared to an actual shuffling or randomization process. In this fast verification mode, the camera may operate with single, quick shot images of each card or provide the data in a steady stream, since there would be less data (because of the faster movement of the cards and set of cards) as compared to a shuffling procedure. The data stream in the fast verification mode would not be as excessive as in a shuffling mode. Cards could be read when stationary or in motion, in the card in-feed tray or during transfer onto the support plate.

There are a number of special features that combine to make the present invention a significant advance over previously described card shuffling systems and card shuffling processes. Among individual features that constitute an advance, alone or in combination with other features include a system for automatically calibrating and inspecting the position and performance of an elevator for moving the final set of randomized cards upwardly so that the stack is accessible to the dealer or attendant. In one example of the invention, the elevator elevates the group of cards to the playing table surface. The same elevator advantageously assists in accomplishing shuffling within the card collection and/or mixing area.

The card collection area in another example of the invention has a plurality of vertical supports (e.g., two or three walls, or four walls with a manually accessible area where the lowest card may be gripped), and a movable lower surface. The elevator supports this movable lower surface (also referred to herein as the collection surface) and causes the surface to move back and forth (relatively up and down) in a substantially vertical direction. One function of the movement of the elevator (during the shuffling or randomizing sequence) is to position a stack of cards within the card collection area so that a card or cards can be inserted into the stack in a specifically selected or randomly selected precise position within the stack to randomize, organize or arrange the cards in a desired order, such as a "pack order" for inspection (particularly after reading the suit and rank of cards) or to randomize the cards into a shuffled set of cards that can be dealt to players. The insertion of cards may be performed in a number of ways, such as by gripping and lifting gripped cards or by dropping a section of the stack and inserting one or more (and preferably just one) cards into the gap, by positioning the stack near a card insertion position and inserting one or more cards into the stack, or inserting a wedge-like element or blade between cards in the stack to elevate a portion of the stack where card(s) may be inserted (as described in U.S. Pat. No. 5,695,189 to Breeding et al. (assigned to Shuffle Master, Inc.), which is incorporated herein by reference.

In a preferred mode of operation of the shuffler of the present invention, a picking, gripping or separating system is provided for suspending segments of the stack of cards present in the card collection area, creating an opening in the group of cards, so that a card or cards can be inserted in specific locations relative to other cards in the deck. A variant of this system is described in U.S. Pat. No. 6,651,981 (assigned to Shuffle Master, Inc.). According to that invention, the picking, gripping or card suspending system is fixed in the vertical direction. By randomly selecting a vertical position for the movable base of the card receiving area prior to picking, the location of an opening created in the stack of cards by gripping a portion of the cards and lowering another portion of the cards below the gripping area is randomly selected, with insertion of an individual card into these openings causing randomization of the cards.

Offset rollers are the preferred mechanism provided for moving the individual cards from the card receiving area into the card collection area, although air jets, belts, injection plates, injection blades, such as cups, friction rollers and the like may also be used for moving individual cards or small numbers of cards (e.g., 1, 2, 3, 4 or 5 cards) into the card randomization area. A stack stabilizing area is provided in one example of the invention for receiving an elevated final set of cards lifted from the card collection area. This stack stabilization area should be positioned or positionable above the top of the device or should begin at the top of the device. In another example of the invention, the elevator itself is equipped with a stack stabilizing structure that is lowered into the inside of the shuffler prior to the randomization of cards. In one embodiment later described in greater detail, a delivery or elevator platform provides its own card stabilization area or in conjunction with an elevator drive arm provides such a card stabilization area. A single belt drive is provided in one example of the invention for driving two spaced apart and opposed vertically disposed picking elements in a card segment picking system. The picking elements are vertically disposed along the path of movement of the collection surface of cards, and are horizontally spaced apart with respect to each other. A microprocessor is provided that employs a random number generator to identify or create an intended (including random) distribution of an initial set of cards in the card receiving area at the conclusion of shuffling. The microprocessor executes movement of elements in the shuffling apparatus, including the opposed picking elements and the elevator to effect placement of each card into spaces in the stack created by the shuffling apparatus, and a randomized set of cards is rapidly formed. That microprocessor (in the shuffling device or in an associated game device) or a separate or parallel microprocessor is used to direct the calibration steps. In one example of the invention, the picking elements move horizontally to grasp opposite edges of a group of cards. Other suspension systems are contemplated, such as inserting a flat member between the cards above the point of separation.

The individual and combined elements of the invention will be described in detail, after a more general description of the invention is provided. A first general description of the invention is a device for forming a random set of playing cards comprising: a top surface and a bottom surface of the device; a receiving area for an initial set of playing cards; a randomizing system for randomizing the order of the initial set of playing cards; a collection surface in a card collection area for receiving the randomized playing cards; an elevator for raising the collection surface within the card collection area; and at least one card supporting element within the card collection area that is horizontally fixed with respect to the vertical. The card supporting element will support and suspend a precise number of a randomly determined number of cards within the card collection area to create a gap or space within the stack of cards within the collection area that is a card insertion point. The card insertion point or gap is created in the card collection area just below the lowermost portion of the card supporting element or elements. Each time the card supporting elements support a next group of cards, and the elevator beneath the card collection area is lowered, lowering a remaining group of cards and creating a gap.

The device may have one or more card supporting elements comprising at least one vertically disposed element on at least one side of the card collection area. In the alternative, the card supporting elements include at least two opposed supporting elements such as flexible or soft (e.g., polymeric, elastomer, rubber or rubber-coated) gripping elements that can move inwardly along a horizontal plane within the card collection area to contact and support the opposite edges of at least a portion of the stack, or substack or group of cards. Or, a horizontally disposed flat member such as a pair of forks or a flat plate may be inserted between the cards, so that when the elevator is lowered, an insertion point or gap is formed. The substack may be defined as all cards within the collection area at or above a randomly selected card or position in the stack within the card collection area. The device desirably has a microprocessor communicatively connected to the device. The microprocessor in one example of the invention is programmed to determine a distance that the card supporting surface must be vertically moved in order to position each card in the desired order within the stack. In one example of the invention, cards fed into the card collection area may be placed anywhere in the stack, including the top or bottom position. This flexibility advantageously allows for a more random shuffle and avoids "dead" areas within the collection stack of cards.

The device of the present invention advantageously senses the length or width of the cards and adjusts the horizontal distance between the gripping arms so that cards of varying lengths or widths can be suspended. Whether the width or length is sensed depends on the designer's selected location of the grippers within the card collection area.

In one example of the invention, the microprocessor instructs the device to feed a first card into the card collection area and to grip the card at a width representing the width of a standard group of cards. If the sensors sense that a card is suspended, no adjustments to a horizontal spacing between gripping arms is necessary. If no suspended cards are sensed, the microprocessor instructs an adjustable gripping support mechanism to move a preselected distance and the gripping and sensing process is repeated. When the final adjustment has been made, cards are suspended and their presence is sensed. The microprocessor then retains this gripping mechanism distance setting. Alternatively, when the microprocessor instructs the grippers to suspend one or more cards and no suspended cards are sensed, the adjustment sequence is activated. This entire process will be described in further detail, below.

The microprocessor is communicatively connected to the device and is most preferably located within the exterior shell of the device. The microprocessor may be programmed to lower the card collection surface within the card collection area after the at least one card supporting element has contacted and supported cards suspending a group of cards within the card collection area, creating two vertically spaced substacks of cards, one suspended, separated by a gap or opening between the cards. Recognition of the presence of suspended and/or supported card(s) within the card collection area may be provided by sensors that are capable of sensing the presence of card(s) within the area by physical (e.g., weight), mechanical (e.g., pressure), electrical (e.g., resistance or conductance), optical (e.g., reflective, opacification, reading) or other sensing. The microprocessor may direct movement of one or more individual cards fed into the gap created between the two segments (upper and lower) of cards. The microprocessor may be programmed to randomly determine a distance that the card supporting surface must be vertically moved to in order to position at least one specific card. This method, including measurement of card thickness, will be described in more detail below. In the alternative, the microprocessor may be programmed to select a specific card position below or above a certain card, creating the gap. When the card supporting element moves to contact cards within the card collection area, and the elevator moves the card supporting surface downwardly, a gap is created for receiving the next card.

The elevator operates in a unique manner to position cards relative to the pickers or grippers within the shuffling chamber. This unique operation offers significant benefits that remove the need for human intervention in the setup or continuing operation of the shuffling device. Among the alternative and optional unique features of the operation of the shuffling device of the present invention are included the following sequence of events. These events need not necessarily be combined within a single process to represent inventive steps, as individual steps and combinations of two or more steps may be used to define inventive processes.

In order to calibrate the shuffling device of the present invention to operate for a particular card size, a calibration set of cards comprising at least one card (usually one, although two, three, four or more cards could be used) is inserted into the shuffling chamber prior to shuffling. The elevator base plate defining the base of the shuffling chamber moves the calibration set of cards to the position within the chamber approximating a position within the gripper (not necessarily at a level or equal position with the bottom of the grippers), and the grippers move inwardly (toward opposed edges of the cards) and attempts to grip the card(s). If the gripper grips the card(s), a sensor identifies either that the card(s) have been gripped by the grippers or the card(s) remain on the collection surface of the elevator (depending upon the position of the sensors). If there is no indication that a card(s) has been gripped, then the grippers move inwardly toward each other horizontally a set number of steps (e.g., steps being units of movement as in movement through a micro-stepping motor or a unit of movement through any other motivating system), and the process is repeated. This gripping, sensing and moving sequence is repeated until the sensor(s) sense that a card has been lifted off the support plate and/or is supported in the grippers. The microprocessor identifies a fixed progression of steps of predetermined sizes of steps that are used in this gripping calibration, as well as the position that accomplished the gripping. These determinations of card dimensions, gripping positions and elevator position may be done independently and/or in concert.

It is logical to proceed with the gripping identification first. The grippers move inwardly a predetermined distance initially and in the repeat testing. For example, in the first gripping attempt, the grippers may move in 10 or 15 or other number of steps. A larger number than one step or unit is desirable initially to assure that a rapid first grip is attained. After the first grip of a card(s) is sensed, then the microprocessor will widen the grip by fixed numbers of steps (here single steps may be used), with the widening occurring until no card is gripped. Once no card is gripped, a sufficient number of steps are added to the gripper movement to assure gripping and even slight elastic bending of the card by the grippers so that more cards can be supported and so that cards will not slip. This may be 1, 2, 4, 5, 8, 10, 12, 15 or any other number of steps to assure that secure gripping is effected. This procedure defines the "gripping" and "card release" position of the grippers for a particular group of cards. The microprocessor records the stepper motor positions corresponding to the gripper positions and uses this information to position the grippers during shuffling.

Now the platform offset is to be set (as opposed to the gripper offset positioning). The elevator is put in a base or home position, which may be the position of the elevator (the height of the elevator) at the lowest position possible, or at a position below a framing support at the base of the collection chamber or some other predetermined position. The elevator is then raised in a series of a number of steps (again, in the initial gripping attempt, using larger numbers of steps is desirable to speed up the overall process, while during a more refined positioned identification/calibration sequence, smaller numbers of steps, even single steps, would be used) and the grippers are activated after each step, until the card is caught by the gripper for the first time. The number of steps moved each time for the first gripping action is preferably larger than single steps to assure that this card will be gripped at the lowermost edge of the grippers. Again this may be 1, 2, 3, 4, 5, . . . 8, . . . 10, 15, etc., steps (or any number in between or larger number of steps). Once the calibration card(s) is gripped, this is an indication that the platform has now raised the cards to at least the bottom of the grippers. Once gripping has occurred, the elevator is then lowered by a smaller number of incremental stop positions (a finer adjustment) and a new position evaluated as to whether the grippers would then grip the calibration card. The process is repeated until the calibration card is just below the lowermost gripping position. This position is then recorded in memory. The repositioning is accomplished by lowering the elevator and support plate to a position well below the grippers and then raising the plate to a position a predetermined number of steps lower than the last position where the card(s) was gripped, and sensing whether the card was gripped at the new position. Depending upon the arrangement of the sensors, plates, and cards, it is possible to merely ungrip the card, then lower the elevator one or more predetermined number of steps, then attempt to regrip the card, and sense whether the card has been gripped.

Once the card has been lowered just below the gripper, a second calibration card is added to the card collection surface. The elevator position is registered/recorded. The precision of the system enables options in the practice of the invention such as the following. After a single card has been gripped, and a position determined where that single card will not be gripped with a slightly lowered elevator position (e.g., movement downward, which may be anywhere from 2 to 20 steps or more), another calibration card or cards may then be added to the shuffling chamber on top of the calibration card(s). The elevator and grippers may then be exercised with the elevator moving single steps, until the sensor(s) have determined that one card has been gripped and lifted off the support plate and another card(s) remains on the support plate. To this position is added a number of steps equal to a card thickness, and this final position is defined as the platform offset and identifies the position where the bottommost card would be lifted off of the support plate.

Prior to inserting the first calibration card, the elevator is raised to a predetermined sensed position in the card collection area, and that position or elevation is recorded in memory. After the first group of cards are inserted and randomized, the procedure is repeated, this time either measuring the height of the elevator when the top card in the stack was at the original height of the elevator, or measuring a new height of the top of the stack of cards when the elevator returns to that recorded position. The difference in distances represents the thickness of the deck or group of cards. As each card is fed into the card collection surface, the number of cards is counted and this number is recorded. The processor uses both pieces of information to calculate an average card thickness, and to associate the number of motor steps to one card thickness. This information is then used in positioning the elevator for precise placement in the next shuffle.

At this point, all of the remaining cards in the deck(s) may be added to the shuffling chamber (either directly or into the card receiving chamber and then into the card shuffling chamber). The system may then check on the efficiency of the grippers by raising the deck to a level where all cards should be gripped, the grippers grip the entire deck (one, two, three or more times), and the elevator lowered. If no cards are dropped in the chamber, the system may proceed to normal shuffling procedures. If the grippers leave a card or a card falls back into the shuffling chamber, the gripper action may be automatically or manually (by an operator signal) adjusted to provided greater force on the cards, and the deck lift procedure is then attempted again, until the entire deck is lifted. The entire calibration process may have to be repeated if there is any uncorrectable failure in a complete deck lift test procedure. The shuffler preferably includes a multiple segment information display as described in U.S. Pat. No. 6,325,373 to Breeding et al., entitled "Method and Apparatus for Automatically Cutting and Shuffling Playing Cards," the disclosure of which is herein incorporated by reference. The display may then indicate information relating to the state of the shuffler, such as the indication "AUTO ADJUST COMPLETE" and the operator may proceed with normal shuffling procedures, with or without further instruction on the display panel.

The calibration process described above is preferably repeated periodically to compensate for swelling and bending of the cards. In a preferred form of the invention, two cards are fed into the device and separated prior to each shuffle to verify that the device is still calibrated properly. If the cards do not separate, the calibration sequence is repeated. The device of the present invention includes a jam recovery feature similar to that described in U.S. Pat. No. 6,325,373 to Breeding et al. However, upon the fourth (or other number of failures) failure to recover from a jam, one or more of the calibration features described above are automatically activated.

This element of the total calibration process will thus calibrate the shuffling device in advance of any shuffling procedure with respect to the position of the bottom card (the card touching the elevator base plate or support plate) by moving the elevator up and down, by gripping and re-gripping the cards to identify a position where no cards are gripped and then only one card is gripped. The other gripping-re-gripping procedure within the total calibration process will also identify and calibrate the shuffling apparatus with respect to the unique size of cards placed into the shuffling apparatus. Based on the knowledge of how many cards have been inserted into the shuffling chamber in the set (preferably one card and then two cards total), the microprocessor identifies and determines the position of the elevator support plate, and the appropriate position of the elevator support plate with respect to the grippers and also the relative height of the number of cards in the set on the elevator card support plate. This information is stored for use with the particular stack of cards to be used in the shuffling process. When subsequent decks are inserted, the operator may optionally indicate that the decks are "the same" or sufficiently similar so that the entire process need not be performed, or may indicate that the process may be initiated, or the machine may automatically make a check of a single card to determine if it appears to be the same size, and then the shuffling program will be initiated if the card is identified as the same size.

Additionally or alternatively, once the calibration set of cards has been first gripped, the grippers release the cards and re-grip the cards, measuring any one or more of the a) position of the grippers relative to each other (with one or more of the two opposed grippers moving, the "steps" or other measurable indicator of extent of movement or position of the grippers) is determined and registered for use by the microprocessor, b) the force or tension between the grippers (with the calibration set of cards or only one card) gripped between the grippers, c) the height of a top card (or the single card) in the calibration set when cards are flexed by the force of the grippers (which may be measured by a sensor's position in the shuffling chamber), or any other system that identifies and/or measures a property or condition indicative of the gripping of the cards with a force in a range between a force insufficient to support the weight of the calibration set against slippage and bending the cards to a point where a card might lift off other cards in the calibration set. The calibration distance is typically in a range of between 93% to 99.5% of the length of width of the cards (whichever is being measured by picker movement, usually the length of the cards).

The positioning, repositioning and gripping of the cards are performed automatically and directed by the microprocessor or an additional microprocessor (there may even be a networked central control computer, but a microprocessor in the device is preferred). The elevator and the grippers are moved by steps or micro steps by a micro-stepping motor or other fine movement control system (e.g., hydraulic system, screw system, geared system, and the like). The use of the automatic process eliminates the need for technicians to set up individual machines, which must be done at regular intervals because of wear on parts or when cards are replaced. As noted, the positioning may be performed with a calibration set as small as a single card. After the automated calibration or position determination has been performed, the microprocessor remembers that position and shuffling can be initiated with the stack of cards from which the calibration cards were taken.

This calibration or preshuffling protocol may be used in conjunction with any system where an elevator is used, whether with grippers, card inserting devices, injectors and the like (as described above) are used, and not only the specific apparatus shown in the figures. A similar calibration system for determining specific positions of carousel chambers in a carousel-type shuffling device may also be used, without grippers. The carousel may be rotated and the position of the shelves in the carousel with respect to other functional elements in the device may be determined. For example, card reading devices, card injection components, card removal elements, and card receiving chambers may be calibrated with regard to each other. As is understood by those ordinarily skilled in the art, there may be variations chosen among components, sequences of steps, and types of steps performed, with those changes still reflecting the spirit and scope of the invention disclosed herein.

In addition, the card collection chamber need not be vertically disposed. The chamber could be angled with respect to the vertical to improve contact between the card edges and the support structure located within the card collection area.

As noted, this description reflects a detailed description of the preferred practice of the invention with grippers. Alternative systems, such as those with injectors or stack wedges may also be used with the calibration system of the invention with modifications reflecting the different systems. For example, where the calibration in the preferred embodiment addresses the level of the grippers with respect to cards and the elevator support plate, the system may be translated to calibration of air injectors, wedge lifters, and blade or plate injectors. This is done with an equivalent procedure for identifying the position of a card(s) placed on the support plate. For example, rather than repeated tests with a gripper, repeated tests with an air injector (to see when a card is ejected or injected by its operation), repeated tests with a blade or plate injector (to see when a card is ejected or injected by its operation), or a wedge separator with associated card(s) insertion (to see when the stack (e.g., a single card or a number of cards) are raised or when a card may be ejected or injected by its operation with minimum force).

The device of the present invention is also capable of monitoring card thickness and uses this information to determine the location or position in the stack where separation is to occur with great accuracy. When combined with the ability to read card rank and suit, the device is capable of verifying that all cards are present and can determine the final order of the cards.

In another embodiment, a first sensor located in the shuffling chamber senses the height of the platform within the shuffling chamber in its lowermost position prior to the beginning of the randomization process, when no cards are in the shuffling chamber. The sensor could also sense the platform position in any other predetermined or "home" position or assign such nomenclature to a position.

After randomization, when all cards have been transferred into the shuffling chamber, the platform is returned to this same position, and the same or another sensor located in the shuffling chamber (also referred to herein as the collection chamber) may sense the height of the top card in the stack.

The difference between the two measurements represents the thickness of the stack of cards. This is an alternative method of measuring stack thickness.

Sensors (such as optical sensors, sonic sensors, physical sensors, electrical sensors, and the like, as previously described) sense cards as they are individually fed from the in-feed tray into the shuffling chamber. This information is used by the microprocessor to verify that the expected number of cards is present. In one example of the invention, if cards are missing or extra cards are present, the display will indicate a misdeal and will automatically unload.

The microprocessor uses the two height measurements and the card count to calculate an average card thickness. This thickness measurement is used to determine what height the elevator must be in order to separate the stack between any two "target" cards.

The average card thickness can be recalculated each time the shuffler is activated upon power up, or according to a schedule such as every 10 to 30 minutes, with 20-minute intervals as one preferred example.

The inventors have recognized that deck thickness increases the more the cards are used, and as the humidity in the air increases, and when cards become worn. Under humid conditions, it might be desirable to check the card thickness more often than every 20 minutes. Under extreme conditions of continuous use and high humidity, it might be desirable to recalculate an average card thickness after the completion of every shuffle.

A novel method of determining an average card thickness measurement during shuffling is disclosed herein as an invention. The method includes providing a stack of cards, providing a card feeder capable of relative motion between the card feeder and the stack, and measuring a home position of the stack platform. The method further includes the home position indicating a height of the elevator platform when no cards are present in the stacking area, feeding cards into the stacking area, counting a number of cards placed into the stacking area as they are fed, sensing a height of a topmost card in the stack when the elevator is returned to the same home position, and computing an average card thickness from the collected information (e.g., stack height/number of cards=height/card).

The average card thickness is advantageously used to determine the position of card grippers used to grasp cards. Upon lowering the platform beneath the grippers, an opening is formed at a precise predetermined location, allowing precise placement of the next card between two "target" cards.

According to the present invention, a sensor is positioned at a point of insertion into the group of cards in the card collection area. Each time a gap is formed, the sensor verifies that the gap is open, e.g., that no cards are suspended or are hanging due to static forces. The card feeder activates when the sensor indicates the opening is clear. This method avoids jams and provides faster shuffling as compared to programming a time delay between the gripping of cards and subsequent lowering of the elevator and the insertion of the next card.

Another general description of a preferred device according to the invention is a device for forming a random set of playing cards comprising: a top surface and a bottom surface of the device; a receiving area for supporting an initial set of playing cards to be randomized; a randomizing system for randomizing the initial set of playing cards; a collection surface in a card collection area for receiving randomized playing cards, the collection surface being movable in a vertical direction. In one example of the invention, cards are received onto the collection surface, either positioned directly on the surface or positioned indirectly on a card supported by the surface. All cards being randomized in this example are inserted into the card collection area at a location below the top surface of the device. Cards are fed individually off of the bottom of the stack located in the card receiving area and into the card collection area in one example of the invention.

An elevator is provided for raising the collection surface so that at the conclusion of shuffling, at least some randomized cards are elevated to a position at or above the top surface of the device. The elevator may be capable of raising all or part of the randomized cards at or above the top surface of the device. A cover may be provided to protect or mask the cards until they are elevated into a delivery position from which a dealer may remove the cards manually. The device may have a stack stabilizing area defined by a confining set of walls defining a shuffled card delivery area that confines all randomized cards along at least two, and preferably, three edges after the randomized cards are elevated.

Alternatively, the card collection surface itself, elements positioned on the top surface of the shuffler or elements moved above the top surface of the shuffler may act to stabilize the cards so that they are more easily removed by the dealer's hand(s). The present invention also contemplates raising the shuffled group of cards to the top surface of the shuffler, where there are no confining structures around the cards. In one example of the invention, the top surface of the shuffler is flush-mounted into the gaming table surface, and the cards are delivered directly to the gaming table surfaces after shuffling.

The delivery area may be positioned such that its lower interior surface is at the same elevation as the top surface of the shuffler. The lower interior surface may be elevated above the top surface, or positioned beneath the top surface of the shuffler. In one example of the invention, the lower interior surface is at the same elevation as the top of the exterior of the shuffler. If the shuffler is mounted into and completely surrounded by a gaming table surface, it would be desirable to deliver cards so that the bottom card in the stack is at the same elevation as the gaming table surface.

The card receiving area may be sloped downwardly toward the randomizing system to assist movement of playing cards. The device may have at least one pick-off roller to remove cards one at a time from the card receiving area and to move cards, one at a time toward the randomizing components of the system. Although in one example of the invention, the randomizing system suspends cards and inserts cards in a gap created below the suspended cards, other randomization systems can be employed, such as the random ejection shuffling technique disclosed in U.S. Pat. No. 5,584,483 to Sines, the disclosure of which is hereby incorporated by reference. The at least one pair of speed up rollers desirably receives cards from the at least one pick-off roller. A microprocessor preferably controls movement of the pick-off roller and the at least one pair of speed up rollers. The first card is preferably moved by the pick-off roller so that, as later described in greater detail, movement of the pick-off roller is altered (stopped or tension contact with the card is reduced or ended) so that no card other than the first (lowermost) card is moved by either the pick-off roller or the at least one pair of speed up rollers. This can be done by sensing of the movement or tension on the first card effected by the at least one pair of rollers, causing the pick-off roller to disengage from the drive mechanism and freely rotate and to not propel the card.

The microprocessor, for example, may be programmed to direct the pick-off roller to disengage from the drive mechanism and to cease propelling a first card being moved by the pick-off roller when it is sensed that the first card is being moved by the at least one pair of rollers. A preferred randomization system moves one card at a time into an area overlying the collection surface. It is desirable to have one card at a time positioned into a randomized set of playing cards over the playing card collection surface. Again, as with the first general structure, the card collection area may be bordered on two opposed sides by two vertically disposed horizontally opposed movable card supporting elements. There is preferably an insertion point, such as an opening or slot to the card collection area that is located below a bottom edge of the two movable card supporting elements. The card supporting surface is vertically positionable within the card collection area, usually under the control and direction of a microprocessor. For example, the card supporting surface is moved by a motivator or elevator that is able to move incremental vertical distances that are no greater than the thickness of a playing card, such as incremental vertical distances that are no greater than one-half the thickness of a playing card. The motor may be, for example, a micro-stepper motor or an analog motor.

A sensor may be present within the collection area, below the top surface of the device, the sensor detecting a position of a top card of a group of cards in the card collection area below the group of suspended cards. In the alternative or in concert, the sensor detects the level of the card collection surface. In addition, a preferred device monitors the elevation of the top card when the two groups of cards are combined into one group, and adjusts for changes in the thickness of the deck, due to swelling, humidity, card wear, bowing of cards, etc. A microprocessor is preferably present in the device to control vertical movement of the card collection surface. The sensor may identify the position of the collection surface to place the top card at a position level with the bottom of at least one card supporting element that is movable substantially horizontally from at least one side of the collection area toward playing cards within the card collection area.

In one example of the invention, an opening such as a slot is provided in a side wall of the card collection area to permit transfer of cards from the card receiving area into the card collection area. The side wall may comprise a substantially solid support structure, adjoining edges of a plurality of vertical "L" shaped corner support structures, or other equivalent structure capable of retaining a stack of cards in a substantially upright position. The microprocessor may be programmed to determine a distance that the card supporting surface must be vertically moved to position at least one specific card, including or other than the top card at a bottom edge of the at least one card supporting element when the card supporting element moves to contact cards within the card collection area. As previously described, the at least one card supporting element may comprise at least two elements such as gripping pads that move from horizontally opposed sides of the collection area toward playing cards within the card collection area.

The microprocessor may be programmed to lower the card collection surface within the card collection area after the at least one card supporting element has contacted and supported cards within the card collection area, creating two vertically spaced apart segments or substacks of cards. The microprocessor directs movement of an individual card into the card supporting area between the two separated segments of cards. The microprocessor may direct movement of playing card moving elements within the device. The microprocessor randomly assigns final positions for each card within the initial set of playing cards, and then directs the device to arrange the initial set of playing cards into those randomly assigned final positions to form a randomized final set of playing cards. Each card is inserted into the building stack of collected (randomized or shuffled) cards by positioning them in respect to the other cards already in the stack. Thus, even if a first card is not intended to be adjacent to a particular card, but is intended to be above that particular card, the first card is positioned above (and possibly adjacent to) the particular card, and intervening cards in the intended sequence added between the first card and the particular card.

In one embodiment of the invention, the card receiving area is located such that individual cards are fed off of the bottom of the stack, through the slot formed in the card collection area, directly beneath the gripping elements. In another example of the invention, a card loading elevator is provided so that the cards can be loaded into the card receiving area at an elevation above that of the first embodiment. The elevator then lowers the cards to a vertical position aligned with the feed mechanism. The use of an elevator on the card loading area is also an ergonomic benefit as the dealer can keep hand and arm movements at a consistent level and does not have to reach into the device or have to drop cards into the device. The cards to be randomized can be inserted at a level approximately equal to the top of the shuffler, which can also be the height at which a randomized set of cards can be removed from the device.

When the device is used to process large batches of cards, such as groups of eight decks, it is desirable to provide a feed elevator to lower the entire batch of cards beneath the top surface of the shuffler, prior to shuffling. The card feeding mechanism from the card receiving area to the card collection or shuffling area is necessarily positioned lower in a shuffler that processes more cards than in a shuffler that processes fewer cards.

When a large number of cards is to be inserted into the machine for shuffling, a retaining structure may be provided, consisting of a card stop or frame to limit card movement on up to three sides of the elevator. The open side or sides permit the dealer to load the stack from the side of the elevator, rather than trying to load the elevator from above, and allowing cards to fall freely and turn over.

A randomizing elevator is provided for moving the cards being randomized and operates to raise and lower the bottom card support surface of the card collection area. This elevator moves during randomization, and also aids in the delivery of the shuffled group of cards by raising the shuffled cards to a delivery area. Reference to the figures will assist in appreciation and enablement of the practice of the present invention. Upwardly extending side walls on the card collection surface, an elevator arm or extension of an elevator arm, or another element attached to the arm may move with the elevator and be used to move other portions of the shuffling apparatus. For example, the arm extension may be used to lift hinged or sliding covers over the cards as the cards are raised above a certain level that exceeds the normal shuffling elevation of the elevator.

FIG. 1 shows a partial perspective view of a top surface 4 of a first shuffling apparatus 2 according to a practice of the invention. In this example of the invention, the device randomizes one or two decks of cards. The shuffling apparatus has a card accepting/receiving area 6 that is preferably provided with a stationary lower support surface that slopes downwardly from a nearest outer side 9 of the shuffling apparatus 2. A depression 10 is provided in that nearest outer side 9 to facilitate an operator's ability to place or remove cards into the card accepting/receiving area 6. The top surface 4 of the shuffling apparatus 2 is provided with a visual display 12 (e.g., LED, liquid crystal, micro monitor, semiconductor display, etc.), and a series of buttons, touch pads, lights and/or displays 24, 26, 28 and 30. These elements on the top surface 4 of the shuffling device 2 may act to indicate power availability (on/off), shuffler state (jam, active shuffling, completed shuffling cycle, insufficient numbers of cards, missing cards, sufficient numbers of cards, complete deck(s), damaged or marked cards, entry functions for the dealer to identify the number of players, the number of cards per hand, access to fixed programming for various games, the number of decks being shuffled, card calibration information and the like), or other information useful to the operator or casino.

Also shown in FIG. 1 is a separation plate 20 with a beveled edge 21 and two manual access facilitating recesses 22 that assists an operator in accessing and removing jammed cards between the card accepting area 6 and a shuffled card return area 32. The shuffled card return area 32 is shown to be provided with an elevator surface 14 and two separated card-supporting sides 34. In a preferred embodiment, sides 34 are removable. When the shuffler is flush-mounted into and surrounded by the top of a gaming table surface, removal of sides 34 enables the device to lift shuffled groups of cards onto the gaming table surface for immediate use. The card supporting sides 34 surround a portion of the elevator surface 14 with interior faces 16 and blocking extensions 18. It is desirable to provide rounded or beveled edges 11 on edges that may come into contact with cards to prevent scratching, catching or snagging of cards, or scratching of operators' fingers or hands.

Figure 2:
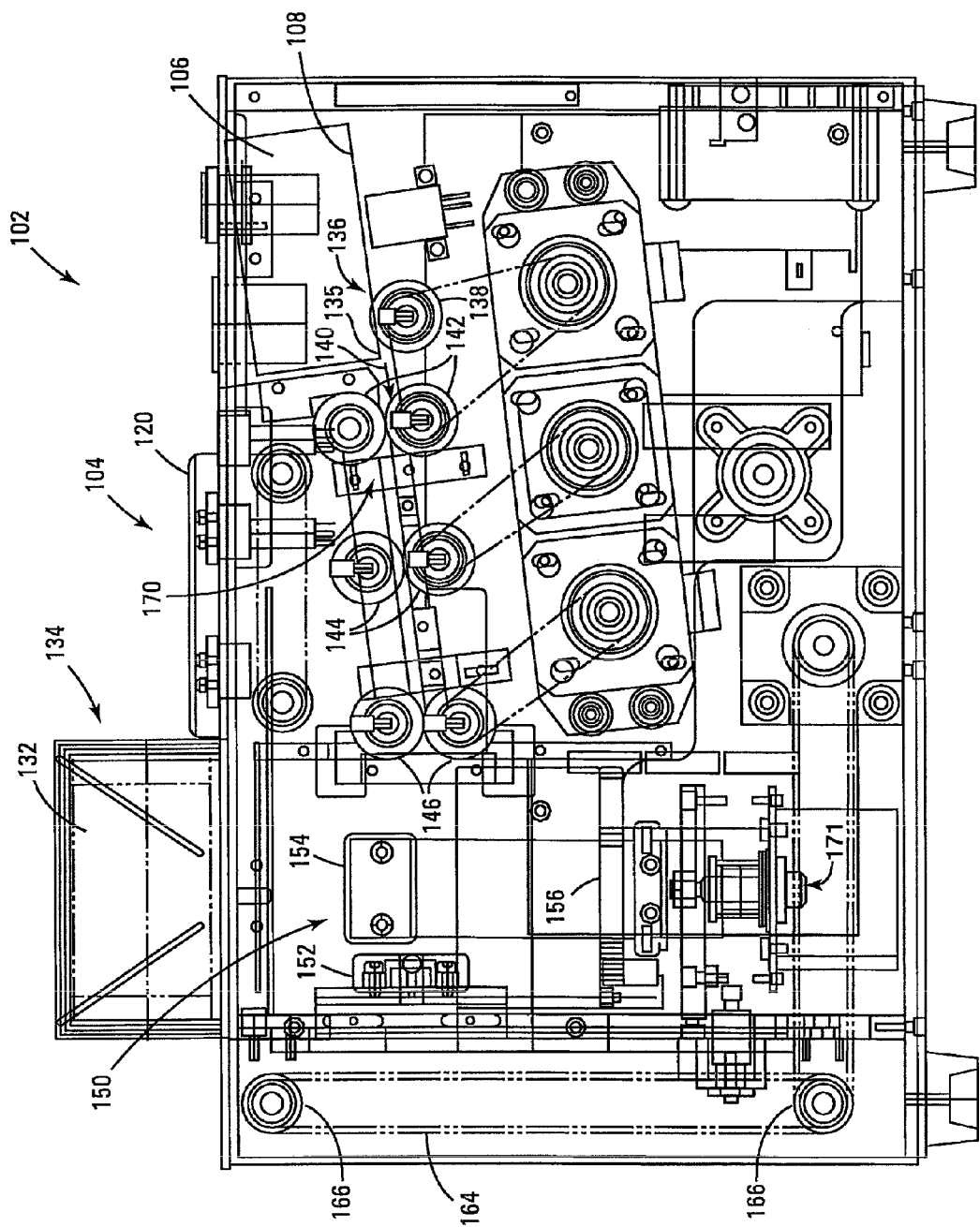
FIG. 2 shows a side cutaway view of some internal elements of a shuffling apparatus according to teachings of the present invention.

FIG. 2 shows a side view of a first embodiment of a shuffling apparatus 102 according to the present invention. A top surface 104 is shown with a separation plate 120 and the side panels 134 (card-supporting sides) of the shuffled card return area 132. A card-accepting/receiving area 106 is recessed with respect to the top surface 104 and is shown with a declining sloping support surface 108. At a front 135 of the sloping support surface 108 is an opening or slot 136 (not able to be seen in the direct side view) through which a bottom pick-off roller 138 may contact a bottom card in an unshuffled set of cards (not shown) within the card accepting/receiving area 106. The bottom pick-off roller 138 drives a card in direction 140 by frictional contact toward a first pair of nip rollers or off-set rollers 142. In one example of the invention, the upper roller of off-set rollers 142 is a break roller. This break roller retains the second top card for separation in the event that two cards are fed at the same time. In a preferred form of the invention, the upper roller does not rotate. In another form of the invention, the upper roller rotates, but is rotationally constrained.

There are two additional pairs of nip rollers or off-set rollers 144, 146 acting in concert (or only one of each pair is being driven) to move cards first moved by the first set of nip rollers 142. In a preferred practice of the present invention, the operation of the apparatus 102 may perform in the following manner. When a card (not shown) is moved from the unshuffled card accepting/receiving area 106, eventually another card in a stack of cards within the card accepting/receiving area 106 is exposed. The apparatus is designed, programmed and controlled to operate so that individual cards are moved into the first set of nip rollers or off-set rollers 142. If more than one card from the card accepting/receiving area advances at any given time (even if in partial sequence, with a portion of one card overlapping another card), it will be more difficult or even impossible for the apparatus to direct individual cards into predetermined positions and shuffle the cards randomly.

If two cards are moved at the same time and positioned adjacent to each other, this uncontrollably decreases the randomness of the shuffling apparatus. It is therefore desirable to provide a capability whereby when a card is moved into the control area of the first set of nip rollers or off-set rollers 142, the drive function of the bottom pick-off roller 138 ceases on that card and/or before the bottom pick-off roller 138 drives the next card. This can be effected by a wide variety of techniques controlled or directed by a microprocessor, circuit board, programmable intelligence or fixed intelligence within the apparatus.

Among the non-limiting examples of these techniques are 1) a sensor so that when a pre-selected portion of the card (e.g., leading edge, trailing edge, and mark or feature on the card) passes a reading device, such as an optical reader, the bottom pick-off roller 138 is directed to disengage, revolve freely, or withdraw from the bottom of the set of cards; 2) the first set of nip rollers or off-set rollers 144 may have a surface speed that is greater than the surface speed of the bottom pick-off roller 138, so that engagement of a card applies tension against the bottom pick-off roller 138 and the roller disengages with free rolling gearing, so that no forward moving (in direction 140) forces are applied to the first card or any other card exposed upon movement of the first card; 3) a timing sequence so that, upon movement of the bottom pick-off roller 138 for a defined period of time or for a defined amount of rotation (which correlates into a defined distance of movement of the first card), the bottom pick-off roller 138 disengages, withdraws, or otherwise stops applying forces against the first card and thereby avoids applying forces against any other cards exposed by movement of the first card from the card accepting/receiving area 106 and 4) providing a stepped surface (not shown) between bottom pick-off roller 138 and off-set rollers 142 that contacts a leading edge of each card and will cause a card to be held up or retained in the event that more than one card feeds at a time.

The cards are eventually intended to be fed, one at a time, from final nip rollers or off-set rollers 146 into the card mixing area 150. The cards in the mixing area 150 are supported on elevator platform 156. The platform 156 moves the stack of cards present in the mixing area 150 up and down as a group in proximity with a pair of separation elements 154. The pair of separation elements 154 grip an upper portion of cards, and supports those cards while the elevator drops sufficiently to provide an opening for insertion of a card into the stack. This movement within the apparatus 102 in the performance of the shuffling sequence offers a significant speed advantage in the shuffling operation as compared to U.S. Pat. No. 5,683,085, especially as the number of cards in the card mixing area 150 increases. Rather than having to lower the entire stack of cards to the bottom of the card receiving area and reposition the pickers (as required by U.S. Pat. No. 5,683, 085), the cards in the present apparatus may be dropped by the pickers or the elevator needs to move only a slight distance to recombine the cards supported by the separation elements 154 (a gripper, and insertion support, fingers, friction engaging support, rubber fingers, etc.) with the cards supported on the elevator platform 156.

The separation elements 154 also maintain the alignment of pads with respect to each other and grips the cards more securely than the device described in U.S. Pat. No. 5,683,085, reducing or eliminating the unintentional dropping of a card or cards that were intended to be gripped, rather than lowered. Whenever cards are dropped, the randomness of the final shuffle may be adversely affected. Although the first example of the invention shows a pair of oppositely positioned gripping members, it is possible to utilize just one gripper. For example, the opposite vertical support surface could be equipped with a rubber or neoprene strip, increasing frictional contact, allowing only one gripper to suspend groups of cards.

The elevator of a device with stationary grippers may then be moved to the next directed separation position, which would require, on average, less movement than having to reset the entire deck to the bottom of the card supporting area and then moving the picker, and then raising the picker to the card insertion point, as required in U.S. Pat. No. 5,683,085.

The microprocessor (not shown) controls and directs the operation of the shuffling apparatus 102. The microprocessor also receives and responds to information provided to it. For example, a set of sensing devices 152 are used to determine the movement point of the elevator that positions the top card in a set of cards (not shown) within the card mixing area 150 at a specific elevation. The sensing devices 152 identify when an uppermost card on the platform 156 or the top of the platform itself is level with the sensing devices 152. This information is provided to the microprocessor. A reading system 170 may also be used to provide information, such as the number of cards that have been fed from the card accepting/receiving area 106 into the card mixing area 150 so that the number of cards shuffled and the number of cards present on the platform 156 at any given time is known. This information, such as the number of cards present within the card mixing area 150, is used by the microprocessor, as later explained to randomly arrange and thus shuffle cards according to the programming of the system.

For example, the programming may be performed as follows. The number of cards in a set of cards intended to be used in the system is entered into the memory of the microprocessor. Each card in the set of cards is provided with a specific number that is associated with that particular card, herein referred to as the original position number. This is most conveniently done by assigning numbers according to positions within the original (unshuffled) set of cards. If cards are fed from the bottom of the stack into the randomizing apparatus, cards are assigned numbers from the bottom to the top. If cards are fed from the top of the stack or the front of a stack supported along its bottom edges, then the cards are numbered from top to bottom, or front to rear.

A random number generator (which may be part of the microprocessor, may be a separate component or may be external to the device) then assigns a random position number to each card within the original set of cards, the random position number being the randomly determined final position that each card will occupy in the randomly associated set of cards ultimately resulting in a shuffled set of cards. The microprocessor identifies each card by its original position number. This is most easily done when the original position number directly corresponds to its actual position in the set, such as the bottommost card being CARD 1, the next card being CARD 2, the next card being CARD 3, etc. The microprocessor, taking the random position number, then directs the elevator to move into position where the card can be properly inserted into the randomized or shuffled set of cards. For example, a set of randomized positions selected by a random number generator for a single deck is provided below. OPN is the Original Position Number and RPN is the Random Position Number.

| OPN | RPN |
|---|---|
| 1 | 13 |
| 2 | 6 |
| 3 | 39 |
| 4 | 51 |
| 5 | 2 |
| 6 | 12 |
| 7 | 44 |
| 8 | 40 |
| 9 | 3 |

-continued

| OPN | RPN |
| --- | --- |
| 10 | 17 |
| 11 | 25 |
| 12 | 1 |
| 13 | 49 |
| 14 | 10 |
| 15 | 21 |
| 16 | 29 |
| 17 | 33 |
| 18 | 11 |
| 19 | 52 |
| 20 | 5 |
| 21 | 18 |
| 22 | 28 |
| 23 | 34 |
| 24 | 9 |
| 25 | 48 |
| 26 | 16 |
| 27 | 14 |
| 28 | 31 |
| 29 | 50 |
| 30 | 7 |
| 31 | 46 |
| 32 | 23 |
| 33 | 41 |
| 34 | 19 |
| 35 | 35 |
| 36 | 26 |
| 37 | 42 |
| 38 | 8 |
| 39 | 43 |
| 40 | 4 |
| 41 | 20 |
| 42 | 47 |
| 43 | 37 |
| 44 | 30 |
| 45 | 24 |
| 46 | 38 |
| 47 | 15 |
| 48 | 36 |
| 49 | 45 |
| 50 | 32 |
| 51 | 27 |
| 52 | 22 |

The sequence of steps in the shuffling or randomizing procedure may be described as follows for the above table of card OPNs and RPNs. OPN CARD 1 is carried from the card receiving area 106 to the final nip rollers or off-set rollers 146. The final nip rollers or off-set rollers 146 place CARD 1 onto the top of the platform 156. The platform 156 has been appropriately positioned by sensing by sensors 152. OPN CARD 2 is placed on top of CARD 1, without the need for any gripping or lifting of cards. The microprocessor identifies the RPN position of CARD 3 as beneath both CARD 1 and CARD 2, so the elevator 156 lifts the cards to the gripping element 154 which grips both CARD 1 and CARD 2, then supports those two cards while the elevator retracts, allowing CARD 3 to be placed between the elevator platform 156 and the two supported cards. The two cards (CARD 1 and CARD 2) are then placed on top of CARD 3 supported by the platform 156. The fourth card (CARD 4) is assigned position RPN 51. The elevator would position the three cards in the pile so that all three cards would be lifted by the card separation element, and the fourth card inserted between the three cards (CARD 1, CARD 2 and CARD 3) and the platform 156. The fifth card (CARD 5) has an RPN of 2, so that the apparatus merely requires that the four cards be positioned below the insertion point from the last two nip rollers 146 by lowering the platform 156. Positioning of the sixth card (CARD 6) with an RPN of 12 requires that the elevator raise the complete stack of cards, the sensors 152 sense the top of the stack of cards, elevate the stack of cards so that the separation elements 154 grip only the top two cards (RPN positions 2 and 6), lower the platform 156 slightly, and then CARD 6 with an RPN of 12 can be properly inserted into an opening in the developing randomized set of cards. This type of process is performed until all 52 cards (for a single deck game) or all 104 cards (for a double deck game) are randomly distributed into the final randomized set or shuffled set of cards. The apparatus may be designed for larger groups of cards than single 52-card decks, including 52-card decks with or without special (wild cards or jokers) cards, special decks, two 52-card decks, and two 52-card decks plus special cards. Larger groupings of cards (e.g., more than 108 cards) may also be used, but the apparatus of the first example of the invention has been shown as optimized for one or two deck shuffling.

Elevation of the elevator platform 156 may be effected by any number of commercially available type systems. Motivation is preferably provided by a system with a high degree of consistency and control over the movement of the elevator, both in individual move (e.g., individual steps or pulses) and in collective movement of the elevator (the steps or revolutions made by the moving system). It is important that the elevator is capable of providing precise and refined movement and repeated movements that do not exceed one card thickness. If the minimum degree of movement of the elevator exceeds one card thickness, then precise positioning could not be effected. It is preferred that the degree of control of movement of the elevator does not exceed at least one-half the card thickness. In this manner, precise positioning of the cards with respect to the separation elements 154 can be effected. Additionally, it is often desirable to standardize, adjust, or calibrate the position of the elevator (and/or cards on the elevator) at least once and often at intervals to assure proper operation of the apparatus 102. In one example of the invention, the microprocessor calls for recalibration periodically, and provides the dealer with a warning or calibration instructions on the visual display 12 (FIG. 1).

As later described, a micro stepping motor or other motor capable of precise and small controlled movements is preferred. The steps for example may be of such magnitudes that are smaller than the card thickness, such as for example, individual steps of 0.0082 inch (approximately less than 1 card thickness), 0.0041 inch (less than ½ card thickness), 0.00206 inch (less than about ¼ card thickness), 0.0010 inch (less than about ⅛ card thickness), 0.00050 inch (less than about 1/16 card thickness), 0.00025 inch (less than about 1/32 card thickness) 0.000125 inch (less than about 1/64 card thickness), etc.

Particularly desirable elevator control mechanisms would be servo systems or stepper motors and geared or treaded drive belts (essentially more like digital systems). Stepper motors, such as micro-stepper motors, are commercially available that can provide or can be readily adjusted to provide incremental movements that are equal to or less than one card thickness, with whole fractions of card thicknesses, or with indefinite percentages of card thicknesses. Exact correspondence between steps and card thickness is not essential, especially where the steps are quite small compared to the card thickness. For example, with a card thickness of about 0.279 mm, the steps may be 0.2 mm, 0.15 mm, 0.1 mm, 0.08 mm, 0.075 mm, 0.05 mm, 0.04 mm, 0.01 mm, 0.001 mm or smaller, and most values therebetween. It is most desirable to have smaller values, as some values, such as the 0.17 mm value of a step, can cause the gripper in the separation element to extend over both a target position to be separated and the next lower card in the stack to be gripped, with no intermediate stepping position being available. This is within the control of the designer once the fundamentals of the process have been understood according to the present description of the practice of the invention. As shown in FIG. 2, a drive belt 164 is attached to two drive rollers 166 which move the elevator platform 156. The drive belt 164 is driven by a stepper motor system 171 that is capable of 0.00129 inch (0.003 mm) steps.

Figure 3:
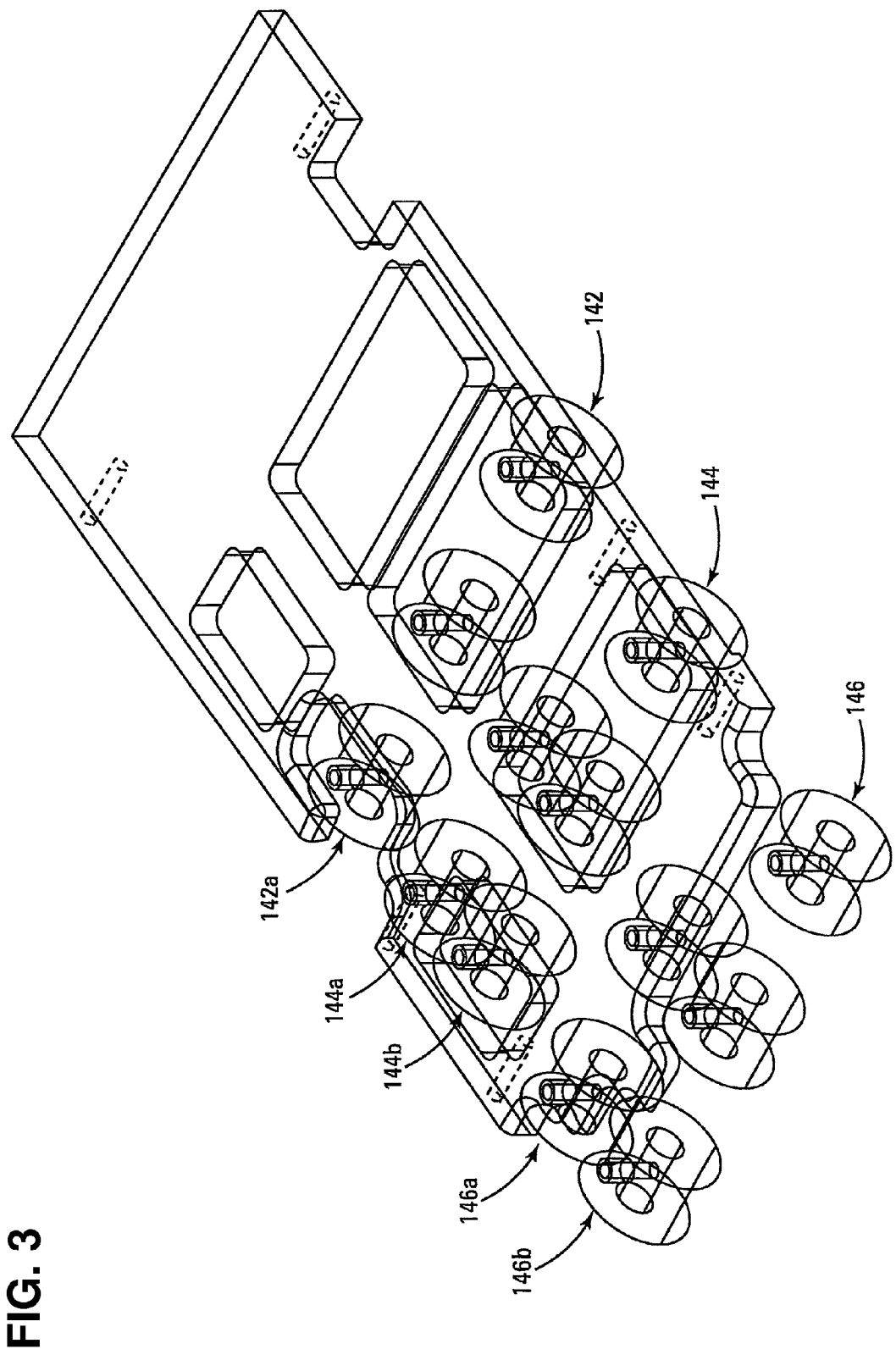
FIG. 3 shows a perspective view of an off-set card transport mechanism according to an embodiment of the invention.

FIG. 3 shows a perspective cutaway of the nip rollers or offset rollers 142, 144 and 146 of a first example of the invention. These are not truly sets of nip rollers, but are off-set rollers, so that rollers 142a and (not shown), 144a and 144b, 146a and 146b are not precisely linearly oriented. By selecting a nip width that is not so tight as to press a card from both sides of the card at a single position, and by selecting offset rollers rather than aligned nip rollers, fluid movement of the card, reduced damage of the card, and reduced jamming may be provided. This is a particularly desirable aspect of a preferred practice of the present invention, which is shown also in FIG. 4.

Figure 4:
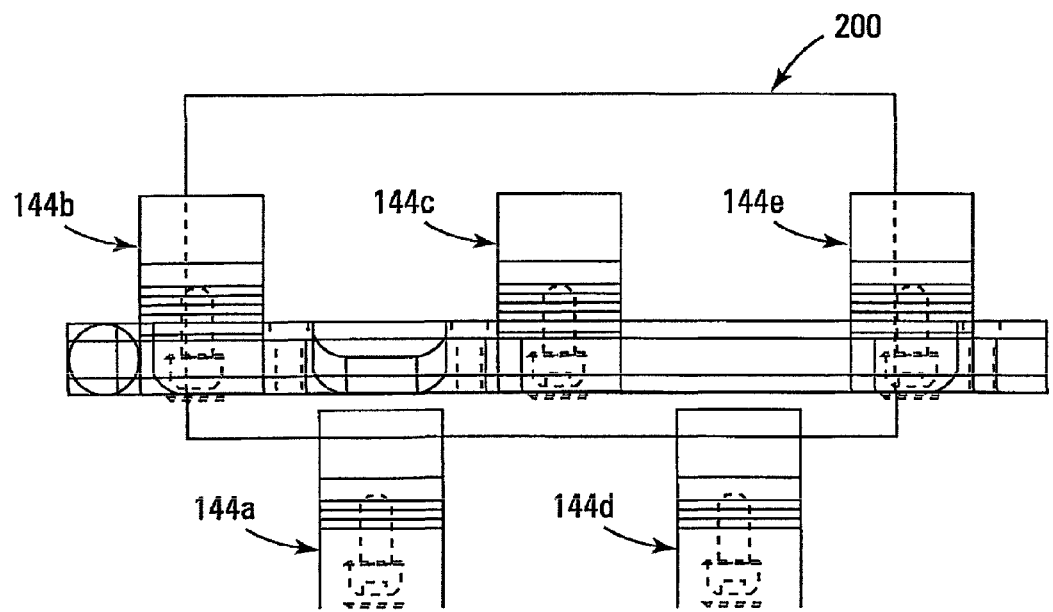
FIG. 4 shows a top view of an off-set card transport mechanism according to an embodiment of the present invention.

FIG. 4 shows a set of off-set rollers 144a, 144b, 144c, 144d and 144e transporting a card 200. The card 200 is shown passing over rollers 144a and 144d and under rollers 144b, 144c and 144e. As can be seen, the rollers are not capable of contacting a card to precisely overlap at a specific point on opposite sides of a card.

Figure 5:
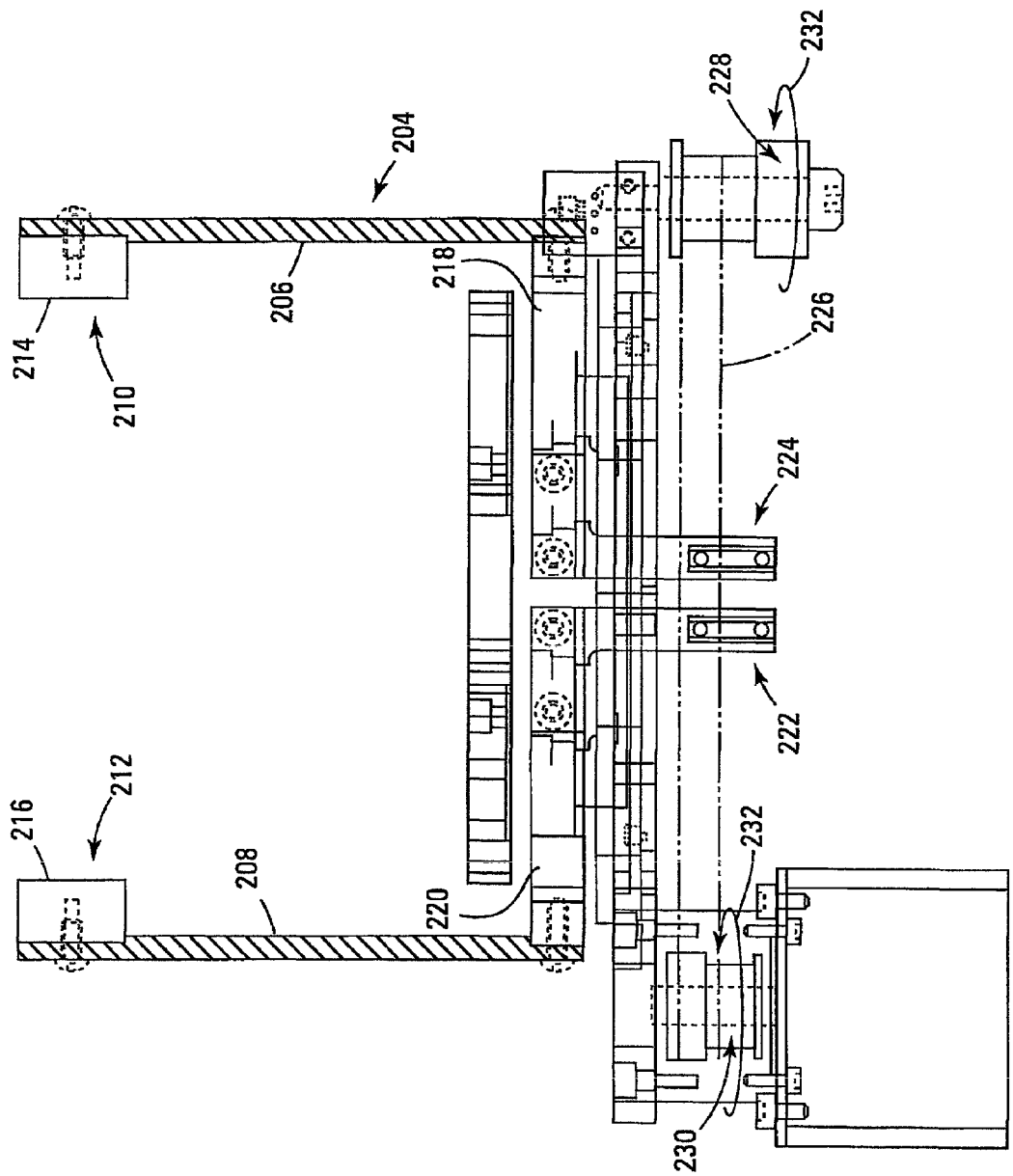
FIG. 5 shows a cross-sectional view of an embodiment of a picking system with a single or joint belt drive for moving picker elements.

FIG. 5 shows a cross-sectional view of one embodiment of a gripping system 204 that may be used in the practice of the invention. FIG. 5 shows two oppositely spaced support arms 206 and 208 that support gripping elements 210 and 212, which comprise semi-rigid gripping pads 214 and 216. These gripping pads 214 and 216 may be smooth, grooved, covered with high friction material such as rubber or neoprene, ribbed, straight, sloped or the like to take advantage of various physical properties and actions. The support arms 206 and 208 are attached to separately movable positioning arms 218 and 220. These positioning arms are referred to as separately movable, in that they are not physically connected, but one tends to move from left to right while the other moves right to left (with respect to the view shown in FIG. 5) as the two positioning arms 218, 220 move in and out (substantially horizontally) to grip or release the cards. However, preferably they do not move independently, but should move in concert. It is also desirable that they are fixed with respect to the vertical. If the positioning arms moved completely independently (horizontally, during gripping), with only one moving to attempt to contact the cards at a time, the first contacting arm could move cards out of vertical alignment. For this reason, it is preferred that two opposed gripping arms be used.

Although the arms may not move the gripping pads 214 and 216 into contact with absolute precision, they should contact opposite edges of the cards at approximately the same time, without moving any cards more than 5% of the length of a card (if contacted lengthwise) or 7% of the width (if contacting the cards widthwise). An example of one mechanism for moving the positioning arms in concert is by having a drive belt 226 that engages opposite sides of two connectors 222 and 224 that are attached to positioning arms 220 and 218, respectively. The belt 226 contacts these connectors 222 and 224 on opposite sides, such as contact connector 224 on the rear side, and contact connector 222 on the front side. As the belt 226 is driven by rotors 228 and 230, with both rotors 228 and 230 turning in direction 232, connector 222 will be moved from left to right, and connector 224 will be moved from right to left. This will likewise move contact pads 214 and 216 inwardly to grip cards. The use of such pads is much preferred over the use of rigid, pointed, spatula-like elements to separate cards, as these can damage cards, not only increasing the need for replacement, but also by marking cards which could reduce security.

Alternative constructions comprise a flat elastic or a rubbery surface with knobs or nubs that extend upwardly from the surface to grab cards when pressed into contact with the sides of the cards. These elements may be permanently affixed to the surfaces of the pickers or may be individually removable and replaceable. The knobs and the flat surface may be made of the same or different materials, and may be made of relatively harder or softer, relatively rigid or relatively flexible materials according to design parameters.

The apparatus may also contain additional features such as card reading sensor(s) such as an optical sensor, neural sensing network, a video imaging apparatus, bar code reading, etc., to identify suits and ranks of cards; feed means for feeding cards sequentially past the sensor; at various points within the apparatus; storing areas in which the cards are stored in a desired order or random order; selectively programmable artificial intelligence coupled to the sensor(s) and to the storing areas to assemble in the storing areas groups of articles in a desired order; delivery systems for selectively delivering the individual articles into the storing areas, and collector areas for collecting collated or randomized subgroups of cards.

One suitable card reading system is a CMOS black and white two-dimensional camera such as the cameras disclosed in U.S. patent application Ser. No. 11/484,011, filed Jul. 7, 2006, now U.S. Pat. No. 7,933,448, issued Apr. 26, 2011, and entitled Card Reading System Employing CMOS Reader. The contents of this disclosure is incorporated herein by reference.

It has been found in the practice of the present technology that other ranges of wavelengths of illumination are more efficient than "only blue" in addressing the issues of red color variance. In particular, illuminating light with a higher content of green light. Green light is more efficiently absorbed by red pigment than other wavelengths of illuminating light and therefore the image captured by green illuminated red appears more black than with any other illuminating visible light. A preferred illumination light would contain at least 40% of its total energy content or fluence against the playing card surface (e.g., at least 40% of joules/cm$^2$) comprises green light, radiation between 490 nm and 525 nm, between 500 nm and 520 nm, and between 505 nm and 515 nm, with green typically centered at 510 nm By having at least 40%, at least 50%, at least 60%, at least 70%, at least 80%, at least 90% or about 100% of the fluence in the range of green, sharper blacks are seen in the red regions by cameras or optical imagers, and the speed of the cards past the image detectors or cameras may be increased without loss of efficiency.

Although green has been established as the preferred illuminating wavelength, it is apparent that ultraviolet (UV) illuminating radiation, Near Infrared (NIR, 750 nm to 900 nm), Infrared (750 nm to 1200 nm) and far Infrared (900 nm to 1200 nm) operate in a different and more efficient manner than does blue light. The reason for this is that the absorption outside the visible region is effected in a broader range by a broader number of materials (pigments) outside the visible range. Even Infrared radiation can be absorbed by a wide range of dyes and pigments, and therefore appear black to a camera.

Fluence is the energy per unit area. Fluence is time times flux. Flux is the power per unit area. The flux from the sun at the earth is 1367 Watts per square meter. This total power is often divided up into different frequency or wavelength bands, giving for example Watts per square meter per Hertz or ergs per square cm per second per micron. One Jansky is $10^{-26}$ Watts per square meter per Hertz. Flux and fluence can be readily measured by existing commercial equipment typically used in research and development in industry and at universities, such as radiometers, phototubes and photodetectors.

Phototubes: These are special vacuum tubes with a cathode sensitive to light. Special components on their cathodes make these devices more sensitive to the UVC area. They have excellent sensitivity with good linearity, dynamic range and stability. However they have poor ambient noise performance ("dark current"), their vacuum glass bodies are fragile, they are susceptible to vibration (microphonic noise) and to electromagnetic fields (like the ones generated by UV lamp ballasts); some units require cooling or high voltage.

Photodiodes: These are radiation-sensitive semiconductors manufactured in the same way as diodes, in which basically the surface of the chip, which is sensitive to some part of the electromagnetic spectrum, is larger and exposed to the radiation source. Photodiodes have many advantages including low cost, very good sensitivity, stability and dynamic range. In addition they have excellent linearity, reproducibility and ruggedness. The more organized distribution of radiation within the practice of technology described herein can be both broadly and narrowly characterized in various formats, as follows. The various color-name identified wavelengths of visible light in the electromagnetic spectrum are generally described as follows: Violet light—The visible violet light has a wavelength of about 400 nm, and an accepted range for defining violet light is about 390 nm to 415 nm Within the visible wavelength spectrum, violet and blue wavelengths are scattered more efficiently than other wavelengths. The sky looks blue, not violet, because our eyes are more sensitive to blue light (the sun also emits more energy as blue light than as violet).

Indigo light—The visible indigo light has a wavelength of about 445 nm and an acceptable range for defining indigo light is about 415 nm to 460 nm.

Blue light—The visible blue light has a wavelength of about 475 nm Because the blue wavelengths are shorter in the visible spectrum, they are scattered more efficiently by the molecules in the atmosphere. An acceptable range for defining blue light is about 460 nm to 490 nm.

Green light—The visible green light has a wavelength of about 510 nm Grass, for example, appears green because all of the colors in the visible part of the spectrum are absorbed into the leaves of the grass except green. An acceptable range for defining green light is about 490 nm to 555 nm.

Orange light—The visible orange light has a wavelength of about 590 nm. A generally acceptable range for the definition of Orange light is about 580 nm to 600 nm.

Red light—The visible red light has a wavelength of about 650 nm. At sunrise and sunset, red or orange colors are present because the wavelengths associated with these colors are less efficiently scattered by the atmosphere than the shorter wavelength colors (e.g., blue and purple). A large amount of blue and violet light has been removed as a result of scattering and the long wave colors, such as red and orange, are more readily seen. A generally acceptable definition for the range of red light is about 600 nm to 760 nm.

Ultraviolet light is radiation having wavelengths in a long range below violet light, usually down to 150 nm, including all of Ultraviolet A, B and C.

Infrared radiation is usually estimated as between about 750 nm (the highest edge of red light) and 1200 nm.

Given these ranges, the broadest coverage that can be seen for improving image capability in playing card reading systems wherein symbols representing suit and rank are read by imaging devices, improvement can be expected by using illuminating radiation having at least the 40% and higher percentages noted above of radiation that is ultraviolet, violet, indigo, green (including blue green which extends from about 485 nm to 495 nm), yellow, orange and infrared radiation, especially IR between about 800 nm and 1200 nm, and 850 nm and 1200 nm. It is more preferred that the radiation include at least 40% fluence from any of the following sets or groups: 1) UV, violet, indigo, blue-green, green, and infrared (preferably within the ranges identified above, or basically, radiation excluding blue, yellow, orange and red (and possibly near IR between 750 nm and 800 nm or 850 nm); 2) UV, blue-green, green and IR (as described above); 3) UV, blue-green and green; 4) UV and green; and 5) green. As noted elsewhere, as the total fluence is more and more limited to these specific wavelength ranges, the efficiency of the system improves significantly, allowing higher speed of card throughput because of the greater contrast (denser black) perceived by the reading/imaging equipment.

The sensor(s) may include the ability to identify the presence of an article in particular areas, the movement or lack of movement in particular areas, the rank and/or value of a card, reading of cards to identify spurious or counterfeit cards and detection of marked cards. This can be suitably effected by providing the sensor with the capability of identifying one or more physical attributes of an article. This includes the sensor having the means to identify indicia on a surface of an article. The desired order may be a specific order of one or more decks of cards to be sorted into its original pack order or specific order, or it may be a random order into which a complete set of articles is delivered from a plurality of sets of randomly arranged articles. For example, the specific order may be effected by feeding cards into the card accepting area with a sensor identifying the suit and rank, and having a pre-established program to assign cards, based upon their rank and suit, into particular distributions onto the elevator platform. For example, a casino may wish to arrange the cards into pack order at the end of a shift to verify all cards are present, or may want to deal cards out in a tournament in a specified random order. The sensing can take place in the card receiving area when the cards are stationary, or while the cards are in motion.

The suit, rank and position of all cards in the card accepting/receiving area will then be known, and the program can be applied to the cards without the use of a random number generator, but with the microprocessor identifying the required position for that card of particular suit and rank. The card may also be read between the off-set rollers or between the last off-set roller and the platform, although this last system will be relatively slow, as the information as to the card content will be known at such a late time that the platform cannot be appropriately moved until the information is obtained.

For example, the desired order may be a complete pack of randomly arranged playing cards sorted from holding means which holds multiple decks, or a plurality of randomly oriented cards forming a plurality of packs of cards. This may be achieved by identifying the individual cards by optical readers, scanners or any other means and then under control of a computer means such as a micro-processor, placing an identified card into a specific collector means to ensure delivery of complete decks of cards in the desired compartment. The random number generator is used to place individual cards into random positions to ensure random delivery of one to eight or more decks of cards, depending on the size of the device.

In one aspect of the invention, the apparatus is adapted to provide one or more shuffled packs of cards, such as one or two decks for poker games or blackjack. According to another aspect of the invention, a method of randomizing a smaller or larger group of cards is accomplished using the device of the present invention. According to the invention, the method includes the steps of 1) placing a group of cards to be randomized into a card in-feed tray; 2) removing cards individually from the card in-feed tray and delivering the cards into a card collection area, the card collection area having a movable lower surface, and a stationary opening for receiving cards from the in-feed tray; 3) elevating the movable lower surface to a randomly determined height; 4) grasping at least one edge of a group of cards in the card collection area at a point just above the stationary opening; 5) lowering the movable lower surface to create an opening in a stack of cards formed on the lower surface, the opening located just beneath a lowermost point where the cards are grasped; and 6) inserting a card removed from the in-feed tray into the opening. According to the method of the present invention, steps 2 through 6 are repeated until all of the cards originally present in the in-feed tray are processed, forming a randomized group of cards.

As described above, the method and apparatus of the present invention can be used to randomize groups of cards, as well as sort cards into a particular desired order. When sensing equipment is used to detect rank and suit of the cards, the cards can be arranged in any predetermined order according to the invention. It is to be understood that numerous variations of the present invention are contemplated, and the disclosure is not intended to limit the scope of the invention to the examples described above. For example, it might be advantageous to tip the card mixing area 150 slightly such that a top portion is further away from the card receiving area 106 than a bottom portion. This would assist in aligning the stack vertically in mixing area 150 and would increase the efficiency and accuracy of the randomization or ordering process. In one preferred embodiment, the card-receiving area 106 is tipped between 3 and 8 degrees from the vertical.

In another embodiment of the invention, the shuffler is mounted into the table such that an in-feed tray or card receiving area 106 is recessed beneath the top surface of a gaming table, and a lower horizontal surface of the elevator platform 156 of the delivery area or card return area 132 in its upright position is flush with the elevation of the gaming table surface.

Although the machine can sit on the table top, it is preferably mounted on a bracket having a support surface located beneath the gaming table surface, and is completely surrounded by the table top, enabling a dealer to obtain and return cards without undue lifting above the surface of the gaming table. In one embodiment, the entire shuffler is mounted into the gaming table such that the in-feed tray and card return areas are either flush or approximately flush with the gaming table surface. Such an arrangement would be particularly suited for use in conventional poker rooms.

In a second example of the invention, the device is configured to process larger groups of cards, such as a stack of eight complete decks. The individual components operate in much the same manner, but the specific configuration is designed to accommodate the greater height of the stack.

Figure 6:
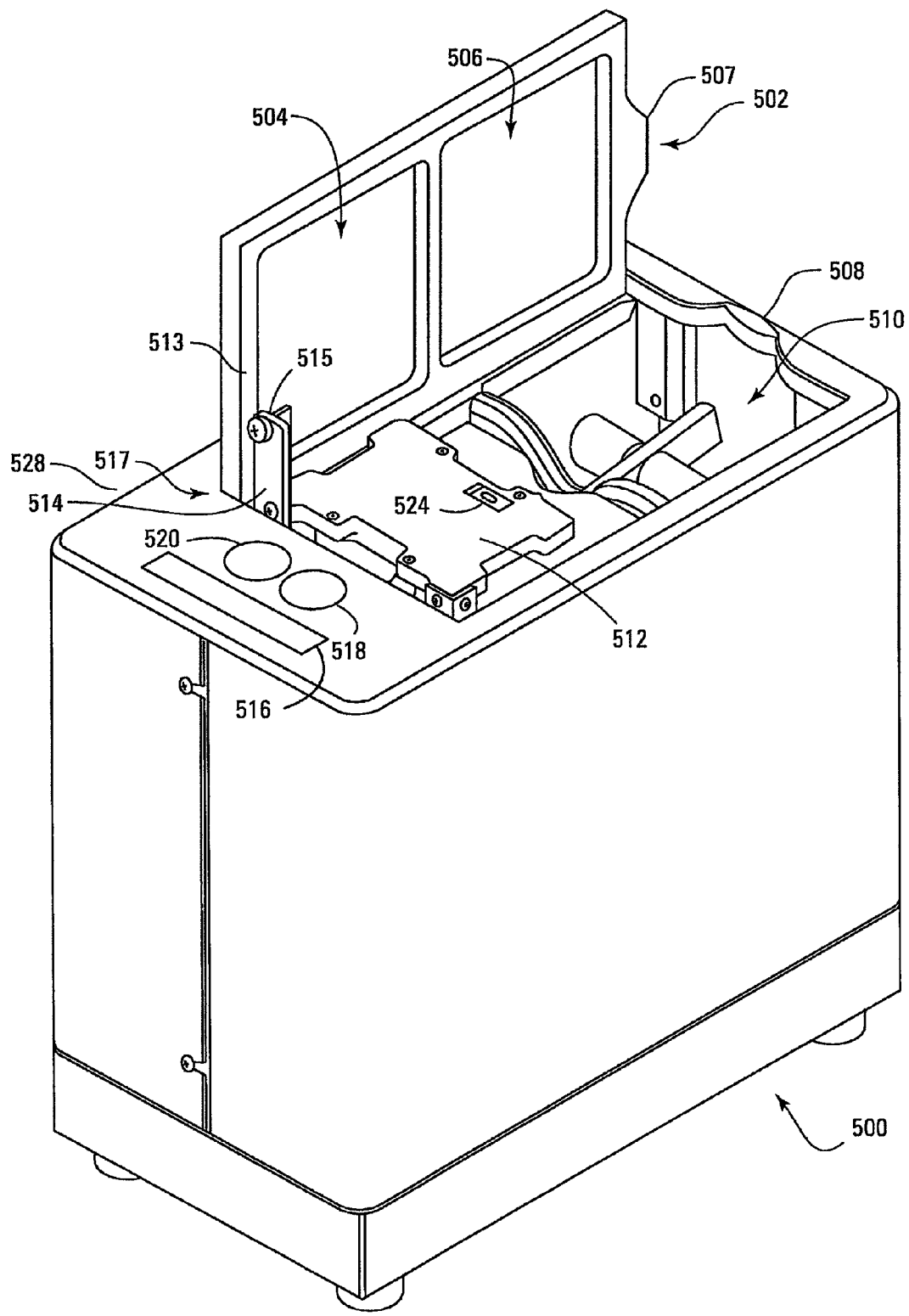
FIG. 6 shows a perspective view of another embodiment of a shuffling apparatus according to the invention.

FIG. 6 shows a vertical perspective view of another shuffling apparatus 500 according to the invention. That apparatus 500 is shown with a flip-up cover 502 with sections 504 and 506 that overlay the elevator platform 512 and the card insertion area 510. An extension or tab 507 is provided to nest into open area 508 to assist lifting of the flip-up cover 502 when needed. The open area 508 leaves some additional space for a finger or tool to be inserted against the extension 507 to assist in its lifting. That additional space may be designed to accommodate only a tool so as to reduce any possibility of ready player opening of the shuffling apparatus 500. In a preferred embodiment of the invention, there is provided an arm extension 514 of the elevator that contacts an internal edge 513 of the flip-up cover 502, here with a roller 515 shown as the contact element, to lift the cover 502 when the elevator platform 512 rises to a level where cards are to be removed, the extension 514 forces the cover 502 to lift from the top 517 of the shuffling apparatus 500. The extension 514 also will buffer playing cards from moving as they are lifted from the elevator platform 512, although additional elements (not shown) may be used to restrain movement of the cards when elevated to a removal level. In this example of the invention, side panels are not used to stabilize the stack of delivered cards.

FIG. 6 also shows a display panel 516, which may be any format of visual display, particularly those such as LED panels, liquid crystal panels, CRT displays, plasma displays, digital or analog displays, dot-matrix displays, multi-segment displays, fixed panel multiple-light displays, or the like, to provide information to a viewer (e.g., dealer, casino personnel, etc.). The display panel 516 may show any information useful to users of the apparatus, and show such information in sufficient detail as to enable transfer of significant amounts of information. Such information might include, by way of non-limiting examples, the number of cards present in the apparatus, the status of any shuffling or dealing operations (e.g., the number of complete shuffling cycles, hand information (such as the number of hands to be dealt, the number of hands that have been dealt, the number of cards in each hand, the position to which a hand has been dealt, etc.), security information (e.g., card jam identification, location of card jams, location of stuck cards, excess cards in the container, insufficient cards in the container, unauthorized entry into the apparatus, etc.), confirmation information (e.g., indicating that the apparatus is properly corresponding to an information receiving facility such as a network or microprocessor at a distal or proximal location), on-off status, self-check status, and any other information about play or the operation of the apparatus that would be useful. It is preferred that the display and the software driving the display be capable of graphics display, not merely alphanumeric.

Buttons 518 and 520 can be on-off buttons, or special function buttons (e.g., raise elevator to the card delivery position, operate jam sequence, reshuffle demand, security check, card count demand, etc.) and the like. A sensor 524 (e.g., optical sensor, pressure sensor, magnetic detector, sonar detector, etc.) is shown on the elevator platform 512 to detect the presence of cards or other objects on the elevator platform 512.

Figure 7:
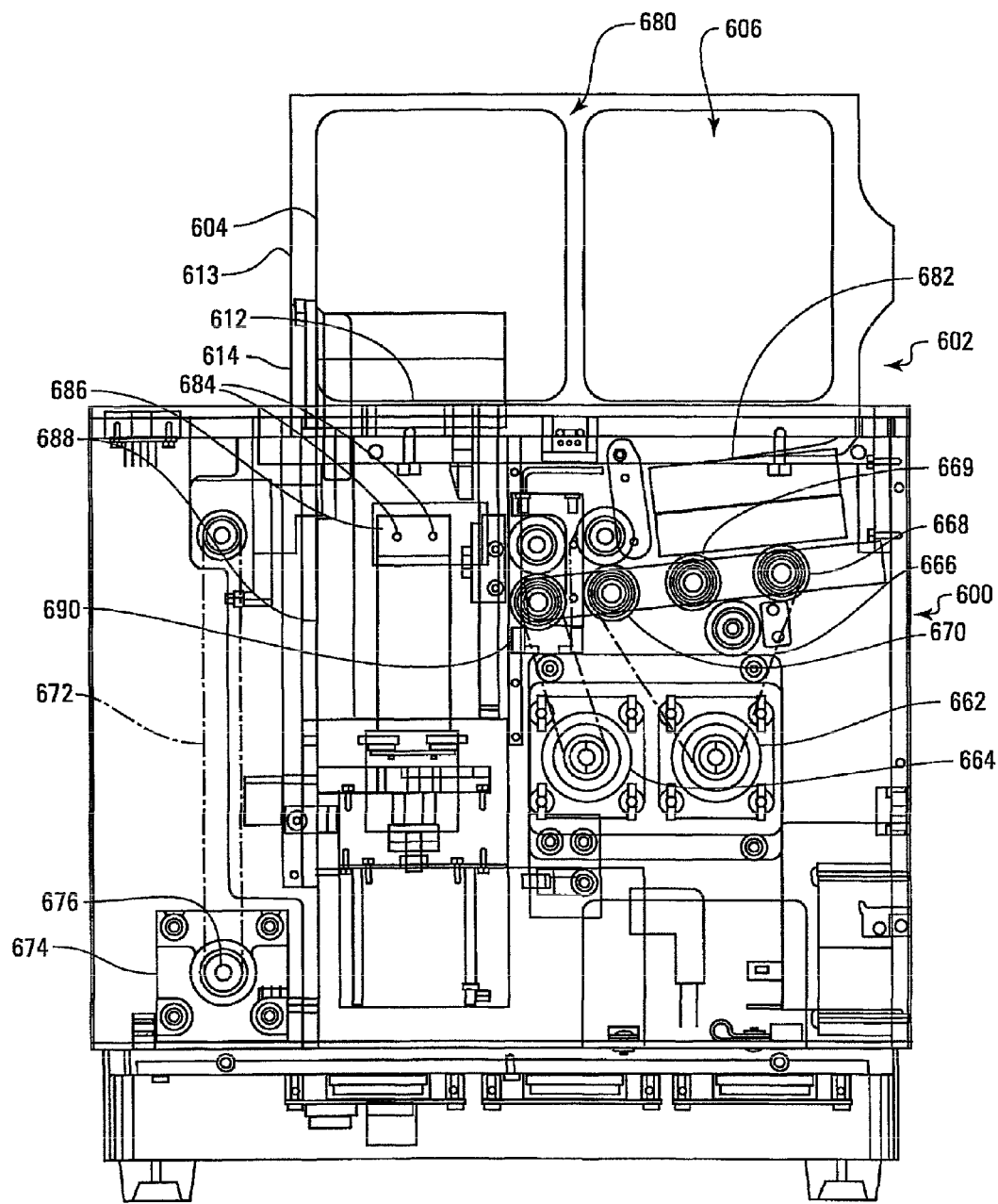
FIG. 7 shows a side cut away view of one embodiment of a shuffling apparatus according to the invention.

FIG. 7 is a side cutaway view of an apparatus 600 according to an aspect of the invention, which may be compared with FIG. 2 to provide an explanation of components and some of the variations possible within the practice of the invention. For example, the use of two belt drive motors 662 and 664 versus the three shown in FIG. 2 allows for the apparatus 600 to be shortened, with belt drive motor 662 driving a belt 666 that moves three rollers 668, 669 and 670. The roller pair 144 is removed from this example of the invention as superfluous. The drive roller 166 in FIG. 2 that raises the elevator 156 is partially eliminated by having an elevator drive belt 672 driven by the motor 674 and the attached spindle 676, which have been positioned in direct alignment with the drive belt 672 in FIG. 7, instead of the right angle, double belt connection shown in FIG. 2. Again, as the drive belt 672 moves far enough to display cards (not shown) on the elevator platform 612, the extension 614 presses against the edge 613 of the cover section 604, elevating the cover top 602. The apparatus 600 is actually preferably configured with the sections 604 and 606 separated along area 680 so that they move independently. By separating these sections 604 and 606, only the cards readied for delivery are exposed, and access to the area 682 where unshuffled cards are to be inserted is more restricted, especially where, as noted above, a tool or implement is needed to raise the cover section corresponding to section 606 so that the unshuffled cards may not be too readily accessed.

In FIG. 7, the motors 662, 664 and 674 are preferably highly controlled in the degree of their movement. For example, one of the methods of providing precise control on motor movement is with micro stepped motors. Such micro stepping of motors controls the precise amount of movement caused by the motor. This is especially important in motor 674 that drives the elevator platform 612 that in turn carries the cards (not shown) to be separated for random card insertion. With micro stepping, the movement of the cards can be readily controlled to less than a card thickness per micro step. With such control, with no more than 0.9 card thickness movement, preferably less than 0.8 card thickness movement, less than 0.5 card thickness movement, less than 0.4 card thickness movement, less than ⅓ card thickness movement, less than 0.25 card thickness movement, less than 0.20 card thickness movement, and even less than 0.05 card thickness movement per micro step, much greater assurance of exact positioning of the elevator platform 612 and the cards thereon can be provided, further assuring that cards will be inserted exactly where requested by operation of the microprocessor. Sensing elements 684 may be positioned within the picker or grabbing element 686 to analyze the position of the picker with respect to cards being separated to determine if cards have been properly aligned with the picker 686 and properly separated. The grabbing element 686 may alternatively be physically protruding sub-elements that grab small areas of cards, such as rubber or elastomeric bumps, plastic bumps, metal nubs, or the like. Sensors may alternatively be placed on other surfaces adjacent the picker 686, such as walls 688 or 690 or other adjacent walls or elements. For increased security and enhanced performance, it is preferred that multiple sensors be used, preferably multiple sensors that are spaced apart with regard to edges of the cards, and multiple sensors (i.e., at least two sensors) that are positioned so that not only the height can be sensed, but also misalignment or sloping, or bending of cards at different locations or positions. The sensors can work independently of or in tandem with the microprocessor/step motor/encoder operation.

The micro-step motors will also assist the apparatus in internal checks for the correct position. For example, an encoder can be used to check the exact position of the elevator with regard to the measured movement and calculation of the precise movement of the elevator platform and hence the cards. The encoder can evaluate the position of the elevator platform through analysis and evaluation of information regarding, for example, the number of pulses/revolution of the spindle 676 on the motor 674, which may be greater than 100 pulses/revolution, greater than 250 pulses/revolution, greater than 360 pulses/revolution, greater than 500 or greater than 750 pulses/revolution, and in preferred embodiments, greater than 1000 pulses/revolution, greater than 1200 pulses/revolution, and equal to or greater than 1440 pulses/revolution. In operation, the microprocessor moves the motor, the encoder counts the amount of movement driven by the motor, and then determines the actual position of the elevator platform or a space (e.g., four cards higher) relative to the elevator platform. The sensors may or may not be used to determine the correct position, initially calibrate movement and sensing positions on the platform, or as a security check.

An additional design improvement, with respect to the apparatus of FIG. 1 and that of FIGS. 6 and 7, is the elimination of a staging area in the apparatus design of FIG. 1. After a card (not shown) in FIG. 1 passes from rollers 140 to rollers 144, but before being passed to rollers 146, the card would be held or staged by rollers 144. This can be eliminated by the design of rollers shown in FIGS. 6 and 7, with the movement of the cards timed to the movement of the elevator platform and the separation of the cards by the pickers.

The shuffling apparatus 500 shown in FIG. 6 is also provided with an outer flange 528 extending around an upper edge of the top surface that may be used to attach and support the apparatus 500 to a table or support the apparatus 500 so that the top 517 is relatively parallel to the surface of the table or surface.

The use of a shuffler whose shuffling mechanism is concealed completely beneath the gaming table surface potentially poses security issues to a casino. In the event of a system malfunction, the dealer might not be aware that a shuffling sequence has failed. Since there is no way to visualize the shuffling routine, and in order to avoid instances where the display lights may malfunction and erroneously show a shuffling sequence has been completed, an added level of security has been provided to the shuffler of the present invention.

According to the present invention, a number of cards to be randomized and the order of insertion of each card into the card randomizing or shuffling compartment is predetermined by the random number generator and microprocessor. By adding an encoder to the motor or motors driving the elevator, and by sensing the presence of groups of suspended cards, the microprocessor can compare the data representing the commands and the resulting movements to verify a shuffle has occurred. In the absence of this verification, the shuffler can send a signal to the display to indicate a misdeal, to a central pit computer to notify management of the misdeal, to a game table computer, if any with an output display to notify the dealer of a misdeal, to a central computer that notifies security, to a central system for initiating maintenance calls or combinations of the above.

Such a system is referred to as a "closed loop" system because the microprocessor creates the commands and then receives system signals verifying that the commands were properly executed.

Although the dealer control panel and display in the above examples of the present invention are located on the card shuffler, the present invention contemplates user-operated remote controls, such as a foot pedal, an infrared remote control, the input of commands from a remote keyboard in the pit or other device initiated by a dealer or by management. Unlike the shuffler operation driven by software from a game computer, pit computer or central computer system, the shuffler of the present invention is controllable by an operator using remote equipment such as what is described above.

Although the randomizing system has been described as a vertically disposed stack of cards with a means for gripping a portion of the cards, and lowering the remaining cards to form two separate subgroups, forming an insertion point, the invention contemplates the use of a shuffler with a carousel-type card collection area. The gripping pads in this example of the invention grip a portion of cards that are horizontally disposed, and the card collection area rotated to create an insertion point for the next card. The cards are pushed out one at a time, or in groups to a card collection area.

Figure 8:
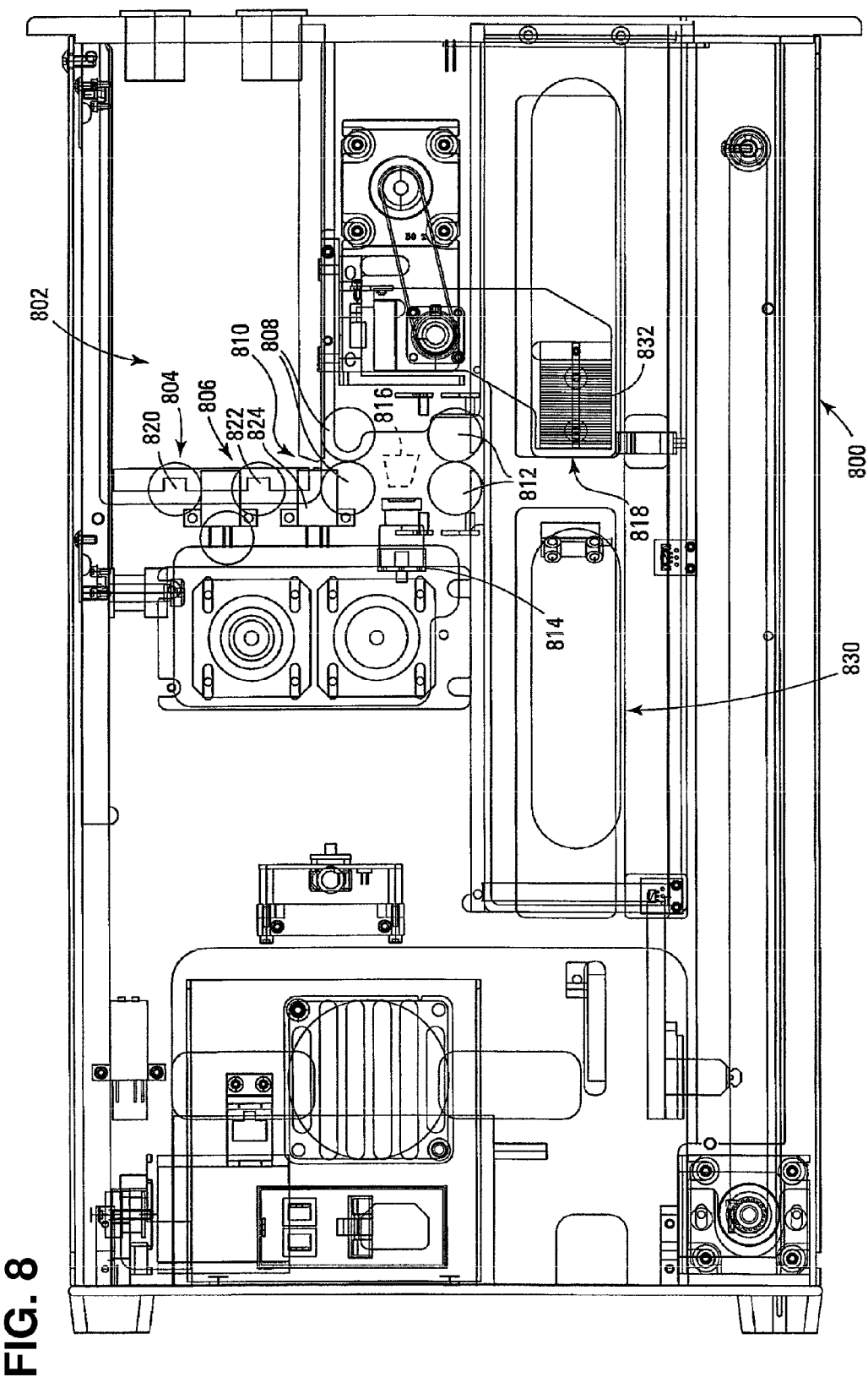
FIG. 8 shows a perspective view of another example of an exterior of a shuffling apparatus of the present invention.

Referring now to FIG. 8, a perspective view of an apparatus of the present invention is shown mounted to a shuffler support plate behind a gaming table (not shown) that may or may not be modified to accommodate placement of the support plate.

In this example of the invention, cards are loaded into an in-feed tray. In one example of the invention (not shown), the lower surface of the in-feed tray is substantially horizontal and is provided so that cards can be loaded into the top of the shuffler, and then lowered beneath the gaming table surface for randomization.

The in-feed elevator may be equipped with a card support structure similar to the support structure surrounding delivery tray, which in a preferred embodiment has two vertical supports and two sides are left open. Cards may be loaded into the in-feed tray and into a card support structure (not shown), and lowered automatically, in response to the dealer pushing downwardly on the top of the stack of cards or upon a signal received from the dealer controls (not shown).

In this example of the invention, the loading station is positioned near the playing surface (for example, a casino table) and at the dealer's side, allowing the machine to be used without unnecessary strain or unusual needed physical movement on the part of the dealer. Loading and unloading large stacks of cards from the top of a machine that is mounted to eliminate lifting, straining or reaching large distances addresses a need long felt in the industry for a more ergonomically friendly card shuffler.

The output tray elevator in the second described embodiment also includes a two-sided vertical structure for supporting a group of randomized cards as the cards are raised to the top surface of the shuffler. It is to be understood that the vertical support structures are preferably secured to the elevator platforms, but could also be secured to the frame, and attached in a manner to pop up into position when needed.

A method of handling cards is described, including inserting the cards into a card in-feed tray, feeding the cards into a card randomization apparatus, capturing the randomized cards in a support structure and raising the cards and support structure to an upper surface of the shuffler. The method may comprise providing a retractable support structure for extracting shuffled cards, inserting shuffled cards into the support structure while it is below the top surface of the device and moving the support structure to expose the cards and retracting the support structure both before and after card removal. The card in-feed tray may also be positioned on an elevator capable of lowering the group of cards into the apparatus prior to shuffling. When a second elevator is used, it is preferable to provide a retractable support structure for supporting the cards as the cards are lowered for shuffling.

The method preferably includes providing two separate support structures that support a vertically stacked group of cards on at least two surfaces, and preferably three. The support structure can be a solid three-sided box, could consist of three vertically disposed bars, two parallel plates and two angle irons to retain corners or any other structure that keeps the stack in vertical alignment, or other suitable support structure. The structure can be fixed to the upper surface of the shuffler, can be fixed to the elevators or can be affixed to the frame of the shuffler and constructed to "pop up" when needed for card loading and unloading. Cover plates, such as hinged or rotating plates, can be provided over the two elevators to provide additional cover (e.g., dust cover and visual cover) over the card source and the card collection areas to assure that visual inspection of the shuffling procedure can be reduced, and entry of foreign materials can be reduced. The cover plates should be light enough for the system to automatically lift the covers or for a dealer to easily lift the covers manually. The cards themselves may push up the cover plates, or a preceding post or element can be positioned on the elevator or supports attached or moving conjointly with the elevators to press against the interior surface of the cover plates to lift the plates in advance of contact with the cards.

The card reading capability, as described in greater technical detail later, can be used in a different number of modes and positions to get the benefits of the present invention. The card reading capability (by some visual data-taking element, such as a camera, scanner, reflection scanner, image bit recorder, image edge detector, or any other subcomponent that can image a card or convert a visual image of the card into reproducible data) can be located at various positions within the shuffler where it can be assured of imaging each card before it is removed from the shuffler. This preferably is being done in the present invention internally in a shuffling machine where cards are not removed one at a time from a dealing end or fed as hands or groups of cards (but less than the entire set of cards) to be removed in a subgroup of the entire set of cards placed into the shuffler. In one example of the invention, a video camera is used as a rank/suit scanner.

The benefits of the present system may be used in those less preferred shuffling devices, including continuous shufflers, especially where the continuous shufflers monitor the position of cards in the shuffled set from which cards are removed for play of a game, so that a constant inventory of the number, suit, rank and position of each and all cards can be maintained. Numerous types of image data-taking devices or image capture devices that can provide the image data necessary to "read" the symbols on the card sufficiently so as to distinguish individual card's rank at least by rank and preferably by rank and suit (and any other special markings that may be present on cards for special games) are available or are readily within the skill of the artisan to be constructed. Such image capture devices may be continuous (rapid frame-by-frame) video cameras, digital camera, analog cameras, reader/scanners, edge response detectors, reflectance readers, and the like, and may optionally have lighting elements (for example, filament lighting, light emitting diodes, lamps, electromagnetic spectrum emitters of any type, and the like) present to improve the lighting during image capture. The cards can be read during the randomization procedure either when the cards are stationary or in motion, without any special stop positions or delays in the movement of cards. The cards are read in such a manner that the rank and suit of each card in a complete set of cards (e.g., all of the cards within the device) are identified in a randomized set by position of each card and the rank and suit of each card in each position. It is also important to note that in a shuffling mode, the final set of cards is a randomized set of cards and not merely a collection of cards in a slightly different order from an original set of cards (e.g., previously played, unshuffled, hand-mixed, or the like). In another mode, cards are passed through the scanner without being shuffled for the purpose of rapidly verifying the content of the deck. One possible way of distinguishing a randomized deck of cards from a merely mixed deck or programmed collection of cards would be to use a statistical analysis program, or using another criteria, such as where fewer than 100% of the cards in a final set of at least 52 cards are not within 10 cards distance from adjacent cards within an original set.

As a general statement, the card reading capability should be directed towards a face of the cards so that edge reading (which requires specially marked cards) is not practiced or required. To do this, the camera or other image data-taking element should view at least a symbol marked corner of a card. This is not a problem, as standard cards have their symbols (or suit and rank) in opposite corners so that rotating a card will leave the symbol in the same corner position for viewing. Given this background, the image data-taking component (hereinafter, an "IDC" or alternatively referred to as an image capture device) could be located as follows. If there is a feeding mechanism that moves individual cards from a deck or set of initial cards (usually unshuffled or previously used in a non-intended order) into a preliminary position before shuffling, the IDC could be located below the insertion area of the cards so that the bottom card is read before removal and as each bottom card is read, the next bottom card is exposed to the IDC and is read. If top cards are removed one at a time, then each top card as it is moved would be read from below by an IDC. This is less preferred as the IDC would be probably be maximally distanced from each card as it is read because of the height of the set of cards. The set of cards could be elevated to fix the IDC at an intermediate height to lessen this problem, but increased distance between the IDC and the cards would require better and more expensive optics and software.

If the set of cards is placed on a support and removed one at a time from the bottom (preferably) or the top of the set of cards and moved directly into a shuffling operation (rather than stored, collected or buffered at this point), then the camera may be either directly below a transparent support (or expose through a hole in the support) or at a position outside of a dimension of the set of cards (e.g., if in a vertical stack that forms a box-like structure, outside of the area of the bottom of the box), such as at an opening between an initial card support area and away from pick off rollers or other first card moving elements within that area of the bottom, before a first set of rollers that exerts control over the card from the first card moving elements (e.g., braking rollers, speed up rollers, nip rollers with any function, vacuum support movers, etc.), or after the first set of rollers exerts control over the card from the first card moving elements. The first card moving elements and all other card moving elements (except where otherwise specified) shall be discussed as rollers (usually nip rollers, although the pick-off rollers are not a set of nip rollers), such as pick-off rollers for simplicity, it being understood that other card-moving systems (e.g., plunger, pushing plates, etc.) may be used.

The card value (e.g., suit and/or rank) may be read after the first set of pick-off rollers, after the first set of nip rollers past the pick-off rollers, after a third set of rollers that exerts some control on the movement of cards after the first set of nip rollers, such as when (in the preferred structure of the invention) cards are individually moved from a set of rollers to be inserted into a space between subgroups of cards in a forming stack of shuffled/randomized cards. In those positions, with the cards moving face down within the shuffling device, the face of the cards can be readily observed by an IDC and an image taken.

Figure 9:
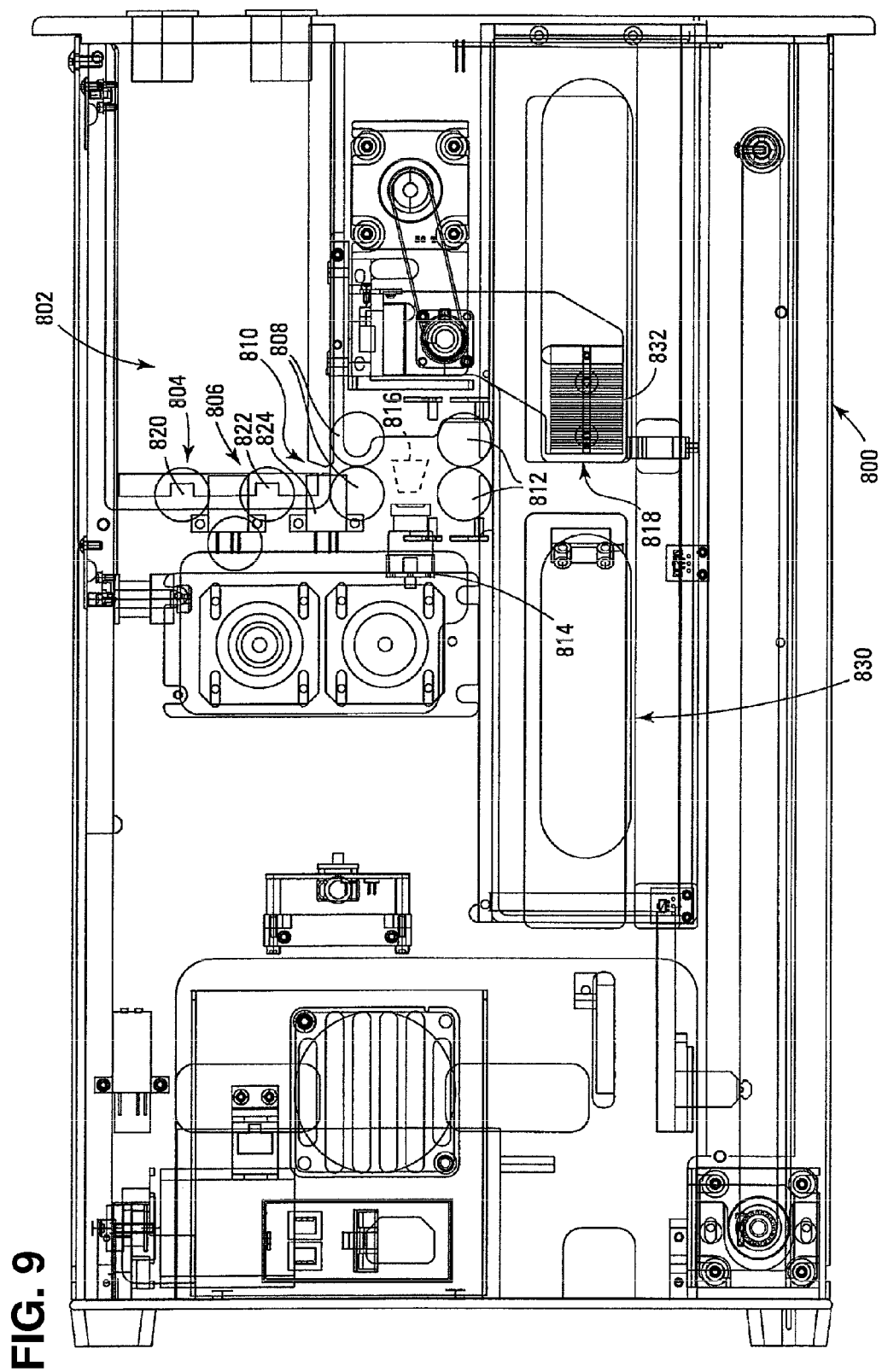
FIG. 9 shows a side cutaway view of one embodiment of a shuffling apparatus with a card-reading camera available.

Looking at FIG. 9, the shuffling/randomizing device 800 is shown with an initial card set receiving area 802. A set of pick-off rollers 804 and 806 are shown. The pick-off rollers (shown as two rollers 804 and 806, but one, two, three or more linearly aligned or arrayed rollers can be used) move a card (not shown) from the bottom of the set of cards (not shown) placed into the card receiving area 802 and through an access hole or slot 810 to a position where a second set of rollers 808 exert some control over the card exiting from the slot 810. As the card is moved past rollers 808 (which may be called braking rollers for convenience or speed-up rollers, or any other term used in the jargon of the art), the face of the card with symbols thereon (not shown) is brought into camera focal area 816, as shown by dashed lines, where the camera (or other IDC) 814 may record the image of the face of the card. The card is at this time or subsequently also has control exerted by the next set of nip rollers 812, usually referred to as speed-up rollers as they may sometimes desirably be used with linear surface speeds slightly greater than the linear surface speed of the rollers 808. Certain of the individual rollers in roller pairs may be brake rollers, free turning rollers, or even stationary (not rotating) rollers to provide optional physical effects on the movement and tension on cards. The rollers 812 move the card (not shown) into an insertion space 818 that will be in an opening created between subgroups of cards (not shown) within elevator space 830. The shuffling operation itself will be explained in greater detail later herein.

As noted elsewhere, the IDC may operate in a continuous on mode (less preferred, primarily because of the volume of data that is produced, but the use of data screening or filtering software that concentrates on symbol imagery, as by only including data following light background to dark background changes may be used) or in a single screen shot mode that is timed to the proper positioning of the symbol on the card in the focal area of the camera. Looking again at FIG. 9, this can be seen and accomplished in a number of different ways. The time in which the various rollers 804, 806, 808 and 812 move the card from the initial card set receiving area 802 into the camera focal area 816 is quite consistent, so a triggering mechanism can be used to set off the camera shot at an appropriate time when the card face is expected to be in the camera focal area 816. Such triggers can include one or more of the following, such as optical position sensors 820 and 822 within the initial card set receiving area 802, an optical sensor 824, a nip pressure sensor (not specifically shown, but which could be within either nip roller 808 and the like. When one of these triggers is activated, the camera 814 is instructed to time its shot to the time when the symbol containing corner of the card is expected to be positioned within the camera focal area 816. The card may be moving at this time and does not have to be stopped. The card may be stopped if desired or if time is needed for the supported cards 832 to be moved to allow insertion of a card into the insertion plane 818 between subgroups of cards. The underlying function is to have some triggering in the device that will indicate with a sufficient degree of certainty when the symbol portion of a moving or moved card will be with the camera focal area 816.

Figure 10:
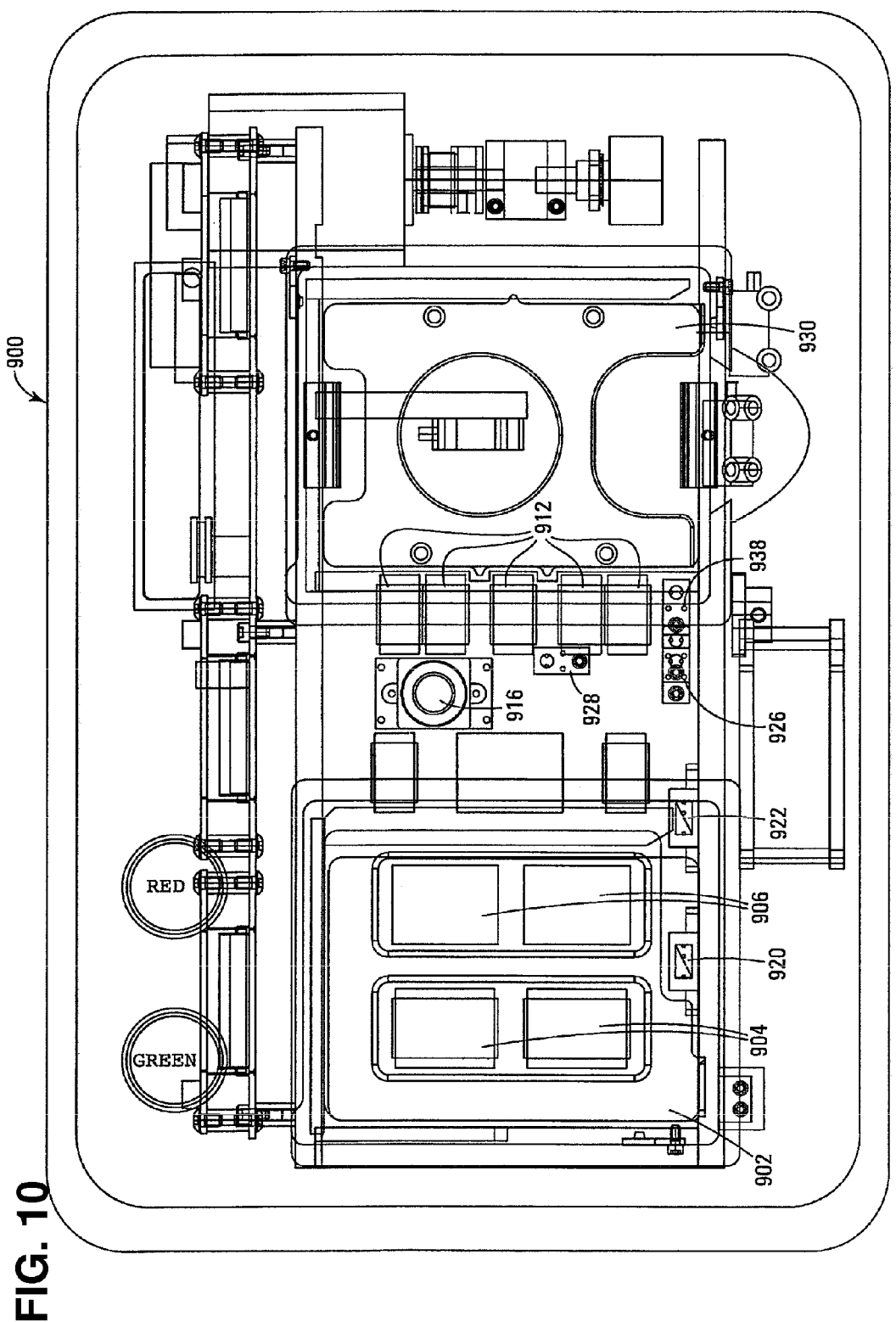
FIG. 10 shows a top cutaway view of one embodiment of a shuffling apparatus with a card-reading camera available.

FIG. 10 shows a top cutaway view of a shuffler 900 with card reading camera 916 therein. The various elements are shown in a different view, such as the pick-off rollers 904 and 906 within the initial card set receiving area 902. Sensor 920 is shown in FIG. 9 as a card set sensor 920 that indicates that there are still cards in the initial card set area 902. Sensor 928 is in a more favorable card sensing position to act as a trigger for the camera 916. A set of sensors 922 and 926 operate as card position sensors to check for jamming, clearance, alignment, in-feed availability into the elevator area 930. The sensors 938 and 926 may also act to assure that a card to be fed into the elevator area 930 is properly positioned and available to be inserted by insert rollers 912.

CCD Camera

A desirable set of image capture devices (e.g., a CCD automatic camera) and sensors (e.g., light-emitting devices and light capture devices) will be described, although a wide variety of commercial technologies and commercial components are available. A preferred camera is the DRAGON-FLY® automatic camera provided by Point Grey Corporation an includes a 6-pin IEEE-1394 interface, asynchronous trigger, multiple frame rates, 640×480 or 1024×724 24-bit true color or 8-bit gray scale images, image acquisition software and plug-and-play capability. This can be combined with commercially available symbol recognition software that runs on an external computer. The commercially available image recognition software is trained on card symbols and taught to report image patterns as specific card suits and ranks. Once a standard card suit/rank recognition program has been developed, the training from one format of cards to another becomes more simply effected and can be done at the casino table. Position sensors can be provided and enhanced by one of ordinary skill in the art from commercially available components that can be fitted by one ordinarily skilled in the art. For example, various optics such as SICK WT2S-N111 or WL2S-E11; OMRON EE SPY302; or OPTEK OP506A may be used. A useful encoder can be purchased as U.S. Digital encoder 24-300-B. An optical response switch can be provided as MicroSwitch SS541A.

The preferred cameras of the present invention may be black and white, and associated illuminating light (e.g., LED, luminescent panel, bulb or the like) are preferably provided with functionality in specific wavelengths in the electromagnetic spectrum.

It has been found in the practice of the present technology that other ranges of wavelengths of illumination and camera sensitivity are more efficient than "only blue" in addressing the issues of red color variance. In particular, illuminating light with a higher content of green light and having a matching sensitivity in the camera improves the reading of red content on the face of playing cards. Green light is more efficiently absorbed by red pigment than other wavelengths of illuminating light and therefore the image captured by green illuminated red appears more black than with any other illuminating visible light. A preferred illumination light would contain at least 40% of its total energy content or fluence against the playing card surface (e.g., at least 40% of joules/$cm^2$) comprises green light, radiation between 490 nm and 525 nm, between 500 nm and 520 nm, between 505 nm and 515 nm, with green typically centered at 510 nm By having at least 40%, at least 50%, at least 60%, at least 70%, at least 80%, at least 90% or about 100% of the fluence in the range of green, sharper blacks are seen in the red regions by cameras or optical imagers, and the speed of the cards past the image detectors or cameras may be increased without loss of efficiency.

Although green has been established as the preferred illuminating wavelength, it is apparent that ultraviolet (UV) illuminating radiation, Near Infrared (NIR, 750 nm to 900 nm) and Infrared (750 nm to 1200 nm) and far Infrared (900 nm to 1200 nm) operate in a different and more efficient manner than does blue light. The reason for this is that the absorption outside the visible region is effected in a broader range by a broader number of materials (pigments) outside the visible range. Even Infrared radiation can be absorbed by a wide range of dyes and pigments, and therefore appear black to a camera.

The term "camera" as generally used herein is intended to have its broadest meaning to include any component that accepts radiation (including visible radiation, infrared, ultraviolet, etc.) and provides a signal based on variations of the radiation received. This can be an analog camera or a digital camera with a decoder or receiver that converts the received radiation into signals that can be analyzed with respect to image content. The signals may reflect either color or black-and-white information or merely measure shifts in color density and pattern. Area detectors, semiconductor converters, optical fiber transmitters to sensors or the like may be used. Any convenient software may be used that can convert to radiation signals to information that can identify the suit/rank of a card from the received signal. The term "camera" is not intended to be limited in the underlying nature of its function. Lenses may or may not be needed to focus light, mirrors may or may not be needed to direct light and additional radiation emitters (lights, bulbs, etc.) may or may not be needed to assure sufficient radiation intensity for imaging by the camera.

CIS Card Reading Module

Another preferred card reading system that can be used in a card handling device such as the batch-type shuffler disclosed above is one that a contact image sensor (CIS) module or line scan array, as described in U.S. patent application Ser. No. 11/152,475, filed Jun. 13, 2005, now U.S. Pat. No. 7,769,232, issued Aug. 3, 2010, the contents of this disclosure is hereby incorporated by reference in its entirety. The CIS array is used to output one-dimensional line scan data as a vector, and hardware (such as ASIC or preferably an FPGA) is used to transform the vectors to information signals used to determine rank and suit. The binary data collected by the CIS module is not image data (not two-dimensional), but is instead an abbreviated data set. The data sets are compared with known (high quality) reference vector sets, and the known reference vector with the highest correlation to the acquired signal vector identifies suit or rank. The hardware component can then send the rank and suit information to a data storage medium or processor.

CMOS Sensing Module

Another preferred card reading system utilizes: 1) small two-dimensional image arrays, particularly CMOS sensors; 2) black and white sensors; 3) converting sensor output to binary values so that more sophisticated shading or optical density readings are obviated; and 4) simple template matching, rather than elaborate image extraction techniques.

CMOS is an abbreviation for Complementary Metal Oxide Semiconductor. CMOS is a widely used type of semiconductor. CMOS semiconductors use both NMOS (negative polarity) and PMOS (positive polarity) circuits. Since only one of the circuit types is powered up at any given time, CMOS chips require less power than chips using just one type of transistor.

In a copyrighted article of Micron, Inc., 2005, it has been reported that among the advantages of CMOS are that CCD sensors rely on specialized fabrication that requires dedicated—and costly—manufacturing processes. In contrast, CMOS image sensors can be made more economically. The sensors are manufactured at the same facilities that produce 90% of all semiconductor chips, from powerful microprocessors to RAM and ROM memory chips. This standardization results in economies of scale and leads to ongoing process-line improvements. CMOS processes, moreover, enable very large scale integration (VLSI), and this is used by "active-pixel" architectures to incorporate all necessary camera functions onto one chip. Such integration creates a compact camera system that is more reliable and obviates the need for peripheral support chip packaging and assembly, further reducing cost. A more detailed discussion of the advantages of CMOS sensors can be found in U.S. patent application Ser. No. 11/484,011, filed Jul. 7, 2006, now U.S. Pat. No. 7,933,448, issued Apr. 26, 2001, and entitled CARD READING SYSTEM EMPLOYING CMOS READER, the contents of this disclosure is incorporated by reference herein.

An exemplary CMOS array suitable for capturing printed data from cards is a black and white CMOS camera that outputs grayscale values in 8- or 16-bit format. Binary conversion of the grayscale value is then performed within the FPGA by a simple thresholding method where everything below a certain value is assigned a 0 and everything above is assigned a value of 1. This conversion is possible because color is not needed as a distinguishing factor in determining rank and/or suit.

Figure 11:
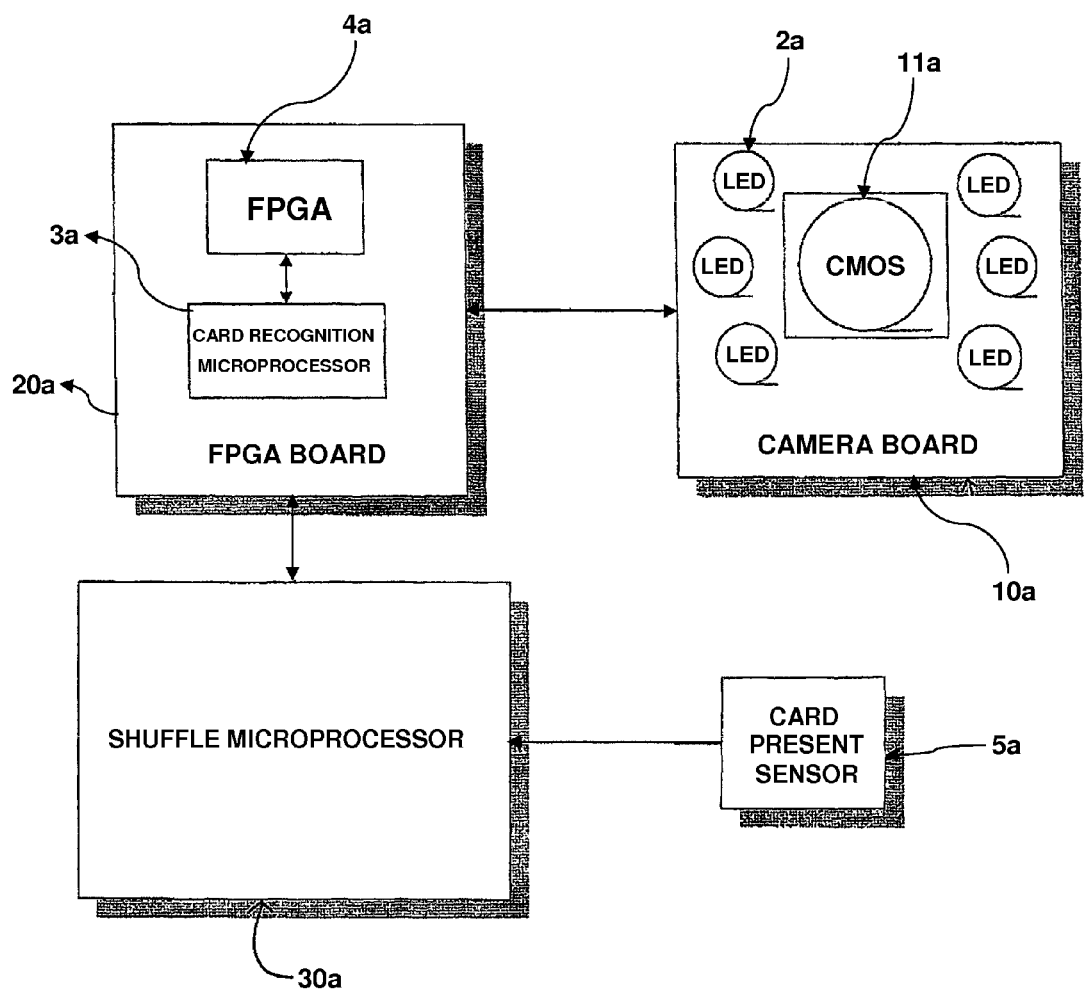
FIG. 11 is a schematic diagram showing one preferred CMOS sensing system of the present invention.

For the present shuffler application, an 8-bit digital CMOS 640×480 black and white array was selected, as greater detail is not needed to accurately identify rank and suit. The array format is shown in FIG. 11. The array is designed to operate in a QVGA (Quarter VGA) mode such that the resolution is only 320×240. QVGA mode is one preferred mode used for card identification. (As previously noted, arrays as small as 48×144 or even smaller will suffice for card identification.)

The present CMOS reading system with FPGA logic control circuit can be incorporated into a card handling device. Two structural elements of note that comprise some of the technical advances of this system compared to known systems are: 1) replacing a known expensive CCD camera with a less expensive and highly reliable and easily replaceable CMOS sensor array 11a, 2) replacing an external PC with a card identification (ID) module that utilizes a Field Programmable Gate Array (FPGA) 4a or other comparable hardware to identify playing cards (by suit, rank and/or deck verification) and a microprocessor, all internal to the card handling device. The proposed design reduces the cost and the complexity of known systems, eliminates bulky external computers that were previously used to extract rank and suit data from captured image data, and at the same time, increases security and reliability.

The proposed system is able to compensate for slight misalignments of cards relative to the CMOS array (by using column sums of selected indices of signals, and the location of symbols). Communication between the CMOS sensor array 11a and the FPGA 4a may be through a digital output port or other known means.

The output of an exemplary CMOS black and white camera can be a series of grayscale output values between 255 (white) and 0 (black) or any other linear or exponential scale. The output can also be a voltage. Signals are converted to binary values either within the CMOS sensor, in a separate hardware device or within the hardware component. The CMOS sensor provides a representation of the two-dimensional image by providing a continuous series of Vectors derived from a single card that are correlated with known reference vectors through the hardware component (e.g., ASIC or FPGA) configured to interpret the sensor signals and the closest correlation results in an identification of the suit and rank of the card.

The output from the CMOS sensor may be processed by an FPGA, an ASIC circuit or other equivalent device. An ASIC is an Application-Specific Integrated Circuit, a chip designed for a particular application. ASICs are built by connecting existing circuit building blocks in new ways. Since the building blocks already exist in a library, it is much easier to produce a new ASIC than to design a new chip from scratch.

FPGAs are field programmable gate arrays, which are a type of logic chip that can be configured after manufacturing. An FPGA is similar to a programmable logic device (PLD), but whereas PLDs are generally limited to hundreds of gates, FPGAs support thousands of gates. They are especially popular for prototyping integrated circuit designs. Once the design is set, hardwired chips may be produced at a lower cost, if sufficient volume is demanded to justify the cost of producing the chip. Once a FPGA is programmed, the device behaves as a hardwired circuit. FPGAs do not execute code, and this is an important point in distinguishing FPGA functionality from that of a processor.

In the technology described and enabled herein, it is desirable to provide a two-dimensional CMOS sensor array 11a as part of an imaging module 10a as shown in FIG. 11. The module may comprise either two related units (the CMOS sensor array 11a itself and a separate FPGA 4a logic circuit that receives and acts upon raw signals or data from the CMOS camera), or an integrated system with the CMOS camera and logic/intelligence/functions of the FPGA 4a combined into the single unit. An optical card presence sensor 5a may or may not be provided to initiate the capture of data from the CMOS sensor array 11a, because the CMOS sensor array 11a is typically always sensing. The imaging module 10a may also include one or more LED light sources (not shown) to illuminate areas being scanned.

The CMOS Module of the present invention should have the following design attributes:

1. Speed—Should be able to provide identification function (ID) in less than 300 milliseconds.
2. Modular design—Should be able to provide a modular design that is not dependent on specific installation positions or specific design/composition of the sensor.
    a. The imaging system should be capable of integration into a number of products, such as a card shoe, a card shuffler, a hand-forming card shuffler, a discard rack, a "no peek" device, a deck verification device, a collator and as a stand-alone table-top card reader, for example.
    b. The FPGA (or ASIC) design should be capable of processing signals from multiple similar sensor types such as CMOS cameras that output voltages and that output 8- or 16-bit data streams
3. Communications—Preferably, the system should operate with industrial standard systems such as TCP/IP enabled, SPI communication channel, RS232 communication channel, or via USB port.
    a. The communication system should be able to be in information contact with the processor of a card handling device or external computer.
    b. The communication system should be able to work within a modular table game data collection system (Intelligent Table System, comprising functional casino card table elements such as shuffler, dealing shoe, discard tray, card readers, wagering chip readers, game control computers, table computers, central computers, pit computers and a system network, with finite state machine implementation.)
4. Size—must fit into a card handling device such as a shoe or shuffler, with a preferred overall maximum scale of dimensions of about (80×150×20 mm), such as 60×120 mm, with its height under 17 mm
    a. Shuffle Master, Inc.'s (SMI's) MD-2™ shuffler presently has only room for a CMOS sensor without support processing hardware. Support processing hardware may be located remotely but within shuffler housing.
5. Versatility—module must be capable of working in shoe, in a deck verification device, in a discard rack and in various commercial shufflers and particularly SMI's MD-2™ shuffler.
6. Cost—Should be under $400.00 (2005 U.S. dollars), preferably under $250.
7. Simplicity—the CMOS sensor is preferably an inexpensive black and white sensor.

One way of easily accommodating the above-described characteristics is to provide a two-piece design. In this two-part design, the FPGA (Field Programmable Gate Array) module provides processing and communication support for any sensor type. The FPGA 4a module incorporates a power supply, communications capability, hardware algorithm implementation ability and data storage capability. It is connected to an imaging module 10a, e.g., via physical connections such as a 20-pin cable.

In this example of the invention, the above design characteristics are met as follows:

1. Speed—Identification algorithm implemented in hardware within FPGA allows under 300 millisecond identification speed.
2. Modular Design—The two-piece design allows installation in a broad range of equipment by providing flexibility in the type of sensor module or modules needed for the application.
3. Communications—The module can have an on-board TCP/IP stack, SPI port RS232 and/or USB port communications. The two-part system currently uses a hardware component and associated microprocessor (not shown), to handle communication needs. This may be eliminated in future designs for greater cost savings.
4. Size—The small size for an FPGA module allows mounting anywhere, and the tiny CMOS sensor module can be mounted very close to region of interest. Two-piece designs provide great flexibility in mounting location.
5. Versatility—This constraint is answered by compact two-piece modular design.
6. Cost—The actual mass production cost for the two-component system is under $250.
7. Simplicity—A black and white CMOS sensor provides an easily processed output signal.

The following is an example of one preferred card rank and/or suit identification algorithm used and hardware implementation provided in an actual CMOS card identification system. To simplify the process of identifying cards according to the invention, a number of design constraints were applied. They include:

1. The region of interest on the card being limited to a corner of the face of the card bearing the rank/suit information. This area is small so the imaging array can also be small.
2. Sufficient difference in shapes and contours of images make it unnecessary to also distinguish on the basis of color. Only grayscale data is acquired and cards may be differentiated based only on shape and contour data from the images.
3. Nothing in the way of texturing or shading on the card face that must be extracted from a surrounding image prior to converting the grayscale signals to binary values.
4. Since features such as shading or texturing do not need to be extracted from the image, a simple template matching algorithm may be used to identify the card.

Template matching works by comparing the cross correlation values of two independent matrices where the cross correlation of two matrices A and B is defined as:

$$\frac{\sum\sum A*B}{\sqrt{\sum\sum A*A*-\sum\sum B*B}}$$

Obviously this can require a large amount of computation resources, since for a known template, it must be shifted throughout the region of interest to determine if the template is present. This step can involve hundreds of matrix calculations. However, in the case where the values are binary (0 and 1), it can be shown that the cross-correlation can be reduced to a simple AND operation and summing of the matching values so that $$C_{ab}=\Sigma A \wedge B$$

This reduction provides an algorithm that is simpler, and can be performed with fewer resources, and at a lower cost. If applied in hardware instead of software, it can be implemented as a simple counter. However, this reduction suffers when multiple matches can occur for disparate images since there is no measure of the degree of mismatch. An example of a mismatch is when the system sees a diamond and a heart as identical. When a diamond is overlaid on a heart, the measure of match can be nearly identical. The sum of matches for the diamond and heart can actually exceed the sum of matches for a diamond and a diamond template if there is any distortion in the acquired image.

To overcome the problem of mismatching, let A' be the negative template (0=1 and 1=0) of A. Then the correlation sum:

$$C_{A'B}=\Sigma A' \wedge B$$

is a match of everywhere the matrices don't match. Then subtracting so that:

$$C_{AB}=\Sigma A \wedge B - \Sigma A' \wedge B$$

provides a measure of degree match with mismatch included. This difference is maximized when the template and acquired image match exactly. Since both operations are simple AND SUM operations, they can easily be implemented in hardware (e.g., the FPGA or ASIC) and then subtracted using counters and logic inside an FPGA. Since the exact location of an object within a matrix is unknown, and even the exact location in a known template of an object may be unknown, the template is typically shifted over the entire "area" of an acquired image. It can be shown mathematically that if the matrix is converted into a single one-dimensional vector, shifting the template around on an image is as simple as shifting the index of the known vector being summed with respect to the corresponding index of the unknown vector.

Practically, this means that a series of summations can be performed with counters addressing stored vectors into memory. A series of correlations is performed shifting the index of one vector set thereby causing the effect of shifting a two-dimensional matrix over another two-dimensional field. Furthermore, no image is reconstructed during identification. Simple one-dimensional vector outputs will serve for identification purposes.

The previous discussion lists only a method for identifying features. Prior to identifying features, a known set of vectors must be acquired and then unknown vectors must be compared. The comparison requires the use of a correlation algorithm. This section describes the technique for identifying and acquiring a region of interest for identification.

A CMOS array can generate a one-dimensional signal representative of the scanned card. An optical position sensor may be provided to alert the system of the need to capture data by the CMOS array. A series of one-dimensional signals representative of a card passed over its surface is then generated.

Two exemplary methods of identification are described using template matching. In one, ranks are identified separately from suits and in the second, all 52 cards are identified separately, each by rank and by suit. As shown in FIG. 11, an optical card presence sensor 5a within the shuffler communicates with a shuffler microprocessor 30a to then communicate with the card recognition microprocessor 3a. The card recognition microprocessor 3a instructs the imaging module 10a to capture data using the CMOS sensor array 11a. The output from the array is sent to the FPGA 4a where the vector set is compared with known vectors to identify card rank and suit. In one preferred form of the invention, a reference vector set for each suit and each rank is stored in memory associated with the card recognition microprocessor 3a. The stored vector sets are transferred to the FPGA 4a on power up.

Although the FPGA board 20a is a separate construction from the imaging module 10a in a preferred form of the invention, the functionality of both boards can be combined on one board. Furthermore, the optical card presence sensor 5a could alternately send a signal directly to the card recognition microprocessor 3a rather than to the shuffler microprocessor 30a.

The imaging module 10a may include a plurality of LEDs 2a to provide a light source for the CMOS sensor. Although a white light source is sometimes adequate to capture gray scale data from red and black print on cards, it has been discovered that a green light source is an efficient source of illumination for the preferred black and white CMOS sensor.

The preferred cameras of the present invention may be black and white, and associated illuminating light (e.g., LED, luminescent panel, bulb or the like) are preferably provided with functionality in specific wavelengths in the electromagnetic spectrum.

It has been found in the practice of the present technology that other ranges of wavelengths of illumination and camera sensitivity are more efficient than "only blue" in addressing the issues of red color variance. In particular, illuminating light with a higher content of green light and having a matching sensitivity in the camera improves the reading of red content on the face of playing cards. Green light is more efficiently absorbed by red pigment than other wavelengths of illuminating light and therefore the image captured by green illuminated red appears more black than with any other illuminating visible light. A preferred illumination light would contain at least 40% of its total energy content or fluence against the playing card surface (e.g., at least 40% of joules/$cm^2$) comprises green light, radiation between 490 nm and 525 nm, between 500 nm and 520 nm, between 505 and 515 nm, with green typically centered at 510 nm By having at least 40%, at least 50%, at least 60%, at least 70%, at least 80%, at least 90% or about 100% of the fluence in the range of green, sharper blacks are seen in the red regions by cameras or optical imagers, and the speed of the cards past the image detectors or cameras may be increased without loss of efficiency.

Although green has been established as the preferred illuminating wavelength, it is apparent that ultraviolet (UV) illuminating radiation, Near Infrared (NIR, 750 nm to 900 nm) and Infrared (750 nm to 1200 nm) and far Infrared (900 nm to 1200 nm) operate in a different and more efficient manner than does blue light. The reason for this is that the absorption outside the visible region is effected in a broader range by a broader number of materials (pigments) outside the visible range. Even Infrared radiation can be absorbed by a wide range of dyes and pigments, and therefore appear black to a camera.

Figure 12:
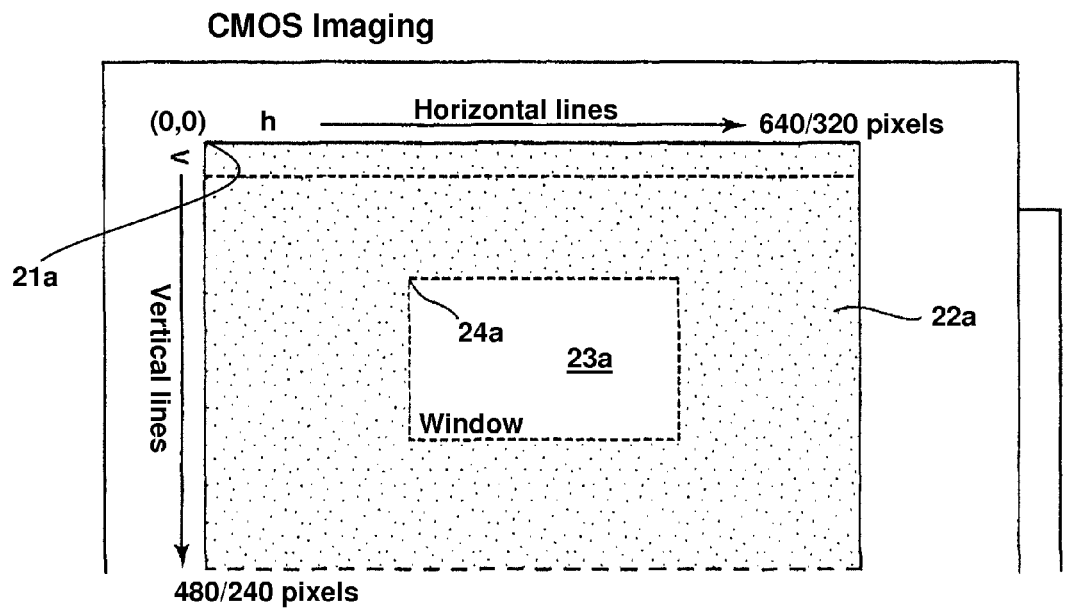
FIG. 12 illustrates a CMOS sensing array and a smaller defined selected sensing area.

As shown in FIG. 12, according to one example of the invention, the origin of the output signal is defined at point (0,0) 21a. Then h and v directions (as labeled in the Registers Section later) are defined. During operation, the array is able to output a signal representative of a smaller portion 23a of the entire array 22a if set up properly in the array controller. This smaller portion referred to as the window 23a is shown in the diagram. The smaller window 23a is defined in the camera operation setup and for the purposes of this application, a set of registers holds the starting points 24a for the window, known as h_start and v_start. The window size is defined by h_lines and v_lines. For instance, a smaller window can be output that starts at a point (h_start,v_start) and has a size in pixels of h_lines*v_lines. In this fashion, the array can look at a selected region within the larger array by simply setting its start points and size. This windowing approach is advantageous to compensate for different card types and variability of array placement during the manufacturing process.

Figure 13:
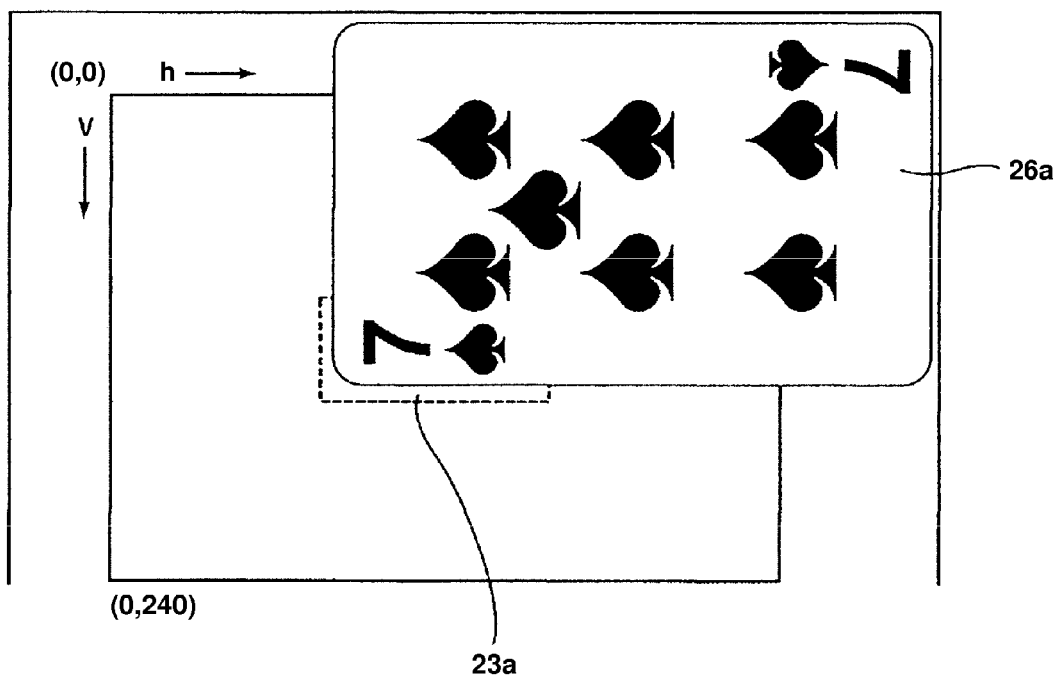
FIG. 13 shows a card positioned over the selected sensing area.

FIG. 13 shows an example card 26a positioned over the array window 23a. The card is shown face-up for illustration only, but in operation is positioned such that the face of the card faces the array window 23a. During scanning, the card face is necessarily positioned face down over the array window 23a. Only a small portion of the card with rank and suit information need be detected so the window position and size is set appropriately for a given card type. In one form of the invention, and as shown in FIG. 11, prior to signal acquisition, an optical card presence sensor 5a senses the presence of a card, signaling the system to capture data from the CMOS sensor array 11a. After signal acquisition, a pair of LED object sensors (not shown) senses when the card has passed completely over the CMOS sensor array 11a, turning the data acquisition function off. When the data acquisition is turned off and then the optical card presence sensor 5a again senses a card, the FPGA 4a collects data again from the CMOS sensor array 11a. During signal acquisition, a signal is acquired that represents the card image positioned over the array window 23a. However, the signal is not an entire image, and is not reconstructed into a two-dimensional image. Instead the signal is conditioned and is then stored as a one-dimensional vector in memory U ram.

Figure 14:
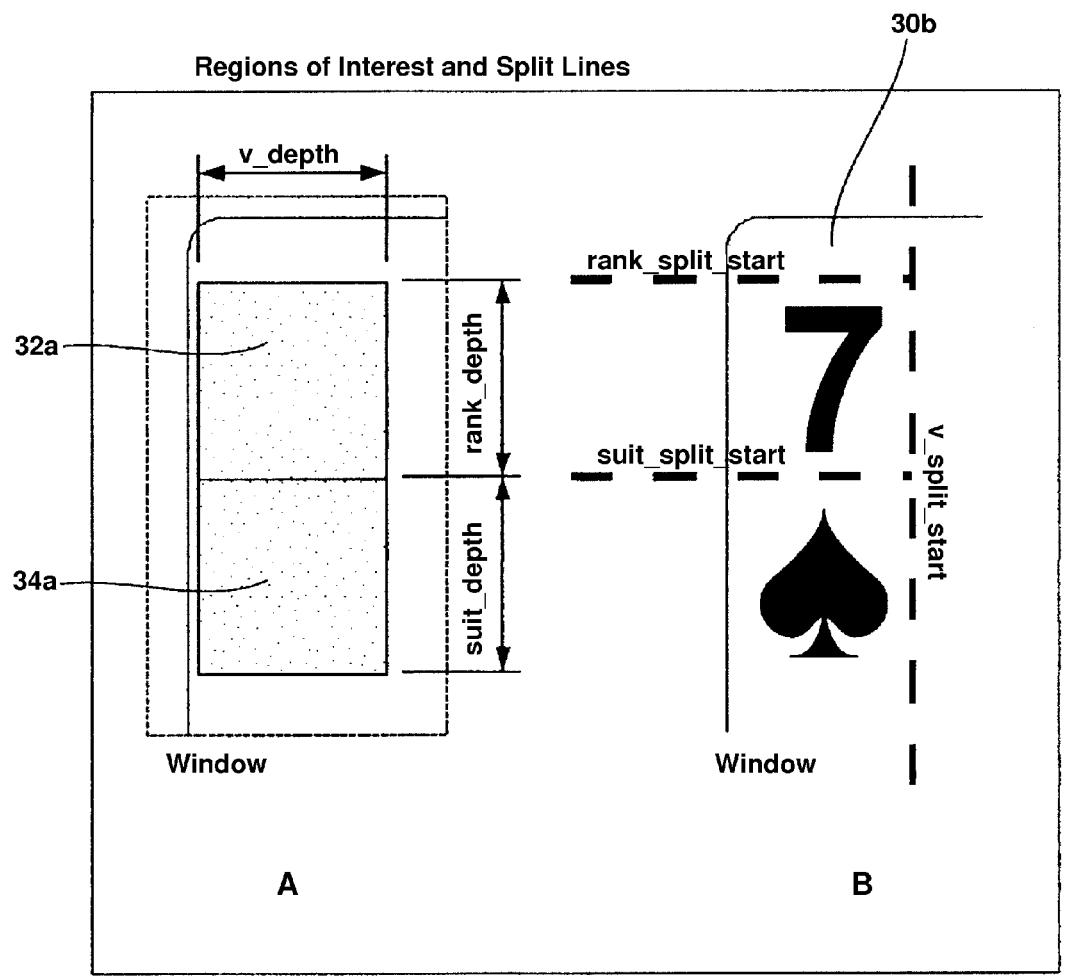
FIG. 14 shows regions of interest.

If the signal was to be reconstructed back into a two-dimensional array, the stored signal would appear something like that shown in FIG. 14 where the upper left corner 30b of a typical playing card appears. For card identification purposes using the previously mentioned template matching algorithm, two regions of interest 32a and 34a are identified. First a region of interest 32a is for the card rank is defined and second, region of interest 34a is for the card suit. The region of interest for each should be large enough to completely contain the rank or suit symbol with some additional area or "padding" to account for variability in the acquired signal and variability in card position.

Figures 15A, 15B:
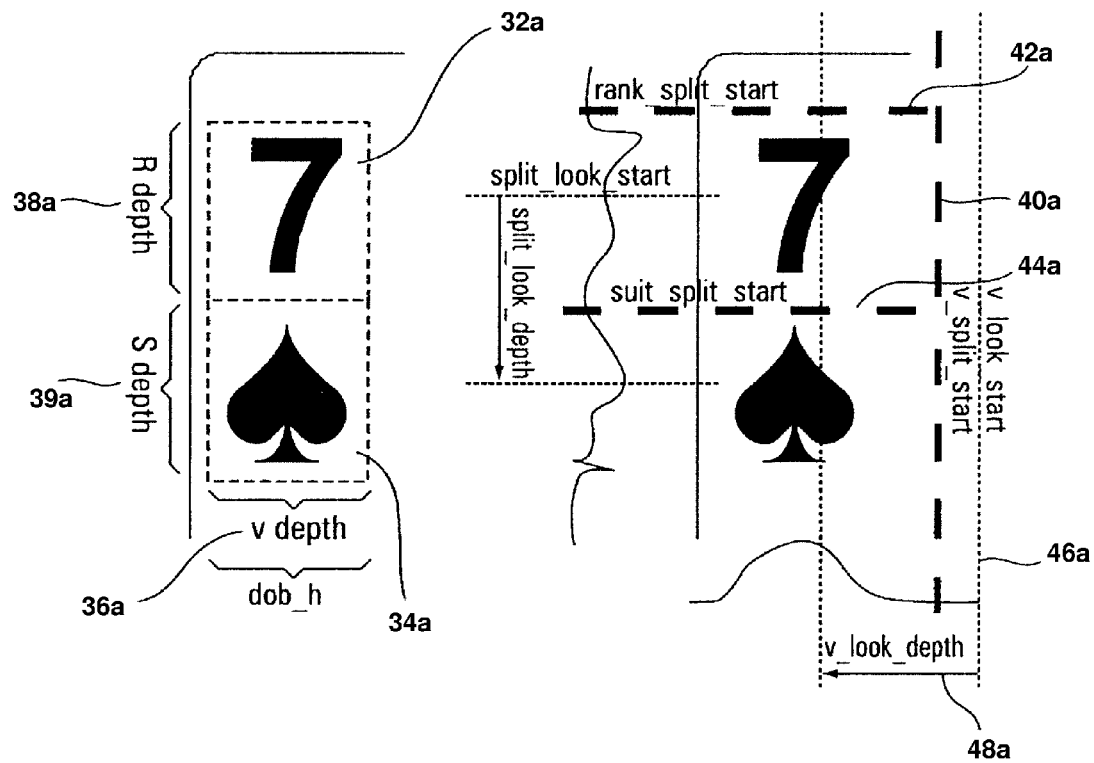
FIGS. 15A and 15B show lines defining regions of interest.

FIG. 15 shows an example of a method of defining regions of interest. In FIG. 15A, two regions of interest 32a and 34a are defined, one that contains the card rank symbol 32a and the other that contains the card suit symbol 34a. The size of the regions are defined by first the number of vertical lines required. This is referred to as v_depth 36a. Then the depth of the rank and the suit regions are identified as rank_depth 38a and suit_depth 39a. The sizes are settable registers in the FPGA to allow identification of differently sized rank and suit symbols found on different styles and brands of cards. Preset sizes may be stored in memory, each size corresponding to a brand or type of playing card. For example, jumbo cards would have larger regions of interest.

There is a relatively high degree of positioning error in a motorized (mechanized) playing card handling device. While an image may be generated from the output signal of the camera, the exact location of the rank and suit symbols within the image are not known with a high degree of accuracy. However, certain features of the card are known and can be exploited for use in identifying the precise locations of a region of interest for matching purposes.

To account for positioning error and to locate the regions of interest accurately, a number of lines are defined. FIG. 15B shows the position of the lines. First, a line v_split_start 40a is defined as the vertical line position to locate one side of the region of interest. Then rank_split_start 42a and suit_split_start 44a are defined to locate the regions of interest precisely.

To precisely locate the split_start lines 40a, 42a, 44a, a series of sums may be performed on the acquired signal. Each of the horizontal lines h is summed and stored in memory as dob_v. An algorithm then looks for the location of v_split_start by starting at v_look_start 46a and looking for the minima throughout the range set by v_look_depth 48a. Several parameters are tunable such as the minimum threshold set in register v_threshold and the minimum width of the minima set in register v_width.

After locating the line v_split_start 40a, the FPGA then generates the column sum dob_h and stores it in memory. A similar algorithm locates the point suit_split_start 44a. The value rank_split_start 42a is then easily generated from suit_split_start 44a-rank_depth 38a. All the values are stored to registers.

Figure 16:
FIG. 16 shows a test result of a reconstructed image.
Figure 16:
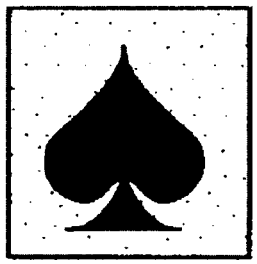

Using the register values set for v_split_start, rank_split_start, and suit_split_start, contents of the U_ram memory is parsed into a second RAM known as scratch_ram with rank and suit components. The scratch_ram is the actual working RAM that is used for card identification. FIG. 16 shows and example of images reconstructed as a test of the ability of the system to generate signals representing rank and suit. The images were generated in this test from parsing the U_ram contents into scratch_ram. Although systems of the present invention do not reconstruct images during the vector matching process, image reconstruction can be approximated with the data to test the viability of the system. The contents of scratch RAM are used in correlating with known rank and suit vector sets stored in RAM.

Figure 14A:
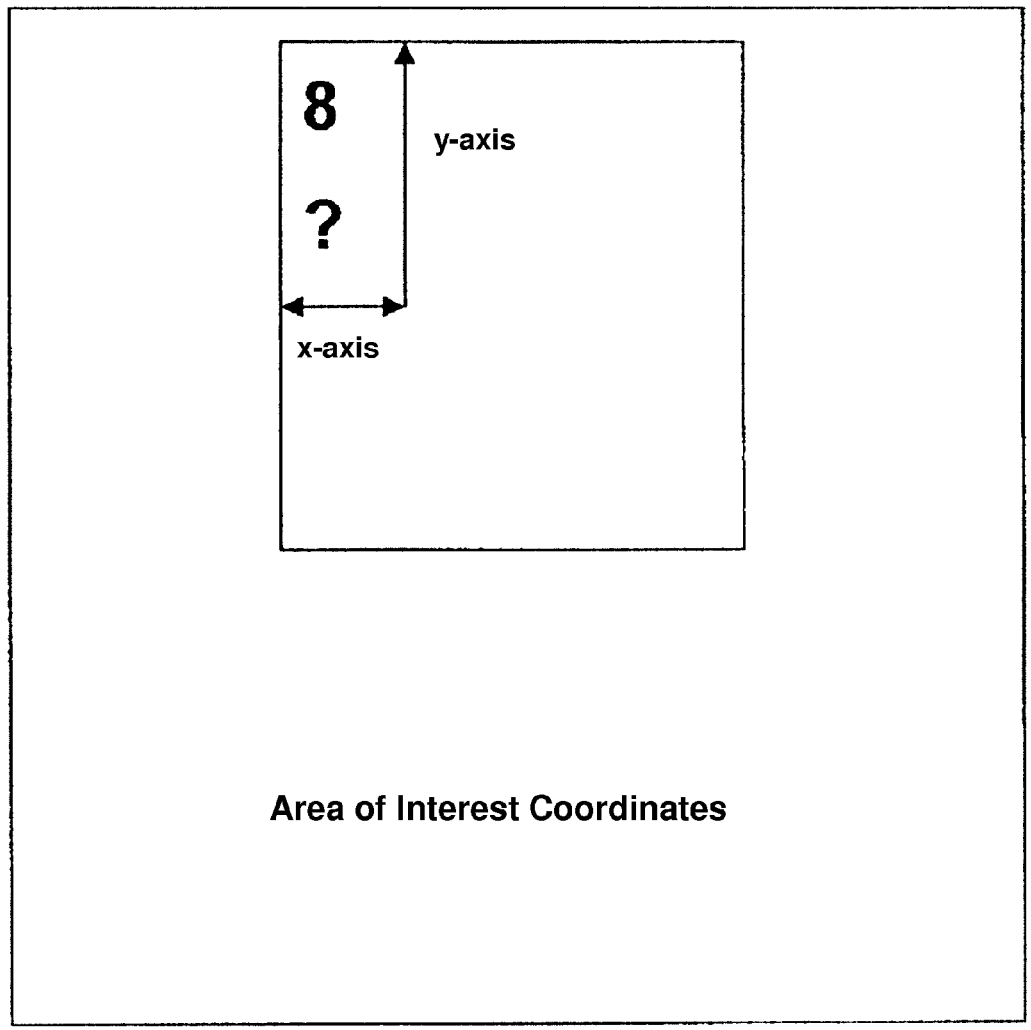
FIG. 14a shows a region of interest identified by image pattern analysis.

Other methods of identifying regions of interest and therefore distinguishing rank data from suit data are contemplated. For example, the FPGA may compare patterns of certain features of images to isolate the region of interests. For example, referring to FIG. 14a, the CMOS imager may output a first value for a white area, a second value for a black area, and a third value for "noise," or the absence of a card. An image pattern that represents the rank of the card may be defined as the sequence "noise/white/black/white" (from left to right) along the x-axis, and "noise/white/black/white" (from top to bottom) along the y-axis. The image pattern that represents the suit of the card is defined as "noise-white-black-white" along the x axis and "white-black-white" along the y-axis. Notice that the pattern along the x axis is the same for both rank and suit, but the patterns across the y axis differ. The actual numerical value representing the black and white colors may be set as 0 and 1, respectively. Both of the techniques described above for dividing the rank and suit data are equally effective.

The previous section described the FGPA operation to acquire a signal from a CMOS array and manipulate the signal. This section shows examples of such an acquisition. Acquisition is triggered when an optical card presence sensor 5a indicates a card has been moved into a sensing position. (FIG. 13.) During acquisition, the array output undergoes a binary conversion inside the FPGA, in the sensor or in a separate hardware component. The array output is an 8 bit value and a conversion from the 8 bit value to 0 or 1 is made at a threshold level set by register threshold. The conversion may or may not be inverted. White sections of the card may be converted to black (or 0) levels to assist in template matching. The images themselves may be mirror images of cards as we see them (not shown) because of how the array is mounted and the signal reconstructed. The alignment makes no difference to the identification algorithm.

Figure 17:
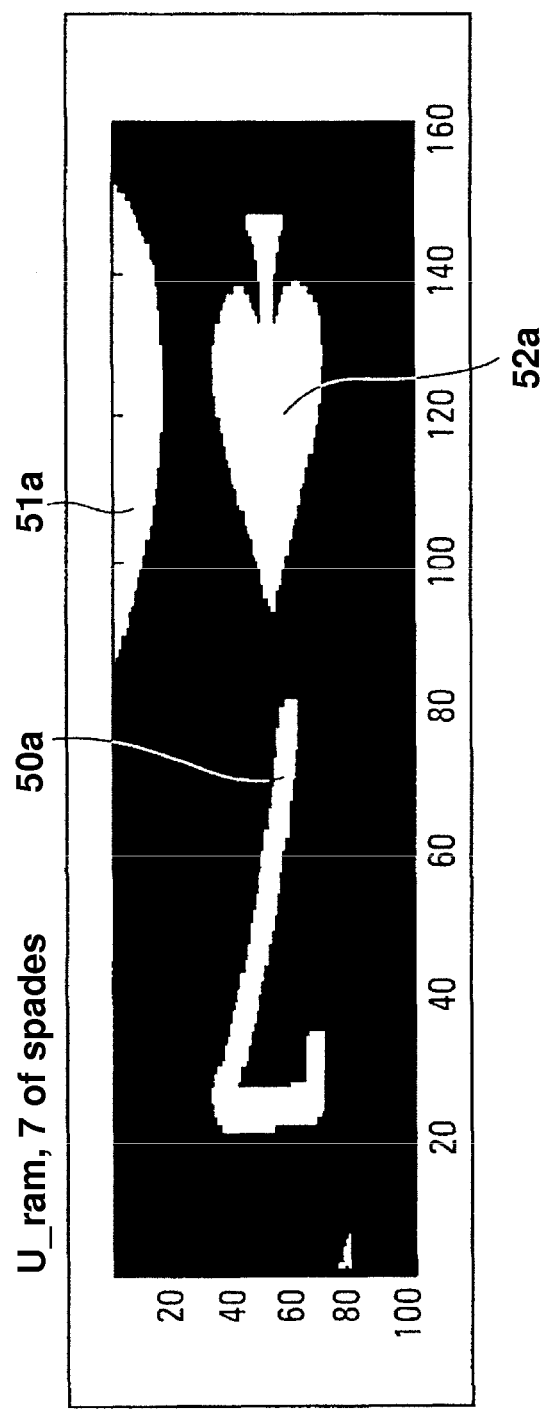
FIG. 17 shows a test result of reconstructed data collected in U RAM.
Figure 18:
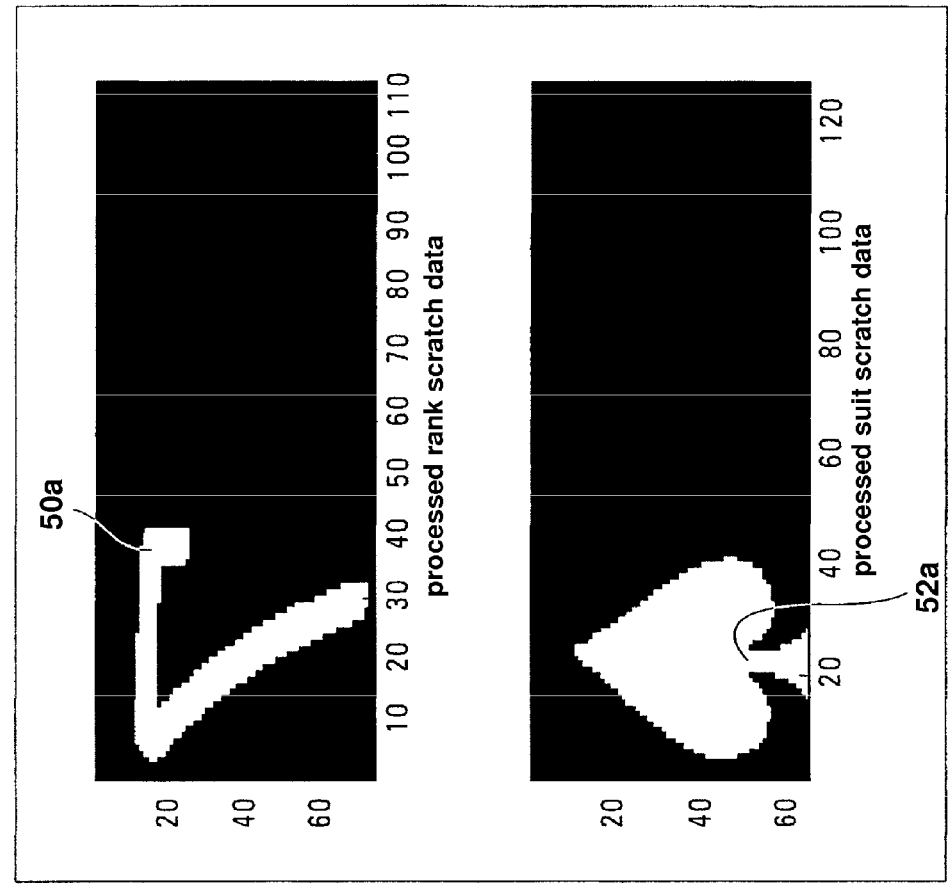
FIG. 18 shows a test result of reconstructed data collected in Scratch RAM.

FIG. 17 shows a series of acquired signals that have been downloaded and reconstructed into two-dimensional images outside the FPGA to test the accuracy of the symbol identification. The figure shows the large variation in location present in the shoe that necessitated the previously described method of locating first minima along the horizontal lines and then minima along the vertical lines. Additionally, face cards such as the Queen and Jack show additional information 51a from the artwork in the middle of the card. Again, this is filtered out of the U_ram signal when it is parsed into the scratch_ram. As shown in FIG. 17, the rank symbol 50a is a mirror image of the number seven. The suit symbol 52a is symmetrical so the scanned object looks identical to the acquired signal. FIG. 18 shows the test data sample from FIG. 17 after it has been parsed into scratch_ram for identification. Note the resulting test image is a mirror image of the scanned image.

The module may be implemented, for example, using a commercially available FPGA coupled with an 8-bit microprocessor, and optionally coupled to object present sensing devices for activating the acquisition data. The XILINX® XC3S1000 FPGA contains 14 block RAMs available for high speed read/write operations. This FPGA is available from Xilinx of San Jose, Calif., and may be located on the world wide web at xilinx.com.

Because the location/size of the card rank and suit is not the same from brand to brand of cards, the inventor devised a way to look for location of the rank and suit information by using column sums of selected indices of the signal, which can work even when different brands of cards with different symbol images are used, without the necessity of training the system or redesigning FPGAs to match specific symbols. This is a distinct advantage over most disclosed systems that require specially marked cards or training for each type of card used. Location of the rank/suit symbols is extracted from information about where the sums are low. This feature allows the sensed objects to be located in different areas in the larger sensing area and allows the device to successfully locate and compare the vectors.

Referring back to FIG. 11, this technique may be implemented by utilizing an optical card presence sensor 5a within the shuffler that communicates through the shuffler microprocessor 30a with the card recognition microprocessor 3a. The optical card presence sensor 5a may sense the presence of a card, triggering data capture in the CMOS sensor array 11a. The sensor may be positioned at a specific location of the device where it can detect the card presence. The sensor outputs data when it senses a card. It communicates with the FPGA 4a via a digital input/output port. A second sensor (not shown) senses when the same card is removed.

The CMOS sensor array 11*a* may reside on a separate imaging module 10*a*. The output voltage of the CMOS array is an indication of a shade of gray measured on each pixel of the array, since the system is a black and white reading system. Color scanning may be used, but is not needed for collecting the desired signals for determining suit and rank. In a black and white system, the output of the CMOS array is converted into binary code in the imaging module 10*a*, in a separate hardware element (not shown) or in the FPGA 4*a* and the output would then be a series of numerical values equal to one or zero. Any scanned shade of gray is initially represented by a digital signal between 0 and 255 and is then converted to a 1 or a 0.

Another proposed system scans the entire area of the card face containing the rank and suit symbols one pixel at a time. The window 23*a* is defined by coordinates X and Y. The data is then collected from the area defined by the x and the y directions accordingly. FIG. 12 shows the coordinates of the area.

To determine card rank and suit, the system must first be trained or hardwired to recognize card rank and suit. To accomplish this, a single vector set for each rank (A, K, Q, J, 10, 9, 8, 7, 6, 5, 4, 3, 2) and a vector set for each suit (hearts, clubs, diamonds and spades) is scanned, converted to binary values and is saved (e.g., a known reference vector set is saved for each distinct symbol) by acquiring a set of signals during a training phase, or by hardwiring the system based upon knowledge of a known set of card symbols or using a large tolerance hardwiring for a range of symbols. The signals acquired during training undergo the same binary conversion and are stored as reference vector sets.

During the identification process, an unknown vector set is acquired when a triggering signal is detected. This unknown vector set, (as well as the reference vector sets) as indicated above, may consist of gray scale values, a series of voltages, a series of 8- or 16-bit numbers, etc., or the data may be preferably converted to a set of binary values and stored in this form. The triggering signal can take many forms. The triggering mechanism can be an edge sensor (indicating that a first leading edge of a playing card has passed over an optical or motion sensor, a motion sensor indicating movement of a playing card, an optical card presence sensor 5*a* (shown in FIG. 11) indicating the presence of optical density other than white (e.g., a card sensor) over an optical sensor, or the like. In the alternative, the camera may continuously collect data and in that case no triggering sensor is needed.

Upon triggering of the CMOS sensor array 11*a*, the scanning may be continuous or may continue on a timed, or sensed (e.g., distance or speed of movement of the card, degree of variation in the signal from the sensor, etc.) basis. To account for any motion of the card, a fast exposure time is used such as 1/1000 of a second or less.

The unknown vector is then correlated with the known vectors to determine a match and identify the card's rank and suit. As mentioned earlier, cross correlation of two-dimensional signals (vector sets) A and B may be defined as following equation, where "A" is the unknown signal and "B" is the template signal.

$$\frac{\sum\sum A*B}{\sqrt{\sum\sum A*A*-\sum\sum B*B}} \quad (1)$$

For a binary signal as constrained as described, the correlation reduces to a simple binary AND operation and summation of the result over the entire vector. Then in template matching, it can be shown mathematically that for the two-dimensional case of shifting the template over a two-dimensional matrix, this data concept can be transferred to a one-dimensional vector by shifting the order of the vector. The concept of vector shifting is described in more detail, below.

To match the card, a series of "correlators" is generated in the FPGA that correlates all ranks and suits with the unknown vector either sequentially, or preferably concurrently. The unknown vector is then shifted and a new series of correlations performed. (The term "shifted" means that the top two values of the series of values that constitutes the entire vector (each being a zero or a 1) is removed from the top of the vector and placed at the bottom of the vector, changing the order of the number pairs in the vector. For example, a simple vector might be the following order pairs:

0,0
0,1
1,1
1,1
1,0
1,0
0,0
0,1

By shifting the top pair to the bottom, the vector becomes:

0,1
1,1
1,1
1,0
1,0
0,0
0,1
0,0

This process is continued over a wide range of shifts. The results of the correlations are saved, compared and the maximum correlation value (with respect to the known vectors) is used to identify rank and suit.

Figure 19:
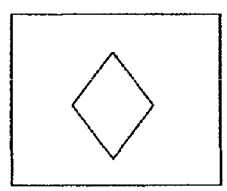
FIG. 19 illustrates a need for an error correction function.
Figure 19:
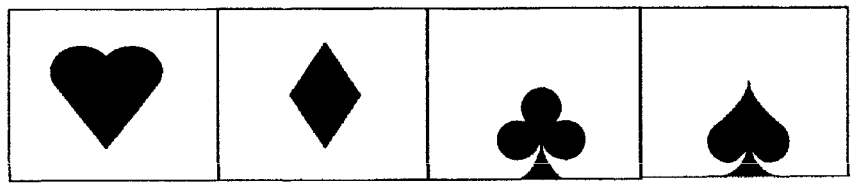
Figure 19:
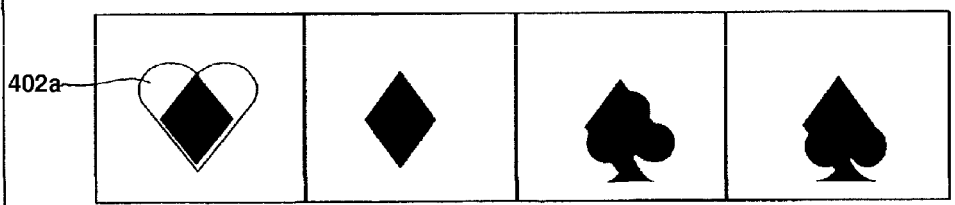

As shown in FIG. 19, a problem was encountered in correctly identifying the suit of the cards using the cross correlation technique. For example, a "diamond" could not be distinguished from a "heart." This is because the diamond shape can be fit into the "un-matched" area 402*a* of the heart shape. As a result, the diamond shape could have been reported as a heart or a diamond by the FPGA Card Identification Module.

To avoid this type of misread, en error correction function was developed to compare the "un-matched" area 402*a* of the shapes. The error correction function is defined as the following equation:

$$\Sigma\Sigma A*B-\Sigma\Sigma A*B \quad (2)$$

By using the technique, the device is able to detect the unmatched area 402*a* and, therefore, deduces the correct shape.

The proposed device is preferably implemented using FPGA technology (rather than using a an external processor and memory) to improve the speed of identifying cards and to dramatically reduce the size of the card sensing system, as well as the cost. Speed is improved because operations are performed in real time with hardware logic circuits, rather than software running on a processor. Costs are reduced because there is no need for complex computational capability. Following a card identification cycle, the card ID data can be stored locally by a database storage system, the processor and/or transmitted to a remote location for storage.

Figure 20:
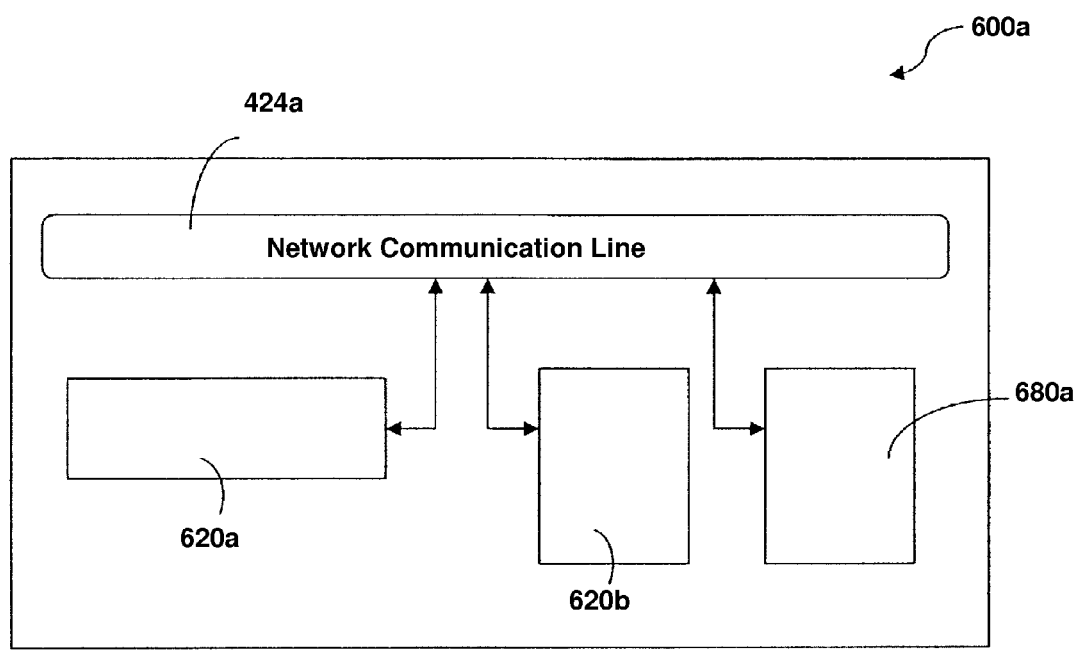
FIG. 20 illustrates a shuffler of the present invention as a component of a casino monitoring system.

As shown in FIG. 20, the card shuffler of the present invention incorporating a CMOS sensing array and FPGA logic control can be used as a data acquisition component of a module of a larger casino data acquisition system 600a. The collected data can be used to perform casino table game analysis. Data analysis is possible when multiple data acquisition modules 620a, 620b, for example, are in communication with a database 680a, preferably on a network, via a communication link 424a and the information is stored in the database 680a. Other data acquisition modules such as bet recognition modules, hand count modules, hand composition modules, dealer ID modules, player ID modules, bill validators, coin acceptors, ticket printers, touchscreen displays, button controls or any other known module capable of sending signals to the database 680a can be connected to the network and data can be transferred to the database 680a, typically via a middleware receiver (not shown). The middleware receiver may include a data receiver and a data pump (not shown).

Data can be accessed and mined via a local "thin client" application that allows users to view game results remotely on a web enabled devices such as desk top computer, PDA, BLACKBERRY®, etc.

Once the symbol has been imaged, a signal is sent to a central processor where the information of the suit and rank of the individual cards is processed according to the objectives of the system. After each card has been read, the individual cards are moved by rollers to be deposited in a card collection area. Cards are delivered into the card collection area by being placed on a support tray. The trigger may also activate a light that is used in conjunction with the image capture device to improve image capture capability.

Another aspect of the invention is to provide a device for forming a random set of playing cards. The device may comprise:
- a top surface and a bottom surface of the device;
- a single card receiving area for receiving an initial set of playing cards;
- a randomizing system for randomizing the order of an initial set of playing cards;
- a single collection surface in a card collection area for receiving randomized playing cards one at a time into the single card collection area to form a single randomized set of playing cards, the single collection surface receiving cards so that all playing cards from the initial set of playing cards are received below the top surface of the device;
- an image capture device that reads the rank and suit of each card after it has begun leaving the single card receiving area and before being received on the single card collection surface; and
- access for removal of the single randomized set of playing cards as a complete set. The access allows the complete set of randomized cards to be removed as a batch from the randomization device, rather than feeding the cards one at a time to a delivery end (e.g., shoe end) of the device. This can allow the device to be more compact and allow the device to operate independent of card delivery and in a batch manner as opposed to a continuous shuffler manner.

All of the apparatus, devices and methods disclosed and claimed herein can be made and executed without undue experimentation in light of the present disclosure. While the apparatus, devices and methods of this invention have been described in terms of both generic descriptions and preferred embodiments, it will be apparent to those skilled in the art that variations may be applied to the apparatus, devices and methods described herein without departing from the concept and scope of the invention. More specifically, it will be apparent that certain elements, components, steps, and sequences that are functionally related to the preferred embodiments may be substituted for the elements, components, steps, and sequences described and/or claimed herein while the same or similar results would be achieved. All such similar substitutions and modifications apparent to those skilled in the art are deemed to be within the scope and concept of the invention as defined by the appended claims.

The unique combination of the accurate imaging reading capability of the present system and the specific positioning capability and recording (indexing) of specific cards whose value (rank and suit) can be specifically identified and associated with a specific position with the final randomized set of cards, gives excellent security to the casinos and players. As the card sequences in the shuffled set of final cards can be exactly known, this information can be used along with other security devices, such as table card reading cameras, discard trays with card reading capability, and the like, to add a high degree of certainty that a fair and honest game is being played at a specific location. Special bonus hands in games such as LET IT RIDE® poker, THREE CARD POKER® game, CRAZY FOUR POKER® and the like can be immediately verified by a central computer or the shuffler itself by indicating that a specific value or rank of hand was properly dealt to a specific position on the table. Present day security may sometimes have to hand verify an entire deck or set of cards, which can take five to ten minutes of table down time. This is distracting to players and is an economic loss to the casino.

Although a description of preferred embodiments has been presented, various changes including those mentioned above could be made without deviating from the spirit of the present invention. It is desired, therefore, that reference be made to the appended claims rather than to the foregoing description to indicate the scope of the invention.

What is claimed is:

1. A method of determining at least one of rank and suit of a playing card in a card handling device, comprising:
    training an imaging system of the card handling device by reading at least one reference set of card ranks and a set of card suits utilizing an image sensor of the imaging system and generating reference data;
    converting the reference data to reference binary values utilizing a logic control circuit;
    storing the reference binary values in non-transitory memory;
    capturing acquired image data from an unknown card face utilizing the image sensor;
    converting the acquired image data into unknown card face binary values utilizing the logic control circuit; and
    correlating the unknown card face binary values to reference binary values utilizing the logic control circuit to determine at least one of rank and suit of the unknown card face.

2. The method of claim 1, wherein both rank and suit are determined utilizing the logic control circuit.

3. The method of claim 1, wherein the image sensor is selected from the group consisting of a complementary-metal-oxide-semiconductor sensing system and a contact-image-sensor sensing system.

4. The method of claim 3, wherein the complementary-metal-oxide-semiconductor sensor is a color sensor.

5. The method of claim 4, wherein the complementary-metal-oxide-semiconductor sensor is a two-dimensional sensor.

6. The method of claim 1, wherein the acquired image data is a vector set.

7. The method of claim 1, wherein the converted reference data is a vector set.

8. The method of claim 1, further comprising the step of template matching to determine at least one of rank and suit.

9. The method of claim 1, wherein the image sensor comprises a black and white complementary-metal-oxide-semiconductor sensor.

10. The method of claim 9, wherein the image sensor outputs gray scale values.

11. The method of claim 10, wherein the gray scale values are outputted in at least one of an 8- and 16-bit format.

12. The method of claim 1, wherein the binary values are inverted.

13. The method of claim 1, wherein the correlating step comprises using template matching to determine at least one of suit and rank.

14. The method of claim 1, further comprising activating the image sensor in response to a signal received from a card present sensor.

15. The method of claim 1, wherein the logic control circuit is selected from the group consisting of a field-programmable gate array and an application-specific integrated circuit.

16. The method of claim 1, further comprising providing a green light source for acquiring unknown card images.

17. The method of claim 1, further comprising the step of comparing unmatched images of shape.

18. The method of claim 1, further comprising the step of providing a light source for acquiring unknown card images.

19. The method of claim 18, wherein the light source is directed to the card face by means of at least one of a mirror and a lens.

* * * * *